United States Patent
Levy et al.

(10) Patent No.: US 12,499,323 B2
(45) Date of Patent: *Dec. 16, 2025

(54) DYNAMIC SUBSYSTEM OPERATIONAL SEQUENCING TO CONCURRENTLY CONTROL AND DISTRIBUTE SUPERVISED LEARNING PROCESSOR TRAINING AND PROVIDE PREDICTIVE RESPONSES TO INPUT DATA

(71) Applicant: OJO Labs, Inc., Austin, TX (US)

(72) Inventors: Joshua Howard Levy, Austin, TX (US); Jacy Myles Legault, Austin, TX (US); Kenneth Czechowski, Austin, TX (US)

(73) Assignee: OJO LABS, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,402

(22) Filed: Aug. 11, 2023

(65) Prior Publication Data

US 2024/0028840 A1    Jan. 25, 2024

Related U.S. Application Data

(63) Continuation of application No. 17/858,070, filed on Jul. 6, 2022, now Pat. No. 11,741,315, which is a (Continued)

(51) Int. Cl.
    *G06F 40/40* (2020.01)
    *G06N 20/00* (2019.01)

(52) U.S. Cl.
    CPC ............. *G06F 40/40* (2020.01); *G06N 20/00* (2019.01)

(58) Field of Classification Search
    None
    See application file for complete search history.

(56) References Cited

U.S. PATENT DOCUMENTS

| | | | |
|---|---|---|---|
| 7,599,911 B2 * | 10/2009 | Manber ................. | G06F 16/334 707/999.102 |
| 9,292,492 B2 * | 3/2016 | Sarikaya ............. | G06F 16/3338 |
| 2012/0158620 A1 * | 6/2012 | Paquet ................... | G06N 20/00 706/12 |

OTHER PUBLICATIONS

Bhargava, Aditya, et al. "Easy contextual intent prediction and slot detection." 2013 IEEE international conference on acoustics, speech and signal processing. IEEE, 2013. (Year: 2013).*

(Continued)

*Primary Examiner* — Daniel T Pellett
(74) *Attorney, Agent, or Firm* — Kent B. Chambers; Terrile, Cannatti & Chambers, LLP

(57) ABSTRACT

A supervised learning processing (SLP) system and method provide cooperative operation of a network of supervised learning processors to concurrently distribute supervised learning processor training, generate predictions, provide prediction driven responses to input objects, and provide operational sequencing to concurrently control and distribute supervised learning processor training and provide predictive responses to input data. The SLP system can dynamically sequence SLP subsystem operations to improve resource utilization, training quality, and/or processing speed. A system monitor-controller can dynamically determine if process environmental data indicates initiation of dynamic subsystem processing sequencing. Concurrently training SLP's provides accurate predictions of input objects and responses thereto and enhances the network by providing high quality value predictions and responses and avoiding potential training and operational delays. The SLP system can enhance the network of SLP subsystems by providing flexibility to incorporate multiple SLP models into the network and train with concurrent commercial operations.

16 Claims, 38 Drawing Sheets

Related U.S. Application Data continuation of application No. PCT/US2021/026233, filed on Apr. 7, 2021, which is a continuation of application No. 17/222,552, filed on Apr. 5, 2021, now abandoned.

(60) Provisional application No. 63/133,559, filed on Jan. 4, 2021.

(56) References Cited

OTHER PUBLICATIONS

Hashemi, Homa B., Amir Asiaee, and Reiner Kraft. "Query intent detection using convolutional neural networks." International conference on web search and data mining, workshop on query understanding. vol. 23. 2016. (Year: 2016).*

Sawant, Uma, and Soumen Chakrabarti. "Learning joint query interpretation and response ranking." Proceedings of the 22nd international conference on World Wide Web. 2013. (Year: 2013).*

Xu, Puyang, and Ruhi Sarikaya. "Contextual domain classification in spoken language understanding systems using recurrent neural network." 2014 IEEE International Conference on Acoustics, Speech and Signal Processing (ICASSP). IEEE, 2014. (Year: 2014).*

Specification accepted on Aug. 3, 2023, filed in U.S. Appl. No. 17/858,070, p. 1.

Notice of Allowance mailed Apr. 12, 2023, filed in U.S. Appl. No. 17/858,070, pp. 1-3.

Response to Ex Parte Quayle Action dated Mar. 27, 2023, filed in U.S. Appl. No. 17/858,070, pp. 2-14.

Ex Parte Quayle Action mailed Jan. 25, 2023, filed in U.S. Appl. No. 17/858,070, pp. 1-6.

* cited by examiner

Domain Prediction Input Data 902

```
"incoming message": 904
    "id": "6985db4c-086b-4d64-a8a6-4e97ffa9acfa",      906
    "body": "How many bathrooms on the first floor?",
    "receivedAt": 1496457003129,
    "customerId": "48dd3452-397b-46d8-989e-db9350e19133",
    "isSpam": false
```

```
    "customer":                                        CONTEXTUAL DATA
        "data":                                              908
            "agent":
                "phoneNumber": "+15125550000"

"facts":
                "Mls Constraint":
                    "tx_actris"

"Listing Status Constraint":
                    "Active"

"id": "48dd3452-397b-46d8-989e-db9350e19133",
        "phoneNumber": "+15125551234"

"conversation":
    "message(s)":

"message":
                "id": "0a57cb21-4929-4a1c-b783-9f24aab25b60",
                "incoming": true,                                    910
                "body": "How many bedrooms are there at 61204 Mesa?",
                "receivedAt": 1487093713,
                "customerId": "48dd3452-397b-46d8-989e-db9350e19133",
                "domain"
                    "property"
                "intents":

"property details", rooms", bedrooms", room", count"

"entities":

"listing":
                        "value": "tx_actris_1234567",
                        "ending_char": 40,
                        "starting_char": 31,
                        "string": "61204 Mesa"
```

*FIG. 9*

Domain Prediction Output Data 1000:

```
"status_code": "ok",
    "execution_variables":
        "incoming message": 904
            "id": "6985db4c-086b-4d64-a8a6-4e97ffa9acfa",
            "body": "How many bathrooms on the first floor?",
            "receivedAt": 1496457003129,
            "customerId": "48dd3452-397b-46d8-989e-db9350e19133",
            "isSpam": false
```
```
        "customer":                                    CONTEXTUAL DATA
            "data":                                                908
                "agent":
                    "phoneNumber": "+15125550000"
                "facts":
                    "Mls Constraint":
                        "tx_actris"
                            "Listing Status Constraint": "Active"

"id": "48dd3452-397b-46d8-989e-db9350e19133",
            "phoneNumber": "+15125551234"
            "conversation":
                "message(s)":
                    "message":
                        "id": "0a57cb21-4929-4a1c-b783-9f24aab25b60",
                        "incoming": true,
                        "body": "How many bedrooms are there at 61204
Mesa?",
                        "receivedAt": 1487093713,
                        "customerId": "48dd3452-397b-46d8-989e",
                        "intents": "property details", "rooms",
bedrooms", room", count"
                            "entities":
                            "listing":
                                "value": "tx_actris_1234567",
                                "ending_char": 40,
                                "starting_char": 31,
                                "string": "61204 Mesa"
```
```
        "taxonomyVersion": "0.5.0-df819efb-90d9-4204", DOMAIN OUTPUT
        "domainResolved": false,                         PREDICTION
        "domainOptions":                                   OPTION 1

"description": "asking for details about a specific
property listing",                      910
            "path": "property details"
        "confidenceLevel": 0.75
```
```
            "description": "providing feedback about a specific
property listing",
            "path": "property feedback"
            "description": "an intent not captured by the other
intents", 910
            "path": "unknown"              DOMAIN OUTPUT
        "confidenceLevel": 0.25             PREDICTION
                                             OPTION 2
```

FIG. 10

Intent Prediction Input Data 1202

```
"incoming message": 904
    "id": "6985db4c-086b-4d64-a8a6-4e97ffa9acfa",
    "body": "How many bathrooms on the first floor?",     906
    "receivedAt": 1496457003129,
    "customerId": "48dd3452-397b-46d8-989e-db9350e19133",
    "isSpam": false
```

```
"customer":                                          CONTEXTUAL DATA
    "data":                                                      1204
        "agent":
            "phoneNumber": "+15125550000"
            "facts":
            "Mls Constraint":
                "tx_actris"
                    "Listing Status Constraint":
                "Active"

"id": "48dd3452-397b-46d8-989e-db9350e19133",
        "phoneNumber": "+15125551234"

"conversation":
        "messages":
                "message":
                "id": "0a57cb21-4929-4a1c-b783-9f24aab25b60",
                    "incoming": true,
                    "body": "How many bedrooms are there at 61204
Mesa?",
                    "receivedAt": 1487093713,
                    "customerId": "48dd3452-397b-46d8-989e-
db9350e19133",
                "domain"
                    "property"
                "intents": "property details", "rooms", "bedrooms", "room",
"count",
                "entities": "listing": "value":
"tx_actris_1234567", "ending_char": 40, "starting_char": 31, "string":
"61204 Mesa"                                    1206
    "domainSelection": "property details"
```

*FIG. 12*

Intent Prediction Output Data 1300

```
"status_code": "ok",
    "execution_variables":
        "incoming message":
            "id": "6985db4c-086b-4d64-a8a6-4e97ffa9acfa",
            "body": "How many bathrooms on the first floor?",
            "receivedAt": 1496457003129,
            "customerId": "48dd3452-397b-46d8-989e-db9350e19133",
            "isSpam": false
        "customer":                                    CONTEXTUAL DATA
        "data":
            "agent":
                "phoneNumber": "+15125550000"
                        "facts":
                "Mls Constraint":
                    "tx_actris"
                            "Listing Status Constraint":
                    "Active"

"id": "48dd3452-397b-46d8-989e-db9350e19133",
            "phoneNumber": "+15125551234"

"conversation":
            "message(s)":

"message":
                        "id": "0a57cb21-4929-4a1c-b783-9f24aab25b60",
                        "incoming": true,
                        "body": "How many bedrooms are there at 61204
Mesa?",
                        "receivedAt": 1487093713,
                        "customerId": "48dd3452-397b-46d8-989e-
db9350e19133",
                        "intents": "property details", rooms",
bedrooms", room", count"
```

*FIG. 13*

Intent Prediction Output Data 1300 (cont'd)

```
                       "entities":
                                                        CONTEXTUAL DATA
                           "listing":
                               "value": "tx_actris_1234567",
ending_char": 40, starting_char": 31, string": "61204 Mesa"

"domainSelection":
           "property details"
```

```
                                                     INTENT PREDICTION 1402
  "intentResolved": true, "intentOptions":
           "description": "the quantity of a bathroom as a whole",
           "path": "property details", rooms", bathroom", room",
count"
"confidenceLevel": 0.95
```

*FIG. 14*

Entity Extraction Prediction Input Data 1502

```
"incoming message":
  "id": "6985db4c-086b-4d64-a8a6-4e97ffa9acfa",
  "body": "How many bathrooms on the first floor?",
  "receivedAt": 1496457003129,
  "customerId": "48dd3452-397b-46d8-989e-db9350e19133",
  "isSpam": false
```

```
"customer":                                    CONTEXTUAL DATA 1504
  "data":
    "agent":
      "phoneNumber": "+15125550000"

"facts":
      "Mls Constraint":
        "tx_actris"

"Listing Status Constraint":
        "Active"

"id": "48dd3452-397b-46d8-989e-db9350e19133",
  "phoneNumber": "+15125551234"

"conversation":
    "messages":

"message":
            "id": "0a57cb21-4929-4a1c-b783-9f24aab25b60",
              "incoming": true,
              "body": "How many bedrooms are there at 61204
Mesa?",
              "receivedAt": 1487093713,
              "customerId": "48dd3452-397b-46d8-989e-
db9350e19133",
            "domain"
              "property"
                "intents": "property details", "rooms",
"bedrooms", "room", "count",
                "entities":
                    "listing":
                        "value": "tx_actris_1234567",
                        "ending_char": 40,
                        "starting_char": 31,
                        "string": "61204 Mesa"

"intentSelection": "property details", "rooms", "bathroom", "room",
"count"
```

FIG. 15

Entity Extraction Prediction Output Data 1600

```
"status_code": "ok",
"execution_variables":
    "incoming message":
        "id": "6985db4c-086b-4d64-a8a6-4e97ffa9acfa",
        "body": "How many bathrooms on the first floor?",
        "receivedAt": 1496457003129,
        "customerId": "48dd3452-397b-46d8-989e-db9350e19133",
        "isSpam": false
```

```
        "customer":                                    CONTEXTUAL DATA
            "data":
                "agent":
                    "phoneNumber": "+15125550000"

"facts":
                    "Mls Constraint":
                        "tx_actris"

"Listing Status Constraint":
                        "Active"

"id": "48dd3452-397b-46d8-989e-db9350e19133",
            "phoneNumber": "+15125551234"

"conversation":
            "message(s)":

"message":
                    "id": "0a57cb21-4929-4a1c-b783-9f24aab25b60",
                    "incoming": true,
                    "body": "How many bedrooms are there at 61204
Mesa?",
                    "receivedAt": 1487093713,
                    "customerId": "48dd3452-397b-46d8-989e-
db9350e19133",
                    "intents": "property details", rooms",
bedrooms", room", count"

"entities":

"listing":
                            "value": "tx_actris_1234567",
                            "ending_char": 40,
                            "starting_char": 31,
                            "string": "61204 Mesa"
```

*FIG. 16*

Entity Extraction Prediction Output Data 1600 (cont'd)

```
                                    ENTITY EXTRACTION PREDICTION 1702

"intentSelection": "property details", rooms", bathroom",
room", count"

"extractionResolved": false,
     "predictedEntities":

"raw_entities":
              "feature":
                  "required": false

"listing":
                  "contextual_candidate":
                      "string": "61204 Mesa",
                      "value": "tx_actris_1234567"

"required": true

"which":
                  "required": false

"path": "property details", rooms", bathroom", room",
count"

"confidenceLevel": 0.85
```

*FIG. 17*

Entity Normalization Prediction Input Data 1900

```
"incoming message": 904
  "id": "6985db4c-086b-4d64-a8a6-4e97ffa9acfa",       906
  "body": "How many bathrooms on the first floor?",
  "receivedAt": 1496457003129,
  "customerId": "48dd3452-397b-46d8-989e-db9350e19133",
  "isSpam": false
```

```
"customer":                                    CONTEXTUAL DATA
  "data":                                               1902
    "agent":
      "phoneNumber": "+15125550000"

"facts":
      "Mls Constraint":
        "tx_actris"

"Listing Status Constraint":
        "Active"

"id": "48dd3452-397b-46d8-989e-db9350e19133",
  "phoneNumber": "+15125551234"

"conversation":
  "messages":

"message":
        "id": "0a57cb21-4929-4a1c-b783-9f24aab25b60",
        "incoming": true,
        "body": "How many bedrooms are there at 61204
Mesa?",
        "receivedAt": 1487093713,
        "customerId": "48dd3452-397b-46d8-989e-
db9350e19133",
        "domain"
          "property"
        "intents": "property details", "rooms",
"bedrooms", "room", "count",
```

*FIG. 19*

Entity Normalization Prediction Input Data 1900 (cont'd)

```
"entities":                                                    CONTEXTUAL DATA
                "listing":                                              1902
                    "value": "tx_actris_1234567",
                    "ending_char": 40,
                    "starting_char": 31,
                    "string": "61204 Mesa"

"selectedEntities":

"path": "property details", "rooms", "bathroom", "room",
"count",
          "raw_entities":
              "listing":
                  "value": "tx_actris_1234567",
                  "ending_char": 40,
                  "starting_char": 31,
                  "string": "61204 Mesa"
              ,
              "which":
                  "ending_char": 37,
                  "starting_char": 26,
                  "string": "first floor"
```

*FIG. 20*

Entity Normalization Prediction Output Data 2100

```
"status_code": "ok",
"execution_variables":
    "incoming message": 904
        "id": "6985db4c-086b-4d64-a8a6-4e97ffa9acfa",         906
        "body": "How many bathrooms on the first floor?",
        "receivedAt": 1496457003129,
        "customerId": "48dd3452-397b-46d8-989e-db9350e19133",
        "isSpam": false
```

```
                                                    CONTEXTUAL DATA
    "customer":                                              1902
        "data":
            "agent":
                "phoneNumber": "+15125550000"

"facts":
                "Mls Constraint":
                    "tx_actris"

"Listing Status Constraint":
                    "Active"

"id": "48dd3452-397b-46d8-989e-db9350e19133",
            "phoneNumber": "+15125551234"

"conversation":
        "message(s)":

"message":
                "id": "0a57cb21-4929-4a1c-b783-9f24aab25b60",
                "incoming": true,
                "body": "How many bedrooms are there at 61204
Mesa?",
                "receivedAt": 1487093713,
                "customerId": "48dd3452-397b-46d8-989e-
db9350e19133",
                "intents": "property details", rooms",
bedrooms", room", count"

"entities":

"listing":
                        "value": "tx_actris_1234567",
                        "ending_char": 40,
                        "starting_char": 31,
                        "string": "61204 Mesa"
```

FIG. 21

Entity Normalization Prediction Output Data 2100 (cont'd)

```
         "selectedEntities":                              CONTEXTUAL DATA
                                                                    1902
                "path": "property details", rooms", bathroom", room",
count"

"raw_entities":
                     "listing":
                          "value": "tx_actris_1234567",
                          "ending_char": 40,
                          "starting_char": 31,
                          "string": "61204 Mesa"

"which":
                          "ending_char": 37,
                          "starting_char": 26,
                          "string": "first floor"
```

```
         "fulfillmentResolved": false,
         "normalizationResolved": false,                ENTITY NORMALIZATION
         "normalizationError": false,                        PREDICTION 2202
         "predictedNormalizations":
              "results":

"normalized_entities":
                          "listing":
                               "candidates":

"display_address": "61204  Mesa  Rd
Austin, TX 76543",
                                    "image": "http://tx-
actris.photos.mlsfinder.com/thumbs/1/2/3/4/5/6/7/_/5/1234567_5-1.jpg",
                                    "mls_id": "1234567",
                                    "status": "Active",
                                    "value": "tx_actris_1234567"

"ending_char": 40,
                               "starting_char": 31,
                               "string": "61204 Mesa",
                               "value": "tx_actris_1234567"

"which":
                               "candidates":
```

*FIG. 22*

Entity Normalization Output (cont'd)

```
ENTITY NORMALIZATION              "value": "first floor"
PREDICTION 2202 (cont'd)
                                  "value": "second floor"

"value": "ground floor"

"... many options deleted ..."

"ending_char": 37,
                        "starting_char": 26,
                        "string": "first floor",
                        "value": "first floor"

"path": "property details", rooms", bathroom",
room", count"

"presentational_keys":
            "predictedNormalizations"

"confidenceLevel": 0.975
```

*FIG. 23*

Fulfillment Input Data 2400

```
"incoming message": 904
   "id": "6985db4c-086b-4d64-a8a6-4e97ffa9acfa",       906
   "body": "How many bathrooms on the first floor?",
   "receivedAt": 1496457003129,
   "customerId": "48dd3452-397b-46d8-989e-db9350e19133",
   "isSpam": false
```

```
"customer":                                              CONTEXTUAL DATA
   "data":                                                      2402
      "agent":
         "phoneNumber": "+15125550000"

"facts":
         "Mls Constraint":
            "tx_actris"

"Listing Status Constraint":
            "Active"

"id": "48dd3452-397b-46d8-989e-db9350e19133",
      "phoneNumber": "+15125551234"

"conversation":
   "messages":

"message":
         "id": "0a57cb21-4929-4a1c-b783-9f24aab25b60",
            "incoming": true,
            "body": "How many bedrooms are there at 61204 Mesa?",
            "receivedAt": 1487093713,
            "customerId": "48dd3452-397b-46d8-989e-db9350e19133",
            "domain"
               "property"
            "intents": "property details", "rooms", "bedrooms", "room", "count",
               "entities":
                  "listing":
                     "value": "tx_actris_1234567",
                     "ending_char": 40,
                     "starting_char": 31,
                     "string": "61204 Mesa"
```

*FIG. 24*

Fulfillment Prediction Input Data 2400 (cont'd)

```
"normalizedEntities":                              CONTEXTUAL DATA
     "path": "property details", "rooms", "bathroom", "room",    2402
"count",
     "normalized_entities":
          "listing":
               "value": "tx_actris_1234567",
               "ending_char": 40,
               "starting_char": 31,
               "string": "61204 Mesa Rd Austin, TX 76543"

"which":
               "ending_char": 37,
               "starting_char": 26,
               "string": "first floor",
               "value": "first floor"
```

*FIG. 25*

Fulfillment Output 2600

```
"status_code": "ok",
"execution_variables":
    "incoming message":
        "id": "6985db4c-086b-4d64-a8a6-4e97ffa9acfa",         906
        "body": "How many bathrooms on the first floor?",
        "receivedAt": 1496457003129,
        "customerId": "48dd3452-397b-46d8-989e-db9350e19133",
        "isSpam": false
```

```
                                                       CONTEXTUAL DATA
    "customer":
        "data":                                                    2402
            "agent":
                "phoneNumber": "+15125550000"

"facts":
                "Mls Constraint":
                    "tx_actris"

"Listing Status Constraint":
                    "Active"

"id": "48dd3452-397b-46d8-989e-db9350e19133",
            "phoneNumber": "+15125551234"

"conversation":
        "message(s)":

"message":
                "id": "0a57cb21-4929-4a1c-b783-9f24aab25b60",
                "incoming": true,
                "body": "How many bedrooms are there at 61204
Mesa?",
                "receivedAt": 1487093713,
                "customerId": "48dd3452-397b-46d8-989e-
db9350e19133",
                "intents":

"property details", rooms",
bedrooms", room", count"

"entities":

"listing":
                        "value": "tx_actris_1234567",
                        "ending_char": 40,
                        "starting_char": 31,
                        "string": "61204 Mesa"
```

*FIG. 26*

Fulfillment Output 2600 (cont'd)

```
        "normalizedEntities":                                    CONTEXTUAL DATA
                                                                       2404
            "path":
                "property details",
                "rooms",
                "bathroom",
                "room",
                "count"

"normalized_entities":
                "listing":
                    "value": "tx_actris_1234567",
                    "ending_char": 40,
                    "starting_char": 31,
                    "string": "61204 Mesa"

"which":
                    "ending_char": 37,
                    "starting_char": 26,
                    "string": "first floor",
                    "value": "first floor"
```

```
        "fulfillmentResolved": true,
        "fulfillment":                  2702

"answer": 3,
            "normalized_entities":
                "listing":
                    "ending_char": 40,
                    "starting_char": 31,
                    "string": "61204 Mesa",
                    "value": "tx_actris_1234567"

"which":                                         SUPPORTING DATA
                    "ending_char": 37,                                  2704
                    "starting_char": 26,
                    "string": "first floor",
                    "value": "first floor"

"path":
                "property details", rooms", bathroom", room",
 count"

"status_code": "ok"
```

FIG. 27

Response Prediction Input Data 2800

```
"incoming message": 904
  "id": "6985db4c-086b-4d64-a8a6-4e97ffa9acfa",
  "body": ["How many bathrooms on the first floor?",  906
  "receivedAt": 1496457003129,
  "customerId": "48dd3452-397b-46d8-989e-db9350e19133",
  "isSpam": false
```

```
"customer":                                      CONTEXTUAL DATA
  "data":                                                    2802
    "agent":
      "phoneNumber": "+15125550000"

"facts":
      "Mls Constraint":
        "tx_actris"

"Listing Status Constraint":
        "Active"

"id": "48dd3452-397b-46d8-989e-db9350e19133",
    "phoneNumber": "+15125551234"

"conversation":
  "messages":

"message":
          "id": "0a57cb21-4929-4a1c-b783-9f24aab25b60",
          "incoming": true,
          "body": "How many bedrooms are there at 61204
Mesa?",
          "receivedAt": 1487093713,
          "customerId": "48dd3452-397b-46d8-989e-
db9350e19133",
          "domain"
            "property"
          "intents": "property details", "rooms", "bedrooms",
"room", "count",
          "entities":
            "listing":
              "value": "tx_actris_1234567",
              "ending_char": 40,
              "starting_char": 31,
              "string": "61204 Mesa"
```

*FIG. 28*

Response Prediction Input Data 2800 (cont'd)

```
    "fulfillment":                                    CONTEXTUAL DATA
                                                              2802
        "answer": 3,
        "status_code": "ok",
        "path": "property details", "rooms", "bathroom", "room",
"count",
        "normalized_entities":
            "listing":
                "value": "tx_actris_1234567",
                "ending_char": 40,
                "starting_char": 31,
                "string": "61204 Mesa"
            ,
            "which":
                "ending_char": 37,
                "starting_char": 26,
                "string": "first floor",
                "value": "first floor"
```

*FIG. 29*

Response Prediction Output Data 3000

```
"status_code": "ok",
"execution_variables":
    "incoming message": 904
        "id": "6985db4c-086b-4d64-a8a6-4e97ffa9acfa",                    906
        "body": "How many bathrooms on the first floor?",
        "receivedAt": 1496457003129,
        "customerId": "48dd3452-397b-46d8-989e-db9350e19133",
        "isSpam": false
```

```
    "customer":                                              CONTEXTUAL DATA
        "data":                                                         3002
            "agent":
                "phoneNumber": "+15125550000"

"facts":
                "Mls Constraint":
                    "tx_actris"

"Listing Status Constraint":
                    "Active"

"id": "48dd3452-397b-46d8-989e-db9350e19133",
            "phoneNumber": "+15125551234"

"conversation":
            "message(s)":

"message":
                        "id": "0a57cb21-4929-4a1c-b783-9f24aab25b60",
                        "incoming": true,
                        "body": "How many bedrooms are there at 61204
Mesa?",
                        "receivedAt": 1487093713,
                        "customerId": "48dd3452-397b-46d8-989e-
db9350e19133",
                        "intents":

"property details", rooms", bedrooms",
room", count"

"entities":
```

*FIG. 30*

Response Prediction Output Data (cont'd)

```
                              "listing":
                                    "value": "tx_actris_1234567",
                                    "ending_char": 40,
                                    "starting_char": 31,
                                                      CONTEXTUAL DATA
      "fulfillment":                                              3002

"answer": 3,
            "status_code": "ok",
            "path":
                  "property details",
                  "rooms",
                  "bathroom",
                  "room",
                  "count"

"normalized_entities":
                  "listing":
                        "value": "tx_actris_1234567",
                        "ending_char": 40,
                        "starting_char": 31,
                        "string": "61204 Mesa"
                                                    3102
      "responseResolved": true,
      "predictedResponses":

"body": "It has 3 bathrooms on the first floor",
            "confidence": 0.5,
            "id": "ac9802d9-a080-4f75-8e4b-65c84f23ec81"

"body": "61204 Mesa has 3 bathrooms on the first
floor",
            "confidence": 0.5,
            "id": "5d6b24b5-99ae-4212-9bfc-9a1dcb511ba5"

"presentational_keys":
            "predictedResponses"
```

*FIG. 31*

DYNAMIC SUBSYSTEM OPERATIONAL SEQUENCING TO CONCURRENTLY CONTROL AND DISTRIBUTE SUPERVISED LEARNING PROCESSOR TRAINING AND PROVIDE PREDICTIVE RESPONSES TO INPUT DATA

CROSS-REFERENCE TO RELATED APPLICATIONS

This application is a continuation under 35 U.S.C. § 356(c) of Patent Cooperation Treaty application PCT/US21/26233, which is incorporated by reference in its entirety. PCT/US21/26233 is a continuation of U.S. patent application Ser. No. 17/222,552, which is incorporated by reference in its entirety. U.S. patent application Ser. No. 17/222,552 claims the benefit of U.S. Provisional Patent Application No. 63/133,559, which is incorporated by reference in its entirety.

The application incorporates all the following U.S. patent applications by reference in their entireties:

- U.S. patent application Ser. No. 16/000,600, which is a continuation of U.S. patent application Ser. No. 15/826,151 (now U.S. Pat. No. 10,013,654) (referred to herein as "OJOLABS001");
- U.S. patent application Ser. No. 15/992,851, which is a continuation of U.S. patent application Ser. No. 15/897,885 (now U.S. Pat. No. 10,019,491), which is a continuation-in-part of U.S. patent application Ser. No. 15/826,151 (now U.S. Pat. No. 10,013,654);
- U.S. patent application Ser. No. 17/134,481, which claims the benefit of U.S. Provisional Patent Application No. 62/956,166 (referred to herein as "OJOLABS003-PROV");
- U.S. patent application Ser. No. 17/134,476, which claims the benefit of U.S. Provisional patent Application No. 62/956,178; and
- U.S. Provisional Application No. 63/133,559.

BACKGROUND OF THE INVENTION

Field of the Invention

The present invention relates to relates to supervised learning processing, and more particularly, to a system, method, and computer program product involving training supervised learning models with higher order supervised learning feedback during concurrent operation of a supervised learning processor with selectable dynamic subsystem operational sequence control.

Description of the Related Art

Supervised learning is a machine learning process that infers a function for determining an output based on training data, and the function is used to map new input data to an output. A natural language processor (NLP) represents one embodiment of a supervised learning processor. In general, a natural language processor (NLP) includes one or more NLP models to generate a prediction about and a response to a human-understandable, natural language (NL) statement. In at least one embodiment, the NL statement may be a statement, such as a query or command, and the NLP interprets the statement in order to provide a response. The NLP predicts what the NL statement means and generates an appropriate response. For example, in a smart home environment, a person may make the statement to a machine, "turn on the light." Ideally, the NLP predicts that the statement is a command to turn a light "on" and initiates control over the light to turn the light "on." However, the prediction is not always accurate, and an inaccurate prediction can lead to an incorrect or at least human-unexpected response. The accuracy of the NLP relates to a prediction and a response that correctly meets the expectations of a human. To improve the accuracy of the NLP model, the NLP model that predicted the exemplary statement undergoes training (also commonly referred to as machine learning) in order to improve confidence in the accuracy of the NLP prediction and response.

Confidence in the NLP output is generally limited by the complexity of the statement and the amount of training undertaken by the NLP model. For example, in the above example, the word "turn" generally means "to rotate." However, the phrase "turn on" generally means to activate a device. Furthermore, "light" can mean both electromagnetic radiation in the human-visible spectrum in general and a device that emits electromagnetic radiation. Accordingly, to properly respond to the statement "turn on the light," the NLP is trained to connect the two words "turn on" and predict "turn on" as a command phrase and identify "light" as a device and the object of the command when used in conjunction with the phrase "turn on." Additionally, multiple, alternative forms of the natural language input can have the same meaning and expect the same response. For example, statements such as "activate the lamp," "activate the light," "start the lamp," "light on," and "turn the light on" contain a variety of vocabulary and structure but all represent alternatives for "turn on the light." A well-trained NLP model makes accurate predictions and generates accurate responses to the alternative phrases in same manner.

One measure of the degree of capability of an NLP is the level of domain flexibility and vocabulary size for statements that can be processed and a predictive response with a sufficient level of confidence can be generated. As is apparent, as the number of NL statements to which an NLP is expected to process, predict, and develop a response to increases, the amount of training to develop an acceptable level of confidence that an NLP will respond in a way that a human would expect also increases. The amount of training is dictated by several factors. One factor is how well-constrained (sometimes referred to as 'how well-behaved') is the natural language domain in which the NLP operates. A highly constrained domain generally has a predetermined structured input with limited or no variations in context. For example, in a highly constrained domain, "turn on the light" would be the only phrase allowed and would always refer to a light device, such as a lamp. Another factor is the number of statements and variations thereof in which the NLP is expected to respond with an acceptable response. For more flexible natural language models designed to process unstructured input content, i.e. variable language structure, alternative vocabulary, and a higher number of statements, the amount of training and the time used to train the NLP increases, often exponentially.

NLP's are trained with training data representing at least approximations of natural language statements that the NLP may receive and for which an accurate prediction and corresponding response are expected. Training the NLP presents several obstacles. One obstacle is obtaining sufficient and adequate training data. As the domain flexibility and vocabulary size increases, the amount of training data used to train the NLP to achieve an acceptable response quality value also increases. Obtaining large sets of training data can be very difficult, time consuming, and very costly.

Furthermore, the quality of the training data acquired from data sources can vary especially when the context of the acquired training data is not well-regulated. Furthermore, the time to train the NLP and put the NLP into productive use also increases as the flexibility of the NLP increases. The same disadvantages also apply to supervised learning processors.

SUMMARY OF THE INVENTION

In one embodiment, a method of cooperatively operating a network of supervised learning processor subsystems to concurrently distribute supervised learning processor training and provide predictive responses to input objects includes, in an electronic, supervised learning processing system, receiving an input object from a requestor device, storing the input object in a memory, and receiving and accessing any contextual data associated with the input object to contextualize the input object. The method further includes associating the contextual data with the input object and receiving process environmental data and supervised learning processing the input object and contextual data using a plurality of supervised learning processing stages distributed between at least a first order supervised learning processor subsystem and second order supervised learning processor subsystem having an equal or higher, predictive output quality value than the first supervised learning processor subsystem. Supervised learning processing comprises:
  monitoring the process environmental data;
  determining if the process environmental data indicates initiation of dynamic subsystem sequencing;
  when the process environmental data indicates initiation of dynamic subsystem processing sequencing, determining a dynamic subsystem processing sequence from the process environmental data; and
  dynamically applying the subsystem process sequence to alter a predetermined subsystem processing sequence, wherein dynamically applying the subsystem process sequence comprises:
    determining a supervised learning processor subsystem to process at least the input object and the contextual data; and
    causing the determined supervised learning processor subsystem to receive and process the input object and the contextual data.
The second order supervised learning processing subsystem determines and finalizes an output of each supervised learning processing stage when the predictive response is routed to the second order supervised learning processing subsystem. The method also includes training at least one model of the first order supervised learning processor subsystem with the determined and finalized output from the second order supervised learning processor subsystem. The method also includes determining a response to the input object using at least a combined output from each supervised learning processing stage that processes the predictive response of at least one of the models, wherein enhancement of the network of supervised learning processor subsystems includes concurrently distributing training and cooperatively operating the supervised learning processor subsystems to determine the response to the statement. The method further includes providing the response to the user of the requestor device.

In another embodiment, an apparatus includes a cooperatively operated network of supervised learning processor subsystems to concurrently distribute supervised learning processor training and provide predictive responses to input objects. The apparatus includes one or more data processors and a memory, coupled to the data processors, having code stored therein to cause the one or more data processors to:
  receive an input object from a requestor device;
  store the input object in the memory;
  (A) receive and access any contextual data associated with the input object to contextualize the input object;
  (B) associate the contextual data with the input object;
  (C) receive process environmental data;
  (D) supervised learning process the input object and contextual data using a plurality of supervised learning processing stages distributed between at least a first order supervised learning processor subsystem and second order supervised learning processor subsystem having an equal or higher, predictive output quality value than the first supervised learning processor subsystem, wherein:
    (i) each supervised learning processing stage comprises one or more supervised learning processor models,
    (ii) each model of the first supervised learning processor subsystem is configured to (a) process at least the input object and contextual data to determine a predictive response to the input object and (b) determines a quality value of the predictive response; and
    (iii) to supervise learning process comprises to:
      a. monitor the process environmental data;
      b. determine if the process environmental data indicates initiation of dynamic subsystem sequencing;
      c. when the process environmental data indicates initiation of dynamic subsystem processing sequencing, determine a dynamic subsystem processing sequence from the process environmental data; and
      d. dynamically apply the subsystem process sequence to alter a predetermined subsystem processing sequence, wherein to dynamically apply the subsystem process sequence comprises to:
        determine a supervised learning processor subsystem to process at least the input object and the contextual data; and
        cause the determined supervised learning processor subsystem to receive and process the input object and the contextual data; and
    (iv) the second order supervised learning processing subsystem determines and finalizes an output of each supervised learning processing stage when the predictive response is routed to the second order supervised learning processing subsystem;
  (E) train at least one model of the first order supervised learning processor subsystem with the determined and finalized output from the second order supervised learning processor subsystem;
  (F) determine a response to the input object using at least a combined output from each supervised learning processing stage that processes the predictive response of at least one of the models, wherein enhancement of the network of supervised learning processor subsystems includes concurrently distributing training and cooperatively operating the supervised learning processor subsystems to determine the response to the statement; and
  (G) provide the response to the user of the requestor device.

In another embodiment, a non-transitory, computer program product includes code stored therein and executable by a cooperatively operated a network of supervised learning processor subsystems to concurrently distribute supervised learning processor training and provide predictive responses to input objects by:

receiving an input object from a requestor device;
storing the input object in a memory;
receiving and accessing any contextual data associated with the input object to contextualize the input object;
associating the contextual data with the input object;
supervised learning processing the input object and contextual data using a plurality of supervised learning processing stages distributed between at least a first order supervised learning processor subsystem and second order supervised learning processor subsystem having an equal or higher, predictive output quality value than the first supervised learning processor subsystem, wherein:
  (i) each supervised learning processing stage comprises one or more supervised learning processor models,
  (i) each model of the first supervised learning processor subsystem (a) processes at least the input object and contextual data to determine a predictive response to the input object and (b) determines a quality value of the predictive response; and
  (ii) the second order supervised learning processing subsystem determines and finalizes an output of each supervised learning processing stage for each predictive response whose quality value is below a pre-determined threshold;
training at least one model of the first order supervised learning processor subsystem with the determined and finalized output from the second order supervised learning processor subsystem;
determining a response to the input object using at least a combined output from each supervised learning processing stage, wherein enhancement of the network of supervised learning processor subsystems includes concurrently distributing training and cooperatively operating the supervised learning processor subsystems to determine the response to the statement; and
providing the response to the user of the requestor device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 9 depicts exemplary domain prediction input data.

FIG. 10 depicts exemplary domain prediction output data.

FIG. 12 depicts exemplary intent prediction input data.

FIGS. 13-14 depict exemplary intent prediction output data.

FIG. 15 depicts exemplary entity extraction input data.

FIGS. 16-17 depict exemplary entities extraction prediction output data 1600.

FIGS. 19-20 depict exemplary entity normalization input data.

FIGS. 21-23 depict exemplary entity normalization output data.

FIGS. 24-33 depict fulfillment and response input data, output data, and user interfaces.

DETAILED DESCRIPTION

Figure 1:
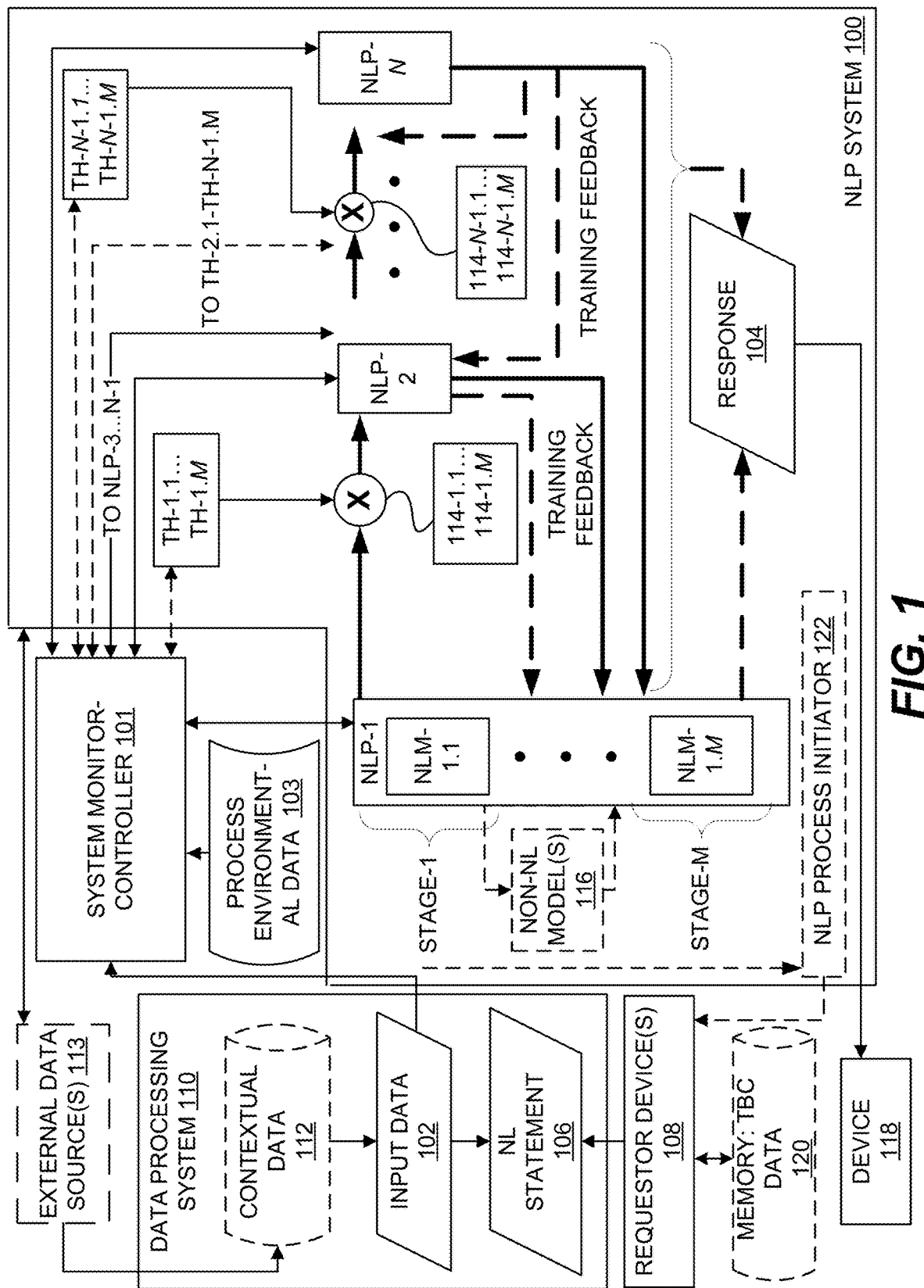
FIG. 1 depicts embodiments of a natural language processing (NLP) system including a system monitor-controller.

A supervised learning processing (SLP) system and method provide cooperative operation of a network of natural language (NL) processors to concurrently distribute supervised learning processor training, generate predictions, and provide prediction driven responses to input objects, such as NL statements. The SLP system includes SLP stages that are distributed across multiple SLP subsystems. Concurrently training SLP's provides accurate predictions of input objects and responses thereto, the SLP system and method enhance the network by providing high quality value predictions and responses and by avoiding potential training and operational delays associated with procurement and development of training data and refining the models of the SLP subsystems. Furthermore, embodiments of the system and method enhance the network of SLP subsystems by providing flexibility to incorporate multiple SLP models into the network and train at least a proper subset of the SLP models while concurrently using the SLP system and method in commercial operation.

Natural language processing (NLP) systems and methods are a genre of SLP systems and methods. With regard to an NLP system and method provide cooperative operation of a network of natural language processors to concurrently distribute natural language processor training, generate predictions, and provide prediction driven responses to natural language (NL) statements. By concurrently training NLP's to provide accurate predictions of NL statements and responses thereto, the NLP system and method enhance the network by providing high quality value predictions and responses and by avoiding potential training and operational delays associated with procurement and development of training data and refining the models of the NLP subsystems. "Concurrently training" means that the training of the NLP system occurs while the NLP system is available for processing actual, non-training data. "Concurrently training" does not require that training occur at all times when processing actual, non-training data. Training can be scheduled to update models at any chosen time interval, such as (i) occurring at approximately the same time while taking into account real-world delays that affect the exact times at which events occur, (ii) in accordance with scheduled intervals, or (iii) after a predetermined number of input objects such as NL statements have been processed. Furthermore, embodiments of the system and method enhance the network of NLP subsystems by providing flexibility to incorporate multiple NLP models into the network and train at least a proper subset of the NLP models while concurrently using the NLP system and method in commercial operation.

In at least one embodiment, an NLP system receives input data that includes a NL statement from a user of a requestor device. The NL statement can be any type of statement such as a query or a command. The NLP system stores the statement in memory for access by multiple NLP subsystems having multiple NLP stages. In at least one embodiment, the input data also includes contextual data that can provide context to the NL statement. Contextual data assists with narrowing possible predictions and responses and, thereby, improves the quality value of natural language processing predictive analytics. Accordingly, in at least one embodiment, the NLP system receives and accesses contextual data associated with the user, including past statements received from the user, to contextualize the statement.

The NLP system includes NLP stages that are distributed across multiple NLP subsystems. Organizing the NLP system into a framework of multiple stages enhances the NLP system by, for example, allowing the NLP system to break down an ontology problem into subproblems and use the results of the stages to develop a response to an NL statement. In at least one embodiment, the framework of multiple stages allows the NLP system to receive an unstructured NL statement from a user and convert the NL statement into a structured representation that can be processed in other stages to generate a response to the NL statement. In at least one embodiment, an "unstructured NL statement" is a statement where the structure, such as subject-verb-object order, and a mandatory set of information are not dictated. The ontology problem of an NL statement relates to, for example, determining a set of concepts and categories in a subject area or domain, determining properties, and relationships between the concepts and categories and the properties.

In at least one embodiment, the NLP system includes a first order NLP subsystem and a higher, second order NLP subsystem. The "order" of the NLP subsystem refers to a processing position order of the NLP subsystem with respect to another NLP subsystem. Higher order NLP subsystems process data within a stage after processing within the stage by one or more lower order NLP subsystems. In at least one embodiment, an NLP subsystem having a higher order has a prediction output quality value that is higher than a prediction output quality value of a lower order first NLP subsystem, which allows a higher order NLP subsystem to train a lower level NLP subsystem while generating a higher quality value output for use by a next stage to generate a prediction. The "quality value" indicates a determined accuracy of each prediction and response to ultimately generate an accurate human-perceived response to the NL statement. In at least one embodiment, the first NLP subsystem provides first level natural language processing. The first NLP subsystem includes at least one NLP model for each NL processing stage. The NLP models utilize predictive analytics to generate one or more predictions and a response to the natural language statement. The number of NL processing stages and NLP models is a matter of design choice. In at least one embodiment, the NL processing models include analytics specific to respective prediction problems and solutions. For example, in at least one embodiment, different NLP stages focus on different types of prediction problems. For example, predicting a domain of an NL statement represents one type of prediction problem. In the example of "turn on the light," the domain is an electronic light. Another prediction problem is determining an intent of an NL statement. In the foregoing example, the intent is a command to activate the light. More complex NL statements increase the complexity of the domain prediction, intent prediction, etc., and increase the complexity of responses to the NL statement based on the predictions. In at least one embodiment, each NL model scores a prediction generated by the NL model with a quality value. In at least one embodiment, each NL model includes both a subject matter model and a neural network.

In at least one embodiment, each stage of the NLP system includes one or more NL models, and each NLP stage solves a specific prediction problem a first NL model includes analytics that are specific to a particular problem, such as domain prediction, a second NL model is specific to another prediction problem, such as intent prediction, entity prediction, and so on. In at least one embodiment, the NL models of each NLP stage are specifically and respectively trained for domain prediction, intent prediction, entities extraction, entities normalization, fulfillment, and response generation prediction and response functions. Thus, in at least one embodiment, each stage may include one or multiple NL models to enhance the statistical confidence of the prediction of each stage.

Each higher order NLP subsystem is arranged in series with at least the first NLP subsystem because the higher order NLP subsystems have a higher, prediction output quality value than at least the first NLP subsystem. Thus, the higher order NLP subsystems are able to train lower order NLP subsystems. The number of NLP's in each stage of the NLP system is a matter of design choice. In at least one embodiment, in a two-order NLP system, the distribution of each NLP stage between the first order and second order NLP subsystems allows the first order NLP subsystem to be trained by the second order NLP subsystem while concurrently allowing the combined first and second NLP subsystems to provide non-test, actual responses to the NL statements. In at least one embodiment, at least during training of the first NLP subsystem, the first NLP subsystem generates one or more predictions for each NLP stage. The first NLP subsystem determines a quality value, such as a confidence level, such as a statistical confidence level or a combination of confidence levels, for each prediction of each NLP model. If the first order NLP subsystem determines that the confidence level is below a predetermined threshold for the respective NLP model, the prediction is transmitted to the second order NLP subsystem. The second order NLP subsystem then receives at least the NL statement, contextual data, and each prediction generated by the first order NLP subsystem. Receiving the prediction(s) and response(s) enhances the collective NLP system by potentially narrowing down prediction and response choices for the second order NLP subsystem, which increases the speed of NL processing for each NLP stage and for the NLP system representing the collection of the NLP subsystems.

Each stage of the second order NLP subsystem that receives a prediction output transmitted from the first order NLP subsystem then generates a prediction output for the NL statement. Each prediction generated by the ith stage of the second order NLP subsystem is both fed back to at least the ith stage of the first order NLP subsystem to train each NLP model of at least the ith NLP stage and is used to generate a final response from the NLP system, where "i" is an integer index representing a particular stage and ranges from 1 to N. N is an integer representing a total number of NLP stages of the NLP system. Thus, in at least one embodiment, the NLP system representing the collective of each NLP subsystem is further enhanced by being able to utilize each prediction and response of higher order NLP subsystem(s) to both train the lower order NLP subsystem(s) and to generate a final response by the NLP system. Furthermore, in at least one embodiment, the distributed and multi-staged NLP system allows for first order NLP subsystem training to occur concurrently with actual response generation by the NLP system.

Operational configuration of the NLP stages that utilize both the first and second order NLP subsystems is a matter of design choice. The NLP stages can operate in series, in parallel, or a combination of both series and parallel. In at least one embodiment, each ith stage of the NLP system includes an ith stage of the first order NLP subsystem configured in series with a corresponding ith stage of the second order NLP subsystem. In at least one embodiment, when the N NLP stages are cascaded in series, the prediction output of the (i−1) stage, i.e. the NLP stage preceding the ith stage, is also used as part of the input data for the ith stage, in addition to the NL statement and contextual data. In at least one embodiment, when the N NLP stages are configured in parallel, the prediction output of the ith stage of an NLP subsystem is used to train at least the ith stage of a lower order NLP subsystem and is also used as input data to a final response stage to determine a response to the NL statement.

Utilizing the predictions and responses of stages of NLP subsystems as input to one or more succeeding NLP stages also enhances the network by potentially improving the accuracy of the predictions and/s of each successive NLP stage and the response of the NLP system as a whole. In at least one embodiment, the NLP system finalizes a response to the statement using the outputs of each of the N NLP stages and provides the response to a requestor device.

In at least one embodiment, the NLP system includes a system monitor-controller to control transition sequencing from one NLP subsystem to another NLP subsystem. In at least one embodiment, sequencing from one NLP subsystem to another occurs in accordance with a standard operational supervised learning processor subsystem-to-subsystem transition sequencing process ("standard sequencing process") as, for example, described in OJOLABS001. In at least one embodiment of OJOLABS001, the standard sequencing process involves a particular stage of an NLP subsystem processing input data and generating a prediction. If a quality value of the prediction exceeds a particular threshold value, then the prediction is utilized to generate a response. If the quality value does not exceed the threshold value, the output of the NLP subsystem is transmitted to the next higher order NLP subsystem. However, circumstances arise when altering the standard sequencing process to change the routing of information can be advantageous to, for example, improve resource utilization, training quality, and/or processing speed.

In at least one embodiment, the system monitor-controller monitors process environmental data. In at least one embodiment, the process environmental data represents information about the circumstances, conditions, and system status information. Environmental process data includes operational conditions such as a current processing load (e.g. a number of users concurrently engaging with the NLP system and availability of higher order subsystems), processing latency of the NLP system in generating a response, and user status (e.g. engagement/conversational momentum as illustratively described in OJOLABS003-PROV). In at least one embodiment, the system monitor-controller dynamically determines if the process environmental data indicates initiation of dynamic subsystem processing sequencing. For example, if higher order subsystems are currently underutilized, the system monitor-controller dynamically alters the standard operational supervised learning processor subsystem-to-subsystem transition sequencing process ("standard sequencing process") to bypass one or more lower order subsystems and forward input data directly to one or more higher order systems. The system and process of dynamically sequencing NLP subsystem processing (i.e. resequencing NLP subsystem processing relative to the standard sequencing process) is a matter of design choice. In at least one embodiment, dynamic sequencing is accomplished by manipulating threshold values and/or providing direct data path control over the NLP subsystems. In at least one embodiment, if higher order subsystems are overburdened, the system monitor-controller dynamically alters the standard sequencing process to bypass one or more higher order subsystems. In another example, if the latency of processing within the NLP system exceeds a predetermined threshold, the system monitor-controller dynamically alters the standard sequencing process to increase the processing speed by, for example, bypassing one or more subsystems, models, or stages. In another example, if conversational momentum with a user falls below an acceptable level, the system monitor-controller dynamically alters the standard sequencing process to escalate processing to one or more higher order subsystems to improve the momentum. Although the system monitor-controller alters the standard sequencing process, training of lower order subsystems continues.

FIG. 1 depicts embodiments of a NLP system 100 that processes input data 102 to generate a response 104 to the NL statement 106. A requestor device(s) 108 transmits the NL statement 106 to a data processing system 110 via, for example, a communication network such as a wireless network and the Internet. The requestor device(s) 108 represents any device capable of sending the NL statement 106. In at least one embodiment, the requestor device(s) 108 represent multiple requestor devices. For example, the requestor device(s) 108 may be different for different NL statements. In other words, the requestor device(s) 108 may be a smart phone used by a user to submit an NL statement 106 and may be a tablet, laptop, or desktop computer, of a different user to submit another NL statement 106. The NL statement 106 can be transmitted in any type of format, such as a short message service (SMS) text message, multi-media message service (MMS) message, email, or voice-to-data transcription. In at least one embodiment, the data processing system 110 is separate from the NLP system 100 (as shown). In at least one embodiment, the data processing system 110 is included within the NLP system 100. In at least one embodiment, the input data 102 is the NL statement 106. In at least one embodiment, the data processing system 110 includes the NL statement 106 and enhances the input data 102 with contextual data 112 by, for example, assembling the input data 102 to associate the NL statement 106 with the contextual data 112. Including the contextual data 112 as part of the input data 102 provides context to the NL statement 106. In at least one embodiment, the data processing system 110 determines the contextual data 112 by analyzing available data about the requestor device(s) 108 and, in at least one embodiment, about a user of the requestor device(s) 108, and a history of conversations with the user. Exemplary contextual data in addition to the history of conversations with the user includes the location of the requestor device(s) 108, user personal data made available by the user including particular interests of the user, and user interest data submitted by the user, such as responses to a questionnaire. In at least one embodiment, the data processing system 110 communicates with one or more external data sources 113 to obtain information, such as information about the user. External data sources 113 include social media sites, such as a Facebook, Twitter, active external data sources, such as the multiple listing service (MLS) site for real property related predictions.

In at least one embodiment, utilizing data in the external data sources 113 can simplify a prediction problem by reducing a number of prediction possibilities. For example, when attempting to recognize an address contained in a natural language statement submitted to the NLP system 100, the data processing system 110 can access the MLS to obtain available addresses. The MLS is a near comprehensive source of real property for sale or lease. If an NL statement 106 requests information about property at a particular address, the correct prediction will be an address contained in the MLS database. Accordingly, reducing the possibilities of a prediction from all properties to a subset of properties simplifies an address prediction problem. The same prediction possibilities simplification by prediction set reduction can be applied to any other prediction problem when data exists to reduce the number of possible predictions. In at least one embodiment, user behavioral context data assists with determining an accurate prediction of an NL statement. For example, if a user that submitted is looking at a specific property on a web site or in an application, the NLP system 100 can make an assumption that the user is asking about the property. In at least one embodiment, if the user is physically located outside of a property for sale, as determined by, for example, global positioning system location data, the NLP system can assume the user might be asking about such property. In at least one embodiment, contextual data includes attributes about the user, conversation focus, topics from previous conversations, application use, or external customer relationship data, situational data determined by focus in an application or user physical location, or from the data sources that represent inventory or resources, the NLP system can use the data to reduce the prediction problem domain size to more efficiently determine a response.

Associating the contextual data 112 with the NL statement 106 can accelerate generation of the response 104 by the NLP system 100 by constraining, for example, the domain and intent of the NL statement 106. Additionally, in at least one embodiment, the NLP system 100 can also access external data source(s) 113 to fulfill the NL statement 106. "Fulfillment", in at least one embodiment, determines an answer to the NL statement 106 that is utilized to determine the response 104.

In at least one embodiment, the NLP system 100 includes an optional NLP process initiator 122 to improve utilization time of the NLP system 100. In at least one embodiment, the NLP process initiator 122 monitors input data 102 traffic to the NLP system 100. When the NLP system 100 has unused processing capacity available to process additional input data 102, such as after a predefined elapsed time after receipt of an instance of the input data 102 occurs, the NLP process initiator 122 determines that the NLP system 100 is not being utilized to process input data 102 and issues a data retrieval command to the requestor device(s) 108 to retrieve to-be-classified (TBC) data from a memory 120. When the NLP process initiator 122 determines that the NLP system 100 has unused processing capacity and issues the data retrieval command, the requestor device(s) 108 requests TBC data from the memory 120 and submits the TBC data as input data 102 to the data processing system 110. The NLP system 100 then processes the input data 102 as described herein. In at least one embodiment, the TBC data in memory 120 is a collection of NL statements that are obtained from, for example, trusted and non-trusted entities, data training sets, data retrieved from the external data source(s) 113, and/or modifications of previously received NL statements.

In at least one embodiment of the NLP system 100 that includes the NLP process initiator 122, the requestor device(s) 108 includes an event handler that can be implemented in, for example, software and/or hardware, that responds to the retrieval command. In at least one embodiment, the NLP process initiator 122 passively monitors the input data 102 traffic utilizing data traffic monitoring technology.

In at least one embodiment, the requestor device(s) 108 do not monitor the capacity of NLP system 100 and retrieve new data when the NLP system 100 is idle. In at least one embodiment, the multiple requestor device(s) 108 are prioritized by a ranking scheme to prioritize processing. In at least one embodiment, the ranking scheme operates so that requestor device(s) 108 submitting live NL statements are given highest priorities and their input data is processed strictly in a First In First Out order. Requestor device(s) 108 retrieving TBC data operate at a lower priority. In at least one embodiment, a subset of the requestor device(s) 108 retrieves TBC, such as hundreds of thousands of NL statements at a time. This subset of requestor device(s) 108 send all of retrieved NL statements to the data processing system 110 at once, and the data processing system 110 maintains the received input data in a queue until the NLP system 100 is not processing live NL statements. Then, the data processing system 110 sends queued data to the NLP system 100 for processing until a live NL statement is received for processing, which increases the utilization of the NLP system 100. A "live" NL statement refers to an NL statement that is received by a requestor device 108 from a user in real time.

Thus, increasing the utilization of the NLP system 100 improves the cost-effectiveness of the NLP system 100 by processing larger volumes of data and increases the training of the NL models and, thus, in at least one embodiment, increases the quality values of the outputs of the NL models to realize at least the advantages described herein.

The NLP system 100 includes N NLP subsystems NLP-1, NLP-2, . . . NLP-N, with each NLP subsystem configured with M NLP stages. N is the integer index and is greater than or equal to two (2). The order of the NLP subsystems increases with an increasing index, i.e. subsystem NLP-1 is a lower order than subsystem NLP-2, and so on. Thus, subsystem NLP-2 has a prediction output quality value that is higher than a prediction output quality value of subsystem NLP-1 and so, which allows the higher order NLP subsystem(s) to train one or more lower level NLP subsystem(s) while generating a higher quality value output for use by a next stage of the NLP subsystems NLP-1 through NLP-N to generate a prediction. The value of N is a matter of design choice. Since the value of N represents the number of NLP subsystems in the NLP system 100, in at least one embodiment, increasing the value of N increases the order of the NLP system 100. For example, for N equal 2, the NLP system 100 is a second order system, for N equal 3, the NLP system 100 is a third order system, and so on. In at least one embodiment, the value of N is set so that the NLP subsystems have a high enough order to generate an output with a high enough quality value to concurrently train one or more lower order NLP subsystems and each stage of the NLP system 100 has a high enough prediction output quality value to be used in the generation of a response by the NLP system 100 to the NL statement 106.

To further improve, for example, utilization, effectiveness, performance, user engagement, and effectiveness, NLP system 100 includes a system monitor-controller 101. During standard operation, the NLP system 100 operates in accordance with a standard operational supervised learning processor subsystem-to-subsystem transition sequencing process ("standard sequencing process"). The standard sequencing process is described in more detail below, and OJOLABS001 represents an embodiment of a standard sequencing process. The system monitor-controller 101 receives and monitors the process environmental data 103 to actively determine and dynamically control an altered, dynamically changed supervised learning processor subsystem-to-subsystem transition sequencing process ("dynamic sequencing process") when conditions indicate that altering (resequencing) the standard sequencing process is desirable.

In at least one embodiment, the process environmental data 103 represents information about the circumstances, conditions, and system status pertinent to balancing the objectives of the NLP system 100, such as providing efficient, high quality model training, providing a high quality response 104, and keeping users engaged with the NLP system 100 all within a reasonable time frame. The particular data and data sources for the environmental process data 104 are matters of design choice.

In at least one embodiment, the NLP system 100 obtains internal system data from the data processing system 110 and/or from within the NLP subsystems. In at least one embodiment, each NLP subsystem provides feedback via feedback channels that is stored as a subset of the environmental process data 103 and accessible to the system monitor-controller 101 to assess the internal system state of the NLP system 101 and particularly the internal system states of the subsystem NLP's. For example, the internal system state data include the current processing load and processing latency of the subsystem NLP's. Internal system data further includes, for example, the number of NL statements currently being processed by the NLP system 100 and/or the number of NL statements currently in a processing queue in the data processing system 110 or NLP system 100.

Internal system data can also include the number of concurrent users of the NLP system 100 and operational condition data, such as a current processing load (e.g. a number of users concurrently engaging with the NLP system and availability of higher order subsystems), processing latency of the NLP system in generating a response, and user status (e.g. engagement/conversational momentum as illustratively described in OJOLABS003-PROV). External environmental process data includes, for example, positive or negative feedback from a user of the NLP system 100. Thus, by initiating the dynamic sequencing process, the system monitor-controller 101 alters routing of data to be processed from the standard sequencing process.

In at least one embodiment, although utilizing a higher order NLP subsystem at least generally provides as accurate or more accurate predictions than a lower order NLP subsystem(s), one or more reasons generally exist to operate in the standard sequencing process, which causes the NLP system 100 to not use higher order NLP subsystems unless the prediction of the lower order NLP subsystem has a quality value that does is less than a predetermined quality value threshold. In at least one embodiment, human operated, higher order machine NLP subsystems integrate with lower order machine-only NLP subsystems to provide an accurate response, concurrent machine NL model training to increase machine NLP prediction quality values, and reducing over time the number and, thus, the cost of human operated machine NLP subsystems and/or increasing the taxonomy (such as domain and intent scope) of the NLP system. Thus, in at least one embodiment, the human operated, higher order machine NLP subsystems integrate with lower order machine-only NLP subsystems is technologically seamless, transparent to a user, and provides unparalleled accuracy with concurrent training and faster commercial availability. In at least one embodiment, the cost of using a higher order system is more expensive than a lower order system. For example, a human operated NLP subsystem may be more expensive to operate due to labor costs than utilizing an automated, machine NLP subsystem. So, training the lower order system well to improve the quality value of the lower system allows a higher order system to be utilized less, which, in at least one embodiment, reduces the overall cost of operating the NLP system. As described herein, in at least one embodiment, the system monitor-controller 101 exercises dynamic sequencing process when indicated by balancing the objectives of the NLP system 100, such as providing efficient, high quality model training, providing a high quality response 104, and keeping users engaged with the NLP system 100 all within a reasonable time frame.

In at least one embodiment, the NLP system 100 processes each prediction and response problem in respective stages distributed across multiple NLP subsystems in accordance with either the standard sequencing process or a dynamic sequencing process determined by the system monitor controller 101. As discussed in more detail in conjunction with FIG. 2, the NLP system 100 includes M stages that are distributed across the network of subsystems NLP-1 through NLP-N. M is an integer index that is greater than or equal to two (2) and, in at least one embodiment, is independent of the value of index N. In at least one embodiment, M is determined by the number of prediction problems and a response generated by the NLP system 100. For example, in at least one embodiment, to generate predictions for one problem and generate one response, the value of M is two. To generate predictions for a (1) domain, (2) intent, (3) entity normalization, (4) fulfillment, and (5) response, in at least one embodiment, the value of M is five (5).

At least the first subsystem NLP-1 includes a NL model NL model-1.1 through NL model-1.M for each of the M stages of the NLP system 100. In at least one embodiment, each NL model is designed to solve a particular prediction problem using a subject matter model for the problem and a trainable neural network to ultimately generate a response to the NL statement 106. For example, in at least one embodiment, NL model 1.1 solves a domain prediction problem, NL model 2.1 solves an intent prediction problem, (3) NL model 3.1 solves an entity normalization problem, NL model 4.1 solves a fulfillment problem, and (5) NL model 5.1 solves a response problem. Models in each stage of one or more subsystems NLP-2 through NLP-N can also be configured to solve the problem corresponding with the respective stages. Each model in each stage can be represented by one or more sub-models. When the model is represented by multiple sub-models, the NLP subsystem utilizes the sub-models in concert to collectively generate a prediction output. In at least one embodiment, the sub-models are incorporated into the NLP system 100 and/or are third party NLP processors. In at least one embodiment, the number of sub-models depends on the complexity of the subject. For example, if determining a domain of an NL statement is more complicated than determining intent, then the domain related model may contain more sub-models than the intent related model. In at least one embodiment, when multiple sub-models are utilized and there is no consensus prediction from each sub-model, i.e. at least one sub-model generates a prediction that differs from at least one other sub-model, then determining which prediction to choose is a matter of design choice. In at least one embodiment, the NLP system utilizes a cluster voting scheme to choose a prediction from multiple sub-models. The particular cluster voting scheme is a matter of design choice. For example, a numerically ranked cluster voting scheme chooses a prediction generated by highest number of sub-models. A majority cluster voting scheme requires a majority of sub-models to agree on the same prediction; otherwise, the NLP system automatically escalates NL processing to a next higher order NLP subsystem. In at least one embodiment, weights are added to a prediction sub-model based on a confidence level of the sub-model, and the weights increase or decrease voting strength of a sub-model. Additionally, in at least one embodiment, some models may not need training. For example, in at least one embodiment, some models or sub-models do not need training. For example, a rules-based model or submodel has a programmatically defined function that does not change over time. For example, keyword recognition rules-based model utilizes a defined function to identify keywords and, thus, also simplifies the prediction problem by reducing a set of possible prediction outcomes.

Additionally, the order of processing by the M stages is a matter of design choice. The M NLP stages can operate in series, in parallel, or a combination of both series and parallel. In at least one embodiment, each ith stage of the NLP system 100 includes an ith stage of the first order subsystem NLP-1 configured in series with a corresponding ith stage of the second order subsystem NLP-2, and so on. In at least one embodiment, when the M NLP stages are cascaded in series, the prediction output of the (i−1) stage, i.e. the NLP stage preceding the ith stage, is also used as part of the input data for the ith stage, in addition to the NL statement 106 and contextual data 112. In at least one embodiment, when the M NLP stages are configured in parallel, the prediction output of the ith stage of an NLP subsystem is used to train at least the ith stage of a lower order NLP subsystem and is also used as input data to a final response stage to determine a response to the NL statement. Additionally, the number of NLP subsystems used per NLP stage and the particular NLP subsystems used per NLP stage is a matter of design choice. For example, each of the M NLP stages can utilize all the NLP subsystems NLP-1 through NLP.N or can use different proper subsets of NLP subsystems. For example, the ith NLP stage could use NLP subsystems NLP-1 and NLP-3, and the nth NLP stage could use, for example, NLP subsystems NLP-2 and NLP-3, NLP-2 or NLP-4, NLP-1, NLP-2, and NLP-3, and so on. Thus, in at least one embodiment, a particular NLP subsystem may be better trained within a particular subject area. For example, for human operated NLP subsystems, one human operator may have sufficient expertise for one area of interest, such as domain predictions, but may not have sufficient expertise in another area of interest, such as intent, normalization, or response predictions. Thus, in at least one embodiment, a first human may operate the mth stage model of the ith NLP subsystem, a second human may operate the nth stage model of the jth NLP subsystem, the first human, the second human, or a third human may operate the pth stage model of the kth NLP subsystem, and so on. The same concept of level of expertise can also be applied to automated machine NLP processors. This flexibility to match expertise to specific models within NLP subsystems can increase the efficiency of the NLP subsystem by optimizing resources that reduces a probability of escalating to higher order NLP subsystems to generate an accurate prediction.

In at least one embodiment, the NLP system 100 utilizes quality values, thresholds, and training decision logic to determine whether the accuracy of the output of a model in a stage of an NLP subsystem is sufficient to be utilized to generate the response 104 or whether increased accuracy and further training of the model is desired. The NLP system 100 includes N-1 training decision logic modules 114-1 through 114-N-1. Subsystems NLP-1 through NLP-(N-1) provide a quality value of a prediction output to respective training decision logic modules 114-1.1 through 114-(N-1).1. Each training decision logic module 114-1.1 through 114-N-1.M compares the quality value of the output of each stage 1 . . . M of each of respective subsystems NLP-1 through NLP-N-1 to a respective threshold value TH-1.1 . . . TH-1.M through TH-(N-1).1 . . . TH-(N-1).M, where "114-X.Y" and "TH-X.Y", "X" refers to the order of the NLP subsystem, and "Y" refers to the stage number. For example, the decision logic module 114-1.M for the subsystem NLP-1 and the Mth stage compares the quality value of the output of the NL model-1.M with the threshold value TH-1.M. If the quality value of the output at the particular training decision logic module exceeds the respective threshold value, then (i) the output has an acceptable accuracy to be used to generate the final response 104 and the subsequent NLP subsystems are not used to further train the NL model that generated the output and so on for each NLP subsystem and (ii) for subsystems other than the first order subsystem NLP-1, the output is fed back by the generating NLP subsystem to one or more lower order NLP subsystems to train the one or more lower order subsystems. If the quality value of the output at the particular training decision logic module does not exceed the respective threshold value, then the output of the NLP subsystem is transmitted to the next higher order NLP subsystem to determine an output and quality value. In at least one embodiment, the foregoing decision and training process occurs for each of the subsystems NLP-1 through the second to last NLP subsystem, subsystem NLP-N-1.

In at least one embodiment, the NLP subsystems that generate quality values of the outputs, such as the outputs of subsystems NLP-1 through NLP-N–1, normalize all or a proper subset of the quality values. When normalized quality values are generated, a common threshold value and a common training decision logic module can be used. For example, if the quality value is a normalized statistical confidence level or combination of statistical confidence levels between 0.00 and 1.00, with 0.00 representing no confidence and 1.00 representing 100% confidence that the output is correct, a common threshold value TH can be set at one particular value, such as any number within the range of 0.95-1.00 such as 0.97. In at least one embodiment, the quality value of each stage of each NLP subsystem is a function of (i) a first confidence level representing a confidence level of a prediction as assigned by the NLP subsystem for the particular stage and NLP model and (ii) a second confidence level of NLP subsystem as assigned by the NLP system 100. Determination of the quality value from the one or more confidence levels is a matter of design choice. In at least one embodiment, the quality value is the product of the first and second confidence levels. Furthermore, if NLP subsystems generate a normalized quality value, the common threshold value TH can be used as the threshold value for all training decisions. Furthermore, the decision logic modules 114-1.1 . . . 114-N-1.M can also be embodied by a single decision logic module and either retrieve respective threshold values for comparison to NLP subsystem quality values or use the common threshold value TH to compare against normalized quality values.

For example, in at least one embodiment, for the nth stage of the ith order subsystem NLP-i, the subsystem NLP-i processes the input data 102 and any data including the outputs of the lower order NLP subsystems, such as NLP-(i−1). n is an integer index value, $n \in \{1, \ldots, M\}$, and $i \in \{1, \ldots, N-1\}$. Utilizing the outputs of lower order NLP subsystems whose quality value did not exceed the relevant threshold level, further enhances the NLP system 100 by identifying an output with a non-passing quality value and potentially preventing a recurrent selection of the output. The subsystem NLP-i generates an ith output with an ith quality value, and decision logic **114-*i*.n compares the ith quality value with the threshold value TH-i.n. If the ith quality value does not exceed the threshold value TH-i.n, then the ith output is transmitted to the i+1 order subsystem NLP-i+1. If the ith quality value exceeds the threshold value TH-i.n, then (i) the ith output is either transmitted to the n+1 stage of subsystem NLP-1 or otherwise used to generate the response data 104 and (ii) the ith output is fed back to the lower order NLP subsystems NLP-(1**) through NLP-(i−1) to train the models of the lower order NLP subsystems with the output of the subsystem NLP-i.

In a more specific example, for the 2nd stage of the subsystem NLP-2, the subsystem NLP-2 processes the input data 102 and the output of NLP-1. The subsystem NLP-2 generates an output with a quality value, and decision logic 114-2.2 compares the quality value with the threshold value TH-2.2. If the quality value does not exceed the threshold value TH-2.2, then the output is transmitted to subsystem NLP-3. If the quality value exceeds the threshold value TH-2.2, then (i) the output is either transmitted to the 3rd stage of subsystem NLP-2 or otherwise used to generate the response data 104 and (ii) the output is fed back to NLP subsystem NLP-1 to train the NL model 2.1 of the 2nd stage with the output of subsystem NLP-2.

In at least one embodiment, the system monitor-controller 101 can also utilize thresholds to implement a dynamic sequencing process and resequence processing between one or more NLP subsystems or models. The particular sequence alteration is a matter of design choice and, for example, depends on the reason for sequence alteration and available subsystem processing resources. For example, in at least one embodiment, alternative subsystem sequencing bypasses one or more lower and/or higher order subsystems. For example, when the momentum (as described in OJO-LABS003) present in the process environmental data 103 indicates that a user may disengage with the NLP system 100, the system monitor-controller 101 will intervene in the subsystem sequencing process to select a subsystem that has a higher likelihood of increasing the momentum with the user. In general, a higher order subsystem NLP-i, such as the highest order subsystem NLP-N, produces an output that has a quality value that equals or exceeds an output quality of any lower order subsystem NLP-1 through NLP-i−1. Accordingly, if the higher order subsystem NLP-i is available, system monitor-controller 101 selects the higher order subsystem NLP-i. The system monitor-controller 101 utilizes control channels to, for example, either manipulate threshold values or directly control selection and routing of input data to the selected higher subsystem NLP-i to generate an output. The control mechanism to implement dynamic subsystem sequencing is a matter of design choice. In at least one embodiment, the system monitor-controller 101 manipulates threshold values to control NLP subsystem sequencing. For example, in at least one embodiment, the system monitor-controller 101 sets the threshold values for subsystems NLP-1 to NLP-i−1 to a value that exceeds a highest possible subsystem quality value, which ensures exceeding threshold values TH-1.1-*i*-/.M so that the subsystems NLP-1 to NLP-i−1 will escalate to subsystem NLP-i.

The same approach of the system monitor-controller 101 adjusting threshold values to resequence subsystem processing can also be used to address other circumstances including load balancing when the a higher order subsystem NLP is over or under utilized or when the latency of one or more subsystems exceeds a determined threshold value that indicates, for example, reordering subsystem NLP sequencing or bypassing one or more subsystem NLP's. For example, the process environmental data may indicate that the higher order subsystem NLP-i is then-currently underutilized or overutilized. Accordingly, the system monitor-controller 101 can effect NLP subsystem load balancing by increasing threshold values of lower order subsystems to direct input data to the higher order subsystem NLP-i when the subsystem NLP-i is underutilized. Conversely, the system monitor-controller 101 can effect NLP subsystem load balancing by lowering threshold values of lower order subsystems to enable the output of the lower order subsystems to be used in generating response 104 and, thereby, restrict input data to the higher order subsystem NLP-i when the subsystem NLP-i is overutilized. Training of each model continues as described herein.

Dashed lines connect the system monitor-controller 101 to each threshold. The dashed lines indicate that altering one or more of the thresholds is one embodiment of how system monitor-controller 101 can control subsystem sequencing. In at least one embodiment, the system monitor-controller 101 is also or alternatively in direct communication with each subsystem NLP-1 to NLP-N. In at least one embodiment, system monitor-controller 101 receives output data from each subsystem NLP-1 to NLP-N, selects a subsystem NLP to receive the output data as input data, and provides the output data for access by the selected subsystem NLP for processing to effectively resequence the operational data flow between subsystem NLP's. The selection logic of the system monitor-controller 101 that selects the subsystem(s) NLP to bypass or reorder and to receive the output data is a matter of design choice. As discussed, in at least one embodiment the selection logic analyzes the process environmental data 103 and determines which subsystem(s) NLP is(are) best equipped to address the then-current or expected circumstances, conditions, and system status pertinent to balancing the objectives of the NLP system 100, such as addressing load balancing, latency, and momentum.

In at least one embodiment, alternative subsystem sequencing reorders one or more more the M stages. In at least one embodiment, the NLP system 100 selects the order of NLP subsystem processing and whether to bypass an NLP subsystem based on output of a previous NLP subsystem or time. For example, if an NLP subsystem identifies a input as inconsequential conversation (e.g. chit chat) or a command, subsequent NLP subsystem processing proceeds directly to response generation. In at least one embodiment, the configuration of the M stages with relation to each other is a matter of design choice. In at least one embodiment, the M stages are configured in series with each preceding stage providing input to each subsequent stage, and the last stage-M generating the response 104. In at least one embodiment, the M stages are configured in parallel so that the output of each stage is not provided as input to a subsequent stage. The output of each stage is processed by the NLP system 100 to generate the response 104. In at least one embodiment, the M stages are configured in a combination of both parallel and series configurations so that the output of a proper subset of stages are not fed back to another stage. The output of each stage is processed by the NLP system 100 to generate the response 104.

In at least one embodiment, the NLP system 100 also utilizes one or more non-NL model(s) 116 to process data output data of one or more of the M stages. For example, in at least one embodiment, the output of ith stage and the input data 102 is processed by a non-NL model 116 that includes a rules based engine to determine an output in accordance with pre-defined rules. A fulfillment model that determines an answer to the NL statement 106 represents one embodiment of model 116.

Utilizing the predictions and responses of stages of NLP subsystems NLP-1 through NLP-(N-1) as input to one or more succeeding NLP stages also enhances the network by potentially improving the accuracy of the predictions and/s of each successive NLP stage and the response of the NLP system 100 as a whole. In at least one embodiment, the NLP system 100 finalizes a response 104 to the NL statement 100 using the outputs of each of the NLP stages 1 through M and provides the response 104 to device 118. The nature of the response 104 depends in part on the purpose of the response 104. In at least one embodiment, the NL statement 106 is a question submitted by the user of the requestor device(s) 108, and the response 104 is an answer to the question. In this embodiment, the device 118 is the requestor device(s) 108, and the answer is provided to the requestor device(s) 108. In at least one embodiment, the NL statement 106 is a command or other statement that alters the operation or otherwise causes device 118 to respond by, for example, operating in accordance with the command. For example, in at least one embodiment, the device 118 is a mold for curing rubber, and the response 118 is a command to open the mold. In at least one embodiment, the device 118 is a robot, a component, system, or other type of product manufacturing system, an assembly line system, a pharmaceutical manufacturing system, a food processing plant, an electronics assembly machine, a vehicle such as an automobile, marine vehicle, or fixed or rotor wind aircraft, a smart device, such as a smart plug or smart switch, or any other type of device 118 whose operation responds to the response 118. In at least one embodiment, device 118 is communicatively coupled to the NLP system 100 via a data communication network such as the Internet or a private local area or wide area network.

Figure 2:
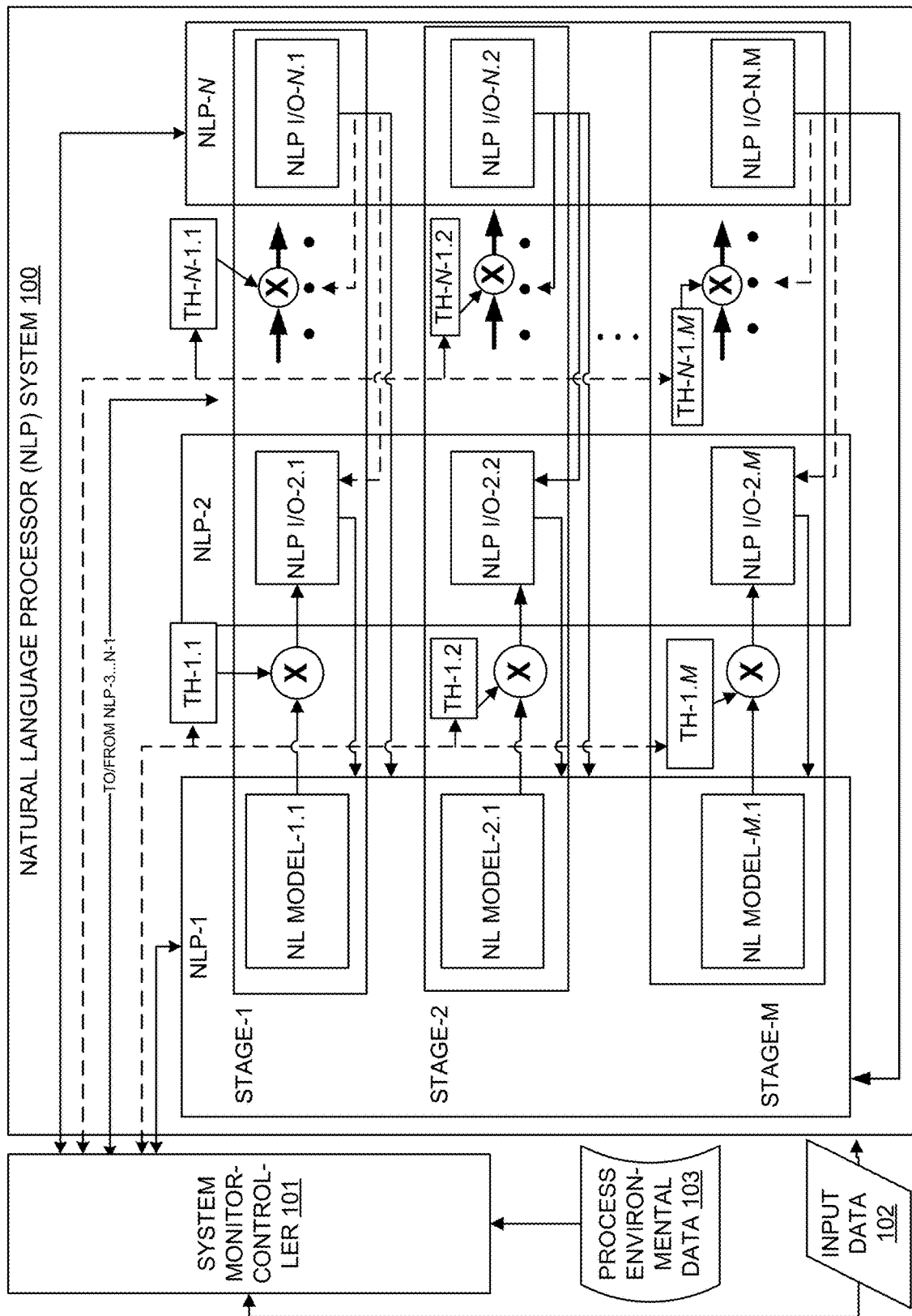
FIG. 2 depicts the NLP system of FIG. 1 having dynamic routing and a distribution of multiple NLP stages across a network of multiple NLP subsystems.

FIG. 2 depicts NLP system 100 having a distribution of the M NLP stages across the network of N NLP subsystems and also includes the system monitor-controller 101 and process environmental data 103, which function as described in conjunction with FIG. 1. In at least one embodiment, the system monitor-controller 101 receives feedback data, such as status data, load data, latency data, threshold value data, and output data from each of the stages 302-316. The feedback data represents at least a subset of the environmental process data 103 (FIG. 1). In at least one embodiment, the system monitor-controller 101 monitors the environmental process data 103 and can resequence intersubsystem and intrasubsystem stage processing to for example, balance load and performance of each stage. In at least one embodiment, subsystem NLP-1 processes the input data 102 using M natural language models NL model-1.1 through NL model-1.M with each respective stage 1 through M using a respective NL model. The subsystems NLP-2 through NLP-N are depicted with M natural language processors input/output (I/O) NLP I/O-2.1 through NLP I/O-2.M through NLP I/O-N.1 through NLP I/O-N.M using one NLP I/O per NLP subsystem per stage. In at least one embodiment, each NLP I/O represents one or models that generate outputs having at least as high a quality value as the NLP I/O of a lower order NLP subsystem. In at least one embodiment, at least the NLP I/O's of the last, Nth NLP subsystem are one or more human operators that review each output of subsystem NLP-(N−1) that does not have a quality value that exceeds the respective threshold value. Even with a human operator of the distributed network of lower order NLP subsystems enhances the NLP system 100 by narrowing alternative response choices for the human operator and reducing the workload of the human operator by bypassing a human-operated Nth NLP subsystem when the quality value of a lower order NLP subsystem exceeds the threshold value. Additionally, as described, a cluster of NLP subsystem sub-models can enhance the quality of a prediction, and the NLP process 400 allows the sub-models to be concurrently trained by concurrently applying operation 412 to all sub-models.

Figure 3:
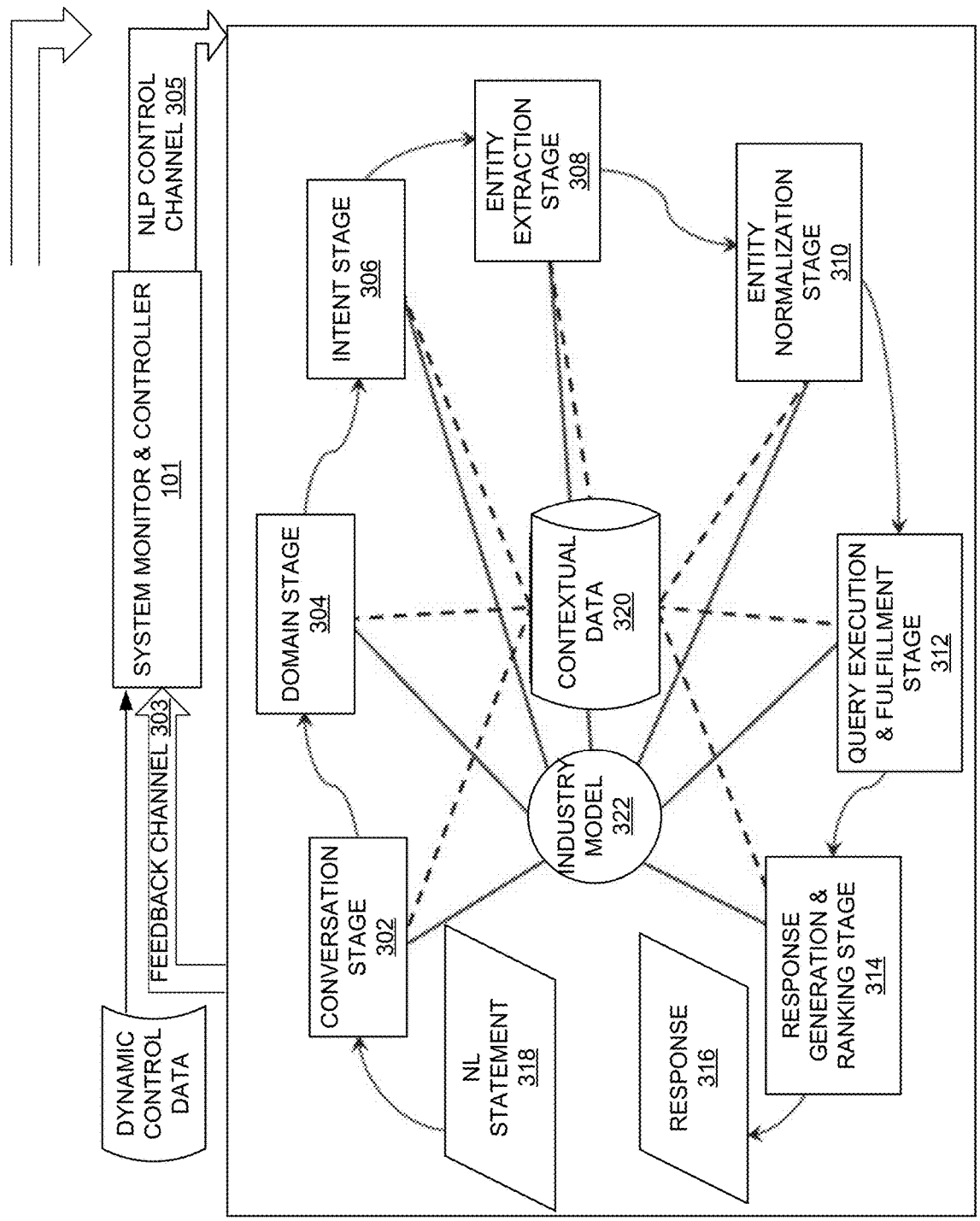
FIG. 3 depicts a natural language processing system 300, which represents one embodiment of NLP system of FIG. 1.

FIG. 3 depicts natural language processing system 300, which represents one embodiment of NLP system 100, and also includes the system monitor-controller 101 and process environmental data 103, which function as described in conjunction with FIG. 1. In at least one embodiment, the system monitor-controller 101 receives feedback data (through feedback channel 303), such as status data, load data, latency data, threshold value data, and output data from each of the stages 302-316. The feedback data represents at least a subset of the environmental process data 103 (FIG. 1). In at least one embodiment, the system monitor-controller 101 monitors the environmental process data 103 and can resequence intersubsystem and intrasubsystem stage processing to for example, balance load and performance of each stage by exercising control over NLP system 300 subsystem process flow. In at least one embodiment, system monitor-controller 101 generates dynamic sequencing control data, such as manipulating threshold values, and provides the control data to NLP subsystems, including, in at least one embodiment, individual stages, via the NLP control channel 305. The NLP system 300 configures exemplary NLP stages 302-314, i.e. conversation stage 302, domain stage 304, intent stage 306, entity extraction stage 308, entity normalization stage 310, query execution and fulfillment stage 312, and response generation and ranking stages 314, in series so that the NLP system 300 generates a response 316 to the NL statement 318. As discussed in conjunction with FIGS. 1 and 2, the NLP stages 302-314 span across a distributed network of NLP subsystems (not shown in FIG. 3), such as subsystems NLP-1 through NLP-N(FIGS. 1 and 2). The NL statement 318 represents one embodiment of NL statement 106 (FIG. 1). Contextual data 320 represents one embodiment of contextual data 112 and includes conversation state data and user profile data. The conversation state data includes, for example, historical conversation data that may provide insight into the context of the NL statement 318. For example, if the conversation state data references a particular house that is for sale, and the NL statement 318 asks a question of "How many bedrooms are in the house?" and the particular house reference and the NL statement 318 occur within a same conversation thread or were at least in temporal close proximity, such as within 30 minutes, then the conversation state data provides insight that the NL statement 318 may refer to the same house as indicated in the conversation state data. The user profile data includes information about the user of the requestor device that transmitted the NL statement 318. The user profile data can also provide insight regarding the context of the NL statement 318 by allowing the NLP system 300 to access, for example, stored past messages associated with the same user, a location of the user, and other information about the user that, for example, assists in allowing the NLP system 300 to determine the context of the NL statement 318. All of the NLP stages 302-314 are depicted as connected to and utilizing the industry model 322 to generate predictions and responses. The industry model 322 represents the collection of NL models 1.1-M.1 and one or more the NLP I/O's (FIG. 2) for each of NLP stages 302-314. In at least one embodiment, the industry model 322 is the taxonomy of classification within which the NLP models choose predictions. In at least one embodiment, the industry model 322 represents the set of available areas of prediction choices.

Figure 4:
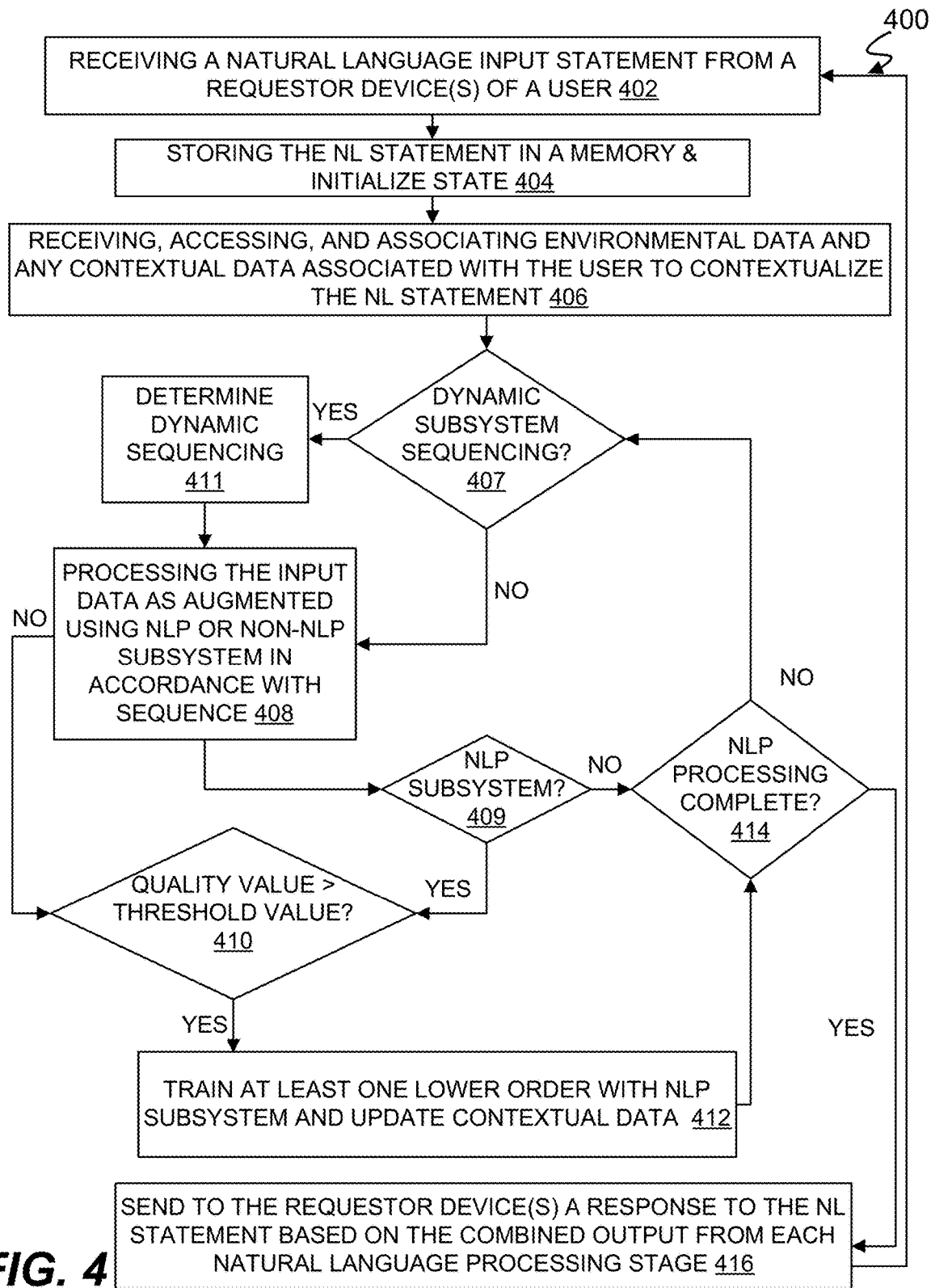
FIG. 4 depicts an exemplary NLP process including dynamic routing.
Figure 5:
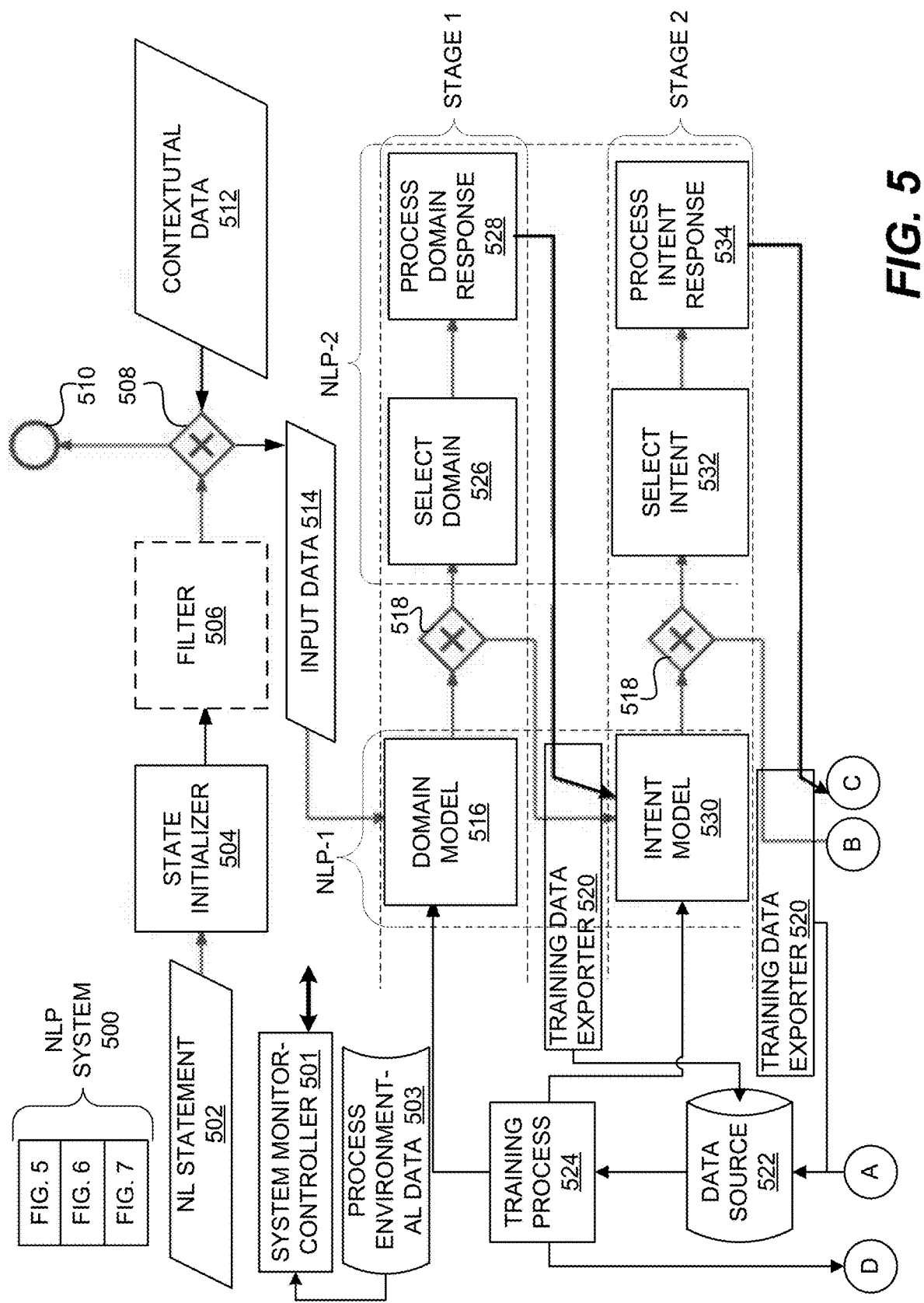
FIG. 5-7 depict an exemplary embodiment of the NLP system of FIG. 1.
Figure 6:
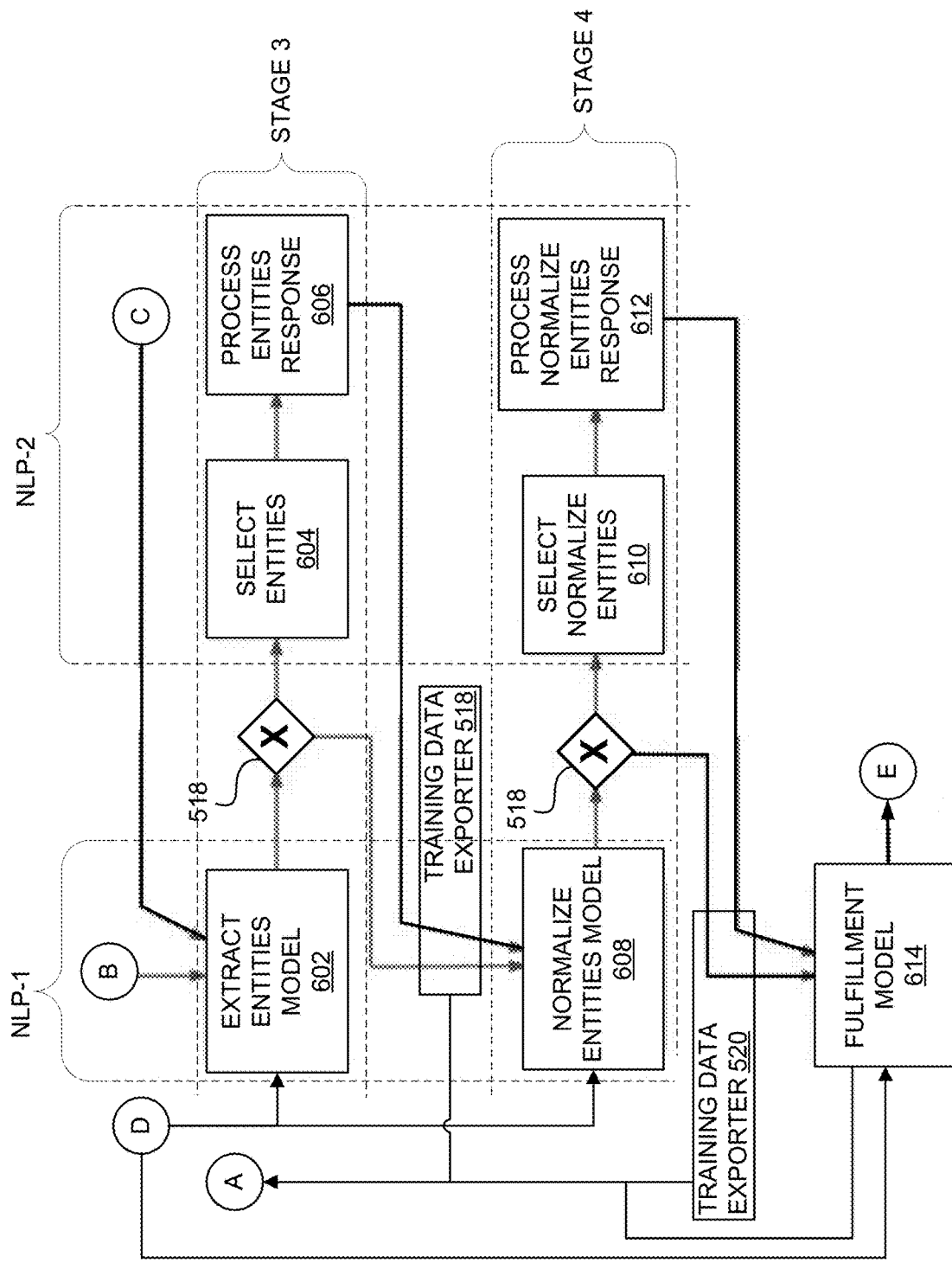
Figure 7:
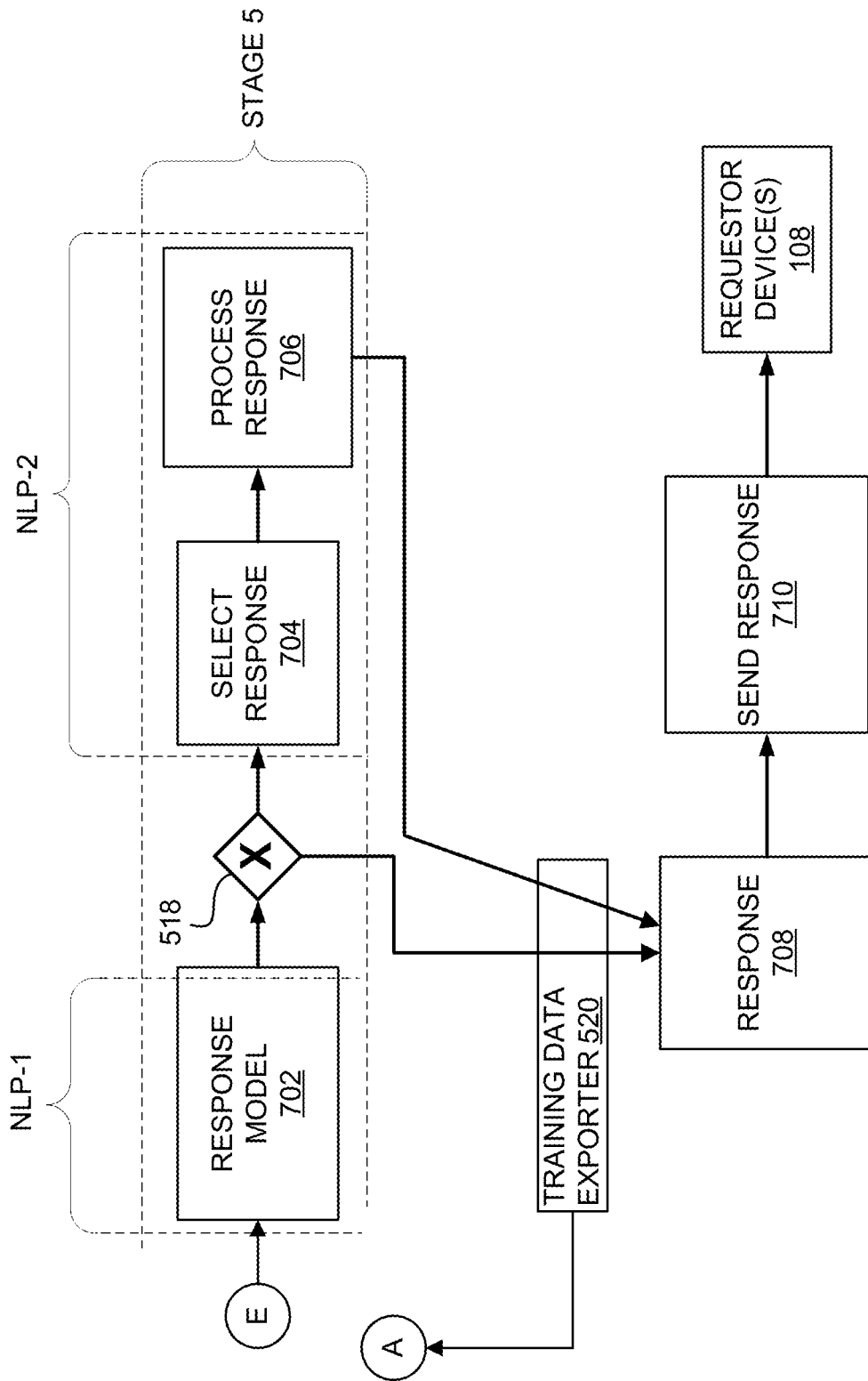
Figure 8:
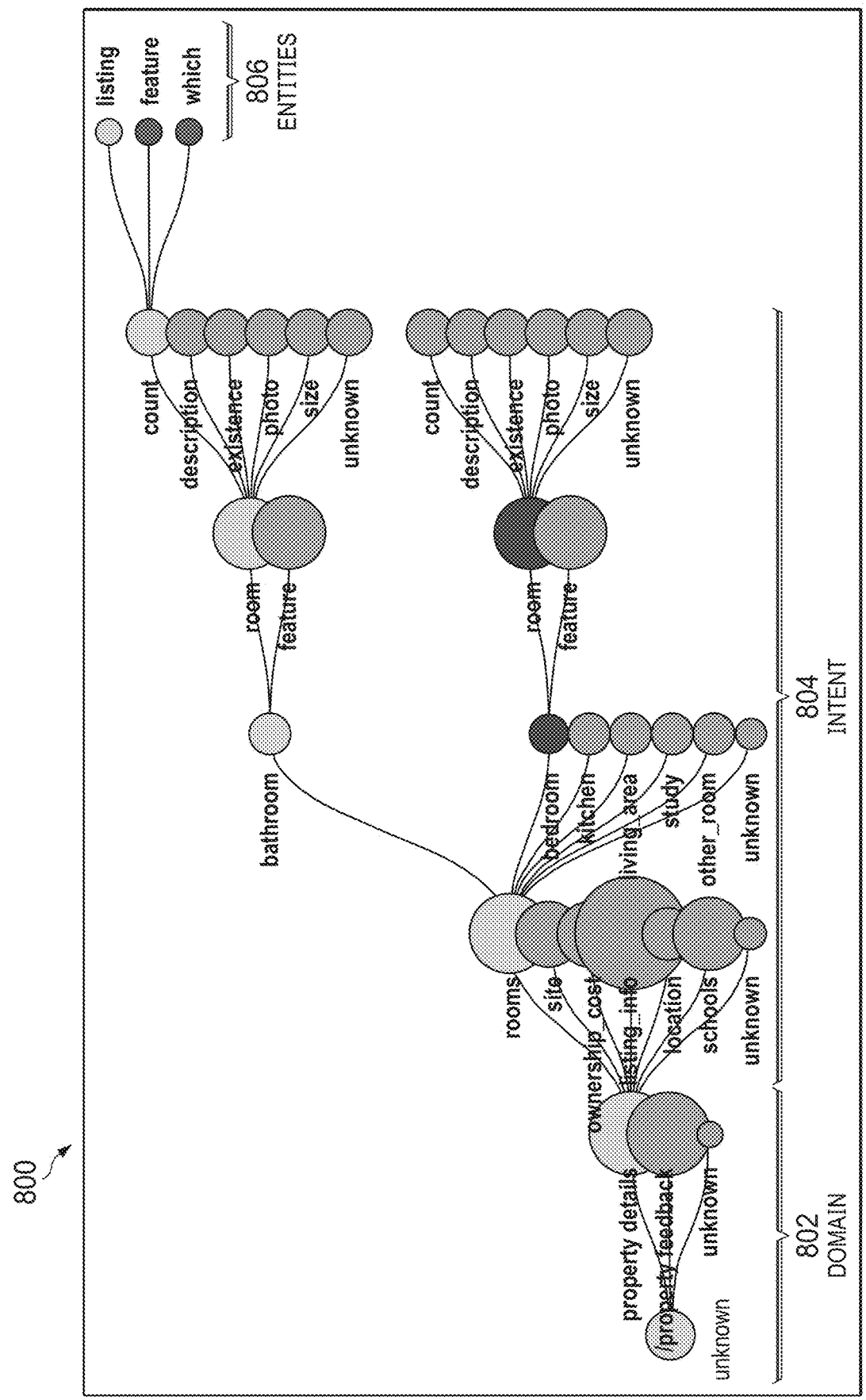
FIG. 8 depicts an exemplary taxonomy of NLP prediction categories.

FIG. 4 depicts an exemplary NLP process 400 utilized by the NLP system 100 and NLP system 500. FIGS. 5-7 collectively depict an exemplary NLP system 500 that represents one embodiment of the NLP system 100 and, in at least one embodiment, operates in accordance with NLP process 400. The NLP system 500 includes system monitor-controller 501 and environmental process data 503, which are respective embodiments of system monitor-controller 101 and environmental process data 103. The system monitor-controller 501 exchanges data within the NLP subsystems of FIGS. 5-7; however, the connecting arrows are not included to prevent obscuring the views. For NLP system 500, the number N of NLP subsystems is two (2). In at least one embodiment, the lower order NLP subsystem NLP-1 is a specialized natural language processing machine, and the higher order, second NLP subsystem NLP-2 is operated by a human. FIG. 8 depicts an exemplary taxonomy of NLP prediction categories. FIGS. 9-29 depict prediction and/processing pseudocode for NLP stages 302-314 (FIG. 3). The following description of FIGS. 4-29 utilizes exemplary data associated with an exemplary NL statement 502, and it will be understood by those of ordinary skill in the art after reviewing this description that the particular systems and processes discussed herein to develop responses and train NLP subsystems across a multi-NLP stage, multi-NLP subsystem network can be used with virtually any type of data. Additionally, the NL statement 502 may be accompanied by additional data in an incoming message such as user identification information, time stamps, and other information associated with the NL statement 502.

Referring to FIGS. 4-9, in operation 402, the NLP system 500 receives an NL statement 502 from a requestor device, such as requestor device(s) 108 (FIG. 1) of a user. The NL statement 502 represents one embodiment of NL statement 106 (FIG. 1). Operation 404 stores the NL statement 502 in a memory (not shown) and, the NLP system 500 initializes the state of NLP system 500 to begin processing the NLP statement 518 using a distributed network of two NLP subsystems (subsystems NLP-1 and NLP-2), and five NLP stages spanning across the subsystems NLP-1 and NLP-2. In at least one embodiment, the state initializer 504 can attach tracking data for, for example, experimental testing, or set a confidence level of specific NLP submodels, to, for example, set a high or low affinity to utilizing a human operated NLP subsystem. Optional filter 506 filters NL statements 502 that might be inappropriate for processing. For example, in at least one embodiment, filter 506 is a 'spam' filter that prevents processing of spam messages. If the filter 506 indicates that the NL statement 502 should not be processed, operation 508 flags and ejects the NL statement 502 as a non-processed message 510. In operation 406, the NLP system 500 receives, accesses, and associates available contextual data 512 associated with the user to contextualize the NL statement 502. In at least one embodiment, the contextual data 512 assists with narrowing possible predictions and responses by the NLP system 500 and, thereby, improves the quality value of natural language processing predictive analytics. The particular nature and sources of the contextual data 512 is a matter of design choice and a matter of availability. The NLP system 500 can access contextual data 512 from one or more available data source such a data source internal to NLP system 500 or external data source(s) 113 (FIG. 1). Internal data is, for example, data previously received and stored and/or analyzed by the NLP system 500. The NLP system 500 associates the contextual data 512 with the NL statement 502 to generate the input data 514 used by the subsystems NLP-1 and NLP-2. Stage 1 of the subsystem NLP-1 predicts the domain of the input data 518 using the domain model 516. The domain model 516 represents both a subject matter domain model and a neural network.

FIG. 9 depicts exemplary domain prediction input data 902 that includes an incoming message 904, which represents one embodiment of an NL statement 502. The particular format, representation language, elements (also commonly referred to as "tags"), organization, and other aspects of the incoming message is a matter of design choice. In general, a valid incoming message provides at least enough information to identify a customer, includes an NL statement, includes date and time data, and includes information to uniquely identify the incoming message. The incoming message 904 represents an exemplary incoming message with various, exemplary elements as described in Table 1:

TABLE 1

INPUT DATA

| ELEMENT NAME | ELEMENT DESCRIPTION |
| --- | --- |
| "id" | Unique identifier to identify the incoming message 904. |
| "body" | NL statement 906. |
| "receivedAt" | Time stamp indicating when the incoming message 904 was received. |
| "customerId" | Unique identifier assigned to the user of a requestor device who sent the incoming message 904. The customer identifier "customerId," allows the NLP system 500 to match the current user with contextual information previously supplied by the same user. |
| "isSpam" | Flag to indicate whether the filter 506 determined the incoming message 904 was spam or not by filter 506. A flag of "False" indicates the incoming message is not spam. A flag of "True" indicates filter 506 determined the message to be spam. |

The NL statement 906 for the domain prediction input data 902 is "How many bathrooms on the first floor?" The NLP system 500 is tasked with determining the explicit and inherent meanings of the NL statement 906 and appropriately responding to the NL statement 906. The NLP system 500 Stage 1 of the distributed NLP system 500 determines a prediction of a domain of the NL statement 906.

The domain prediction input data 902 additionally includes contextual data 908. FIG. 9 depicts exemplary contextual data 908 that allows the NLP system 500 to increase the accuracy of the predictions and responses relative to not having contextual data. In at least one embodiment, the contextual data 908 provides context for the user and for the incoming message 904. Contextual data for the customer includes information previously associated with a customer. For example, if the contextual data indicates that the customer has a real estate agent, the incoming message 904 has a higher probability of relating to real estate. The particular format, representation language, elements, organization, and other aspects of the contextual data is a matter of design choice. In at least one embodiment, contextual data for the incoming message includes one or more preceding messages associated with the customer and previous NL predictions and results associated with the one or more preceding messages. The contextual data 908 represents exemplary contextual data with various, exemplary elements as described in Table 2:

TABLE 2

CONTEXTUAL DATA

| ELEMENT NAME | ELEMENT DESCRIPTION |
|---|---|
| "customer:" | Begins information associated with the customer. |
| "data" | Begins specific data associated with the customer. |
| "agent" | Real estate agent associated with the customer. |
| "phoneNumber" | The real estate agent's phone number. |
| "facts" | Exemplary contextual data that begins information associated with a real estate property previously associated with the customer. |
| "Mls Constraint" | Real estate multiple listing service data, such as data available via Texas listing data tx_actris. |
| "Listing Status Constraint" | Listing status of real estate, e.g. active, pending, sold. |
| "id" | Unique identifier assigned to the user of a requestor device. |
| "phoneNumber" | Customer phone number. |
| "conversation" | Begins data related to past conversations, i.e. incoming message(s), associated with the customer. |
| "message" | Prior incoming message data including the prior NL statement 910. |
| "domain" | Data following "domain" represents domain prediction of the prior NL statement 910. |
| "intents" | Data following "intents" represents intent prediction of the prior NL statement 910. |
| "entities" | Data following "entities" represents entities prediction of the prior NL statement 910. |

The contextual data 908 includes information associated with the customerId, which in this embodiment is a user of an exemplary requestor device. The "customer" information includes agent, MLS (multiple listing service) data, and listing status, which indicates the customer previously engaged in a real estate related session. The contextual data 908 further includes a past "conversation" with message payload details and a prior NL statement 910 submitted by the customer in a recorded, previous incoming message. The contextual data 908 also includes previous natural language predictions generated by the NLP system 500 and associated with the NL statement 910. The prior NL predictions include determining the domain prediction, NLP system 500 matches the customerID with previously received messages and other accessible information about the user. Some information about the user has a relatively long 'shelf life,' also referred to as 'an extended expiration date.' In other words, some information about the user remains accurate over an extended period of time, e.g. 2 or more months. Examples of data about a user having an extended expiration date are a user's phone number and a user's interest data.

In operation 407, the system monitor-controller 501 monitors and accesses the environmental process data 503 and determines if the process environmental data 503 indicates initiation of dynamic subsystem sequencing. As previously discussed, one or more dynamic subsystem sequencing factors, individually or in combination, can indicate a desirability of dynamic subsystem sequencing. The factors are a matter of design choice and can include:

DYNAMIC SUBSYSTEM SEQUENCING FACTORS

Current Processing Load of the Supervised Learning Processor Subsystems
Processing Latency of the Supervised Learning Processor Subsystems
Current Operational Time
Current Operational Time and Date
Determined Momentum of a Current Communication Exchange with the User In at least one embodiment, the current processing load indicates the availability of one or more NLP subsystems, particularly higher order NLP subsystems, that are either under or over utilized. As previously discussed, in at least one embodiment, the system monitor-controller 501 can load balance for an underutilized, higher order NLP subsystem condition by bypassing lower order NLP subsystems and assuring that the higher order NLP subsystem receives data to be processed. The process of dynamically sequencing NLP subsystem processing so that the higher order NLP receives data to be processed is a matter of design choice. In at least one embodiment, when the higher order NLP is under utilized, the system monitor-controller 501 adjusts threshold values so that the quality value output of the lower order NLP subsystems is lower than the threshold value. Conversely, when the the higher order NLP is over utilized, the system monitor-controller 501 adjusts threshold values so that the quality value output of the lower order NLP subsystems is higher than the threshold value, thereby preventing sequencing of the NLP process to the over utilized, higher order NLP subsystems. Adjusting utilization of the higher order NLP subsystems effectively results in load balancing within the NLP system 500. Load balancing provides for the efficient utilization of processing resources. The system monitor-controller 501 can also reduce processing latency by, for example, lowering one or more thresholds to prevent escalation to higher order processing, or resequencing to bypass lower order NLP subsystems.

In at least one embodiment, the system monitor-controller 501 determines user engagement trends and correlates the trends with time(s) of day, dates, and/or days of the week. For example, utilization of the NLP system may increase during after-work hours, holidays, and weekends when users have available time. Additionally, when the system monitor-controller 501 detects user engagement momentum below a threshold, the system monitor-controller 501 can issue commands to take appropriate actions to increase the momentum, such as resequencing subsystem process order to escalate processing to a higher NLP subsystem.

In operation 407, the system monitor-controller 501 determines whether the dynamic subsystem sequencing factors indicate initiation of dynamic subsystem sequencing. If no, then the NLP system 500 operates in accordance with standard subsystem sequencing. If yes in operation 407, then in operation 411, the system monitor-controller 501 determines the dynamic subsystem sequencing that balances the objectives of the NLP system 500, such as providing efficient, high quality model training, providing a high quality response 708 (FIG. 7), and keeping users engaged with the NLP system 100 all within a reasonable time frame.

In accordance with the NLP subsystem processing sequence determined in operation 411 if operation 407 initiates dynamic subsystem sequencing or in accordance with standard subsystem sequencing, operation 408 processes the NL statement 502 utilizing the assembled input data 514, which may be augmented by subsequent NLP stages and, in at least one embodiment, augmented by a non-NL processor, such as a rules based model. NLP system 500 processes the input data 514 with NLP stages in accordance with the NLP subsystem processing sequence determined in operation 411 or in accordance with the standard sequencing process. The NLP subsystems can be configured in series; although, whether the NL statement 502 is processed by NLP stages configured in series, parallel, or a combination of series and parallel is a matter of design choice. Each NLP stage utilizes one or more NLP models to generate predictions in accordance with the NLP taxonomy 800 (FIG. 8). The taxonomy utilized by the NLP models represents an ordered solution of the ontological problem to be solved and is a matter of design choice. The particular taxonomy is generally designed for specific subject matter, such as real estate related NL statements, and includes nodes that become more specific upon traversal of the taxonomy. Additional exemplary subject matter contexts that can be included in the taxonomy include finance/mortgage, customer help desk/product feedback, insurance, moving, home maintenance, and home services. The NLP taxonomy 800 is partitioned into three segments, domain 802, intent 804, and entities 806. The domain 802 represents a general subject matter area. The intent 804 represents an interpretation of the NL statement 502 broken down into particular details from which the user's intent of the NL statement 502 can be determined. The entities 806 represents the final breakdown of the NL statement 502 into particular parameterization of the content of the NL statement 502. The particular segmentation boundaries of the NLP taxonomy 800 is a matter of design choice.

Each of the NLP models may use one or more prediction algorithms, such as the open source maximum-entropy software Maxent, support vector machines approach software (SVM), a recurrent neural network (RNN), a convolutional neural network (CNN), conditional random fields (CRF) software particularly useful for sequencing and labeling data, and/or hidden Markov models (HMM). Additionally, the particular NL processor of each NLP model is also a matter of design choice, and is, for example, one or more NL processor services that can be local to the NLP system 500 or remotely accessed third party NLP services available from API.ai of Google, Inc. of Mountain View, CA, wit.ai of wit.ai, Inc. of Palo Alto, CA, language understanding intelligent service (LUIS) of Microsoft Corporation of Redmond, WA, and/or Lex of Amazon.com, Inc. of Seattle, WA.

NLP stage 1 of NLP system 500 generates a domain prediction output using the domain model 516. In at least one embodiment, the domain model 516. In operation 408, the domain model 516 generates one or more predictions consistent with the domain section 802 of the taxonomy 800. The domain prediction choices in the domain section 802 of the taxonomy 800 are "property" or "unknown." The "unknown" category choice throughout the taxonomy is selected when a prediction or other outcome does not correspond to a category in the taxonomy.

In at least one embodiment, each NLP model of each NLP stage and each NLP subsystem of NLP system 500 determines a prediction quality value of each determined prediction. The NLP subsystem process and algorithms for determining the confidence level of each NLP model prediction output is a matter of design choice and is, for example, a softmax classifier process. Additionally, in at least one embodiment, the NLP system 500 also determines an NLP model confidence level of each NLP model using, for example, an Fi score as used in statistical analysis of binary classifications. In at least one embodiment, each confidence level individually or collectively represents an exemplary quality value. For example, a collective quality value can be computed by, for example, multiplying the confidence level determined by the NLP model and the confidence level in the NLP model, such as the Fi score, as determined by the NLP system 500. For simplicity, the following discussion assumes that the NLP system 500 has a 1.0 confidence level in each subsystem NLP-1 and NLP-2, and, thus, the confidence level determined by the subsystem NLP-1 represents the quality value that is compared with the threshold value in operation 410 for NLP subsystem NLP-1.

Operation 409 determines whether the output of operation 408 was generated by an NLP subsystem for which operation 410 determines whether the quality of the generated output is sufficiently high to use or for the process to advance to the next NLP subsystem within the stage. In at least one embodiment, the output of operation 408 is from a non-NLP subsystem, such as a rule-based model whose outcome is determined by a function of predetermined rules that include predetermined algorithms. If operation 409 determines that a non-NLP system generated the output of operation 408, NLP process 400 proceeds to operation 414 and otherwise proceeds to operation 410. In operation 410, for each lower order subsystem NLP-1 through NLP-N-1, i.e. for each NLP subsystem that is not the highest order subsystem NLP-N, the training decision logic module 518 determines whether the quality value of the domain model 516 exceeds a threshold value TH. The threshold value TH is a matter of choice and can be the same or different for one or more of the NLP stages. In at least one embodiment, the training decision logic 518 is the same for each stage, and the training decision logic 518 compares the same threshold value TH to an output quality value that equals the product of the NLP subsystem NL model confidence level and the NLP system confidence level in the NLP subsystem as determined by the NLP model with the NLP model confidence level as determined by the NLP system 500. In at least one embodiment, for the highest order subsystem NLP-N, operation 410 assumes the quality value of the highest order subsystem NLP-N exceeds the threshold value and proceeds directly from operation 408 to operation 414. In at least one embodiment, operation 410 also applies to the highest order subsystem NLP-N, and, if operation 410 determines that the quality value of the highest order subsystem NLP-N is not greater than the threshold hold value, then the NLP process 400 defaults out to a default process that indicates that a sufficiently confident prediction was not made in the NLP stage. The particular default process is a matter of design choice and includes, for example, requesting rephrasing or clarification of the NL statement 502 or requests intervention by a human operator who then communicates a response to the user.

If NLP processing is not complete, training decision logic 518 determines in operation 410 that the quality value of any prediction is greater than the threshold value TH. Next, in operation 412 the contextual data is updated for the next NLP stage with the prediction output of the previous NLP stage, and the updated input data 514 is provided to the lowest order NLP subsystem of the next stage. Also, in operation 412, the training data exporter 518 captures the determined prediction for training at least one lower order NLP subsystem. The training exporter 520 exports at least the prediction data and, in at least one embodiment, also exports the complete input data 514 including the incoming message and contextual data as updated. The data source 522 stores the exported data. A training process 524 accesses the exported data and trains the NLP model for which the exported data is applicable. For example, training process 524 trains NLP domain model 516 with domain prediction output data, trains NLP intent model 530 with intent prediction output data, and so on. Each NLP model can be trained at any desired time, such as after a predetermined time interval or after processing a predetermined determined number of NL statements. Generally, training process 524 trains models in the NLP system 500 concurrently with NL processing of actual, non-training data in accordance with a predetermined training schedule or any chosen criteria such as (i) time intervals, for example, in accordance with scheduled intervals, (ii) automatically occurring at approximately the same time while taking into account real-world delays that affect the exact times at which events occur, (iii) after a predetermined number of input objects such as NL statements have been processed. Training models updates the models for the purpose of increasing the quality value of model predictions.

FIG. 10 depicts exemplary domain prediction output data 1000. Each NLP model may have one or more prediction outputs. The exemplary domain prediction output data 1000 has two domain prediction options, domain prediction option 1 and domain prediction option 2. The "taxonomyVersion" indicates that particular version of the taxonomy 800 being used by NLP system 500. The particular taxonomy 800 can be modified to, for example, reflect new NL statement subject matter and/or to improve prediction output confidence levels. The element "domainResolved" has values of either "true" or "false," which indicate whether the domain model 516 analysis of the confidence level indicates that a prediction of the domain of the NL statement 502 has not been resolved. In this example, the domain model 516 has determined a "confidenceLevel" value of 0.75 out of 1.0 for domain output prediction option 1, which the domain model 516 is programmed to reject as a definitive domain prediction. The domain model 516 determines a predicted description of the NL statement 502. For domain output prediction option 1, the predicted description is "asking for details about a specific property listing." Based on this determination, for domain prediction option 1 the domain model 516 chooses that the domain segment 802 path "property details" in the taxonomy 800. The domain model 516 has determined a "confidenceLevel" value of 0.25 out of 1.0 for domain output prediction option 2, which the domain model 516 is also programmed to reject as a definitive domain prediction. For domain output prediction option 2, the predicted description of NL statement 502 is "an intent not captured by the other intents." Based on this determination, for domain prediction option 2 the domain model 516 chooses that the domain segment 802 path "unknown" in the taxonomy 800.

The training decision logic module 518 represents one embodiment of a training decision logic module 114. Assuming the NLP system 500 NLP model confidence level for the domain model 516 is 1.0 out of 1.0 and the threshold value is 0.90, in operation 410 the training decision logic module 518 compares 0.90 to 1.0*0.75 for the domain prediction option 1 and compares 0.90 to 1.0*0.25 for the domain prediction option 2. In both instances, the training decision logic 518 determines that the output quality is less than or equal to the threshold value. The NLP process 400 then proceeds to operation 408 for processing by the highest order NLP subsystem. If the output quality value was greater than threshold value, NLP process 400 proceeds to operation 412, and training decision logic module 518 provides the domain prediction input data 902 and domain prediction output data 1000 to stage 1 of subsystem NLP-2. If subsystem NLP-2 is a fully automated NLP subsystem, then the foregoing process is repeated in the same manner for subsystem NLP-2. In at least one embodiment, subsystem NLP-2 is a NLP subsystem that presents a human operator of the subsystem NLP-2 with data and prediction choices.

In at least one embodiment, each stage of the subsystem NLP-2 presents sufficient information to the human operator to increase the efficiency of the human operator in making an accurate prediction by providing a prediction starting point. Furthermore, training data exporter 520 provides the subsystem NLP-2 stage prediction to the lower order subsystem NLP-1 for training in accordance with operation 412.

Figure 11:
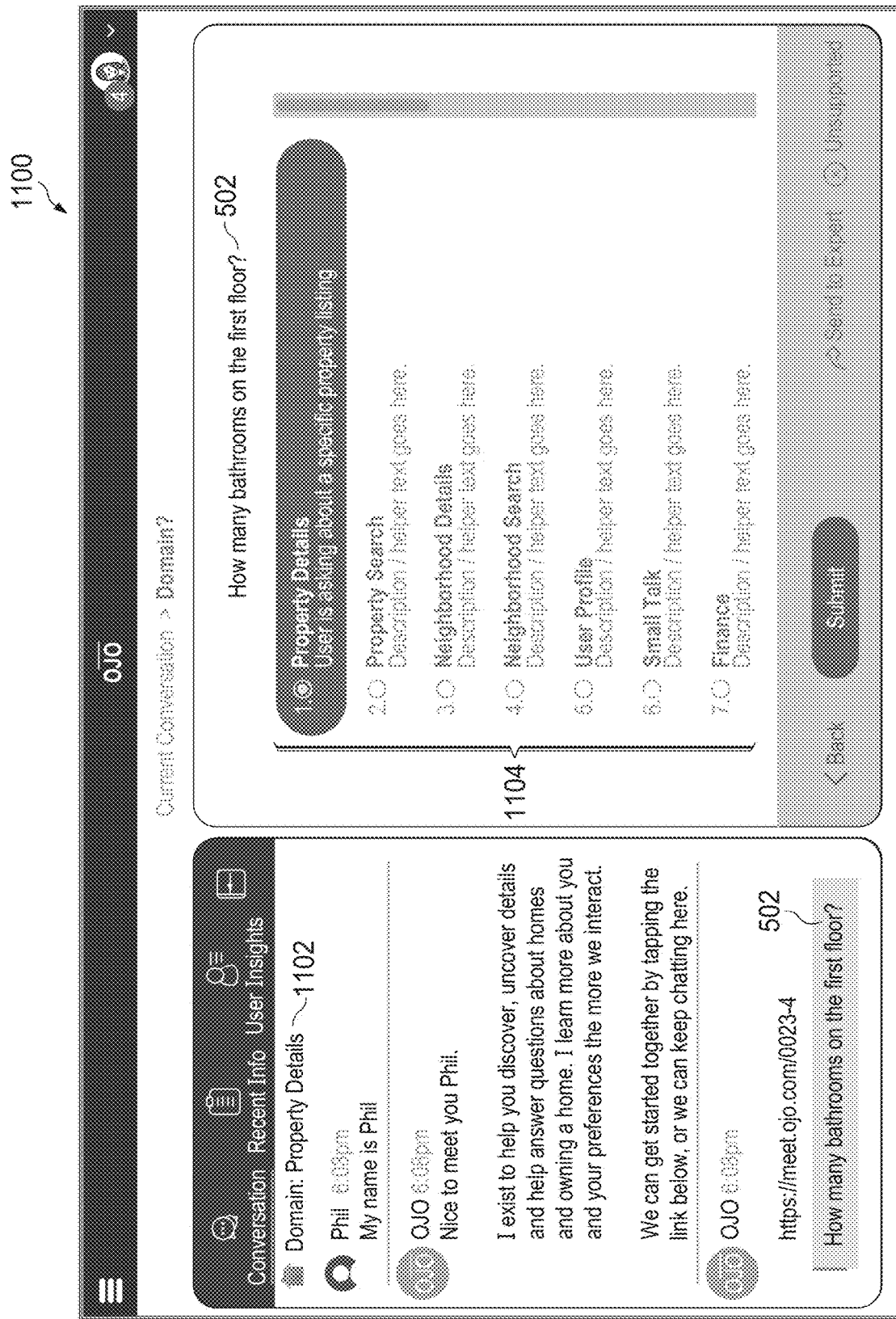
FIG. 11 depicts an exemplary subsystem NLP-2, stage 1 domain prediction user interface.

FIG. 11 depicts an exemplary subsystem NLP-2, stage 1 domain prediction user interface (UI) 1100. The subsystem NLP-2 presents the human operator a display using the select domain 526 module that includes the highest confidence domain prediction 1102, i.e. "property details," from subsystem NLP-2. The domain prediction UI 1100 also includes the NL statement 502 as received from the requestor device(s) 108 of the user. The domain prediction UI 1100 presents the domain prediction 1102 from the subsystem NLP-1 as the first choice in a list of seven possible domain prediction choices 1104. The human operator recognizes that the NL statement 502 of "How many bathrooms on the first floor?" has a domain prediction of Property Details and selects Property Details as the domain prediction and activates the "submit" button in the process domain response module 528 to submit the domain prediction for processing by operation 412. In operation 412, the training data exporter 520 exports the domain prediction of "Property Details" to data source 522, and training process 524 trains the domain model 516 to affirm that the domain model 516 made an accurate domain prediction. Accordingly, the quality level, e.g. the confidence level, of the domain model 516 will improve particularly when a future instance of the input data 514 matches or at least approximates the current input data 514. Operation 414 then determines that the NLP processing is not complete, and returns to operation 408 for processing the updated input data 514 with the intent model 530 of subsystem NLP-1. Referring back to operation 410, if the quality value of the domain model 56 had exceeded the threshold value TH, NLP process 400 also returns to operation 408.

The NLP process 400 then proceeds as previously described for each of the serially configured NLP stages 2-5 of NLP system 500. Subsystem NLP-1, stage 2 includes an intent model 530. FIG. 12 depicts exemplary intent prediction input data 1202. FIGS. 13-14 depict exemplary intent prediction output data 1300. Intent model 530 is designed process the intent prediction input data 1202, which is updated input data 514, and identify the taxonomy path in the intent 804 segment of the taxonomy 800. The contextual data 1204 is identical to the contextual data 908 except that the contextual data 1204, and, thus, the input data 514, has been updated with the domain prediction of stage 1, "domainSelection": "property details." In operation 408, the intent model 530 processes the intent prediction input data 1202 and generates the input prediction output data 1300.

The intent model 530 determines an intent prediction 1402 with a confidence level of 0.95. The intent prediction 1402 including the domain prediction as indicated in the intent segment 804 of the taxonomy 800 is "property details," "rooms," "bathroom," "room," and "count." The NLP process 400 proceeds from operation 409 to operation 410. In operation 410, the training logic model 518 determines that the quality value of 0.95 is greater than the threshold value of 0.90. The NLP process 400 then proceeds to operation 414 since there is no lower order NLP subsystem to train. If operation 410 had alternatively determined that the quality of the intent prediction 1402 was not acceptable as indicated by a comparison with the threshold value TH, the NLP system 500 would have provided at least the intent prediction 1402 and NL statement 502 to subsystem NLP-2 in a UI (not shown) of the select intent module 532. Then the human operator of subsystem NLP-2 would select an intent prediction with process intent response module 536 in the same manner as described in conjunction with the domain prediction of subsystem NLP-2, stage 1.

The NLP process 400 then proceeds as previously described to NLP stage 3 subsystem NLP-1. Subsystem NLP-1, stage 3 includes an extract entities model 602. FIG. 15 depicts exemplary entity extraction input data 1502. FIGS. 16-17 depict exemplary entities extraction prediction output data 1600. Extract entities model 602 is designed process the entity extraction prediction input data 1502, which is updated input data 514, and identify the taxonomy path in the entities 806 segment of the taxonomy 800. The contextual data 1504 is identical to the contextual data 1204 except that the contextual data 1504, and, thus, the input data 514, has been updated with the domain and intent predictions of stages 1 and 2, "intentSelection": "property details," "rooms," "bathroom," "room," and "count." In operation 408, the extract entities model 6-2 processes the entities extraction prediction input data 1502 and generates the entity extraction prediction output data 1600. The entities extract model 602 determines an entity extraction prediction 1702 with a confidence level of 0.85. The entities extraction prediction 1702 is that there are no "feature" or "which" entities in the NL statement 502, and the "listing" entity is a string of "61204 Mesa" and has a value indicating an MLS entity of tx_actris_1236567." The NLP process 400 then proceeds from operation 409 to operation 410. In operation 410, the training logic model 518 determines that the quality value of 0.85 is less than the threshold value of 0.90. The NLP process 400 then proceeds to operation 412 and provides the entity extraction prediction 1702 to stage 3 of the subsystem NLP-2.

Figure 18:
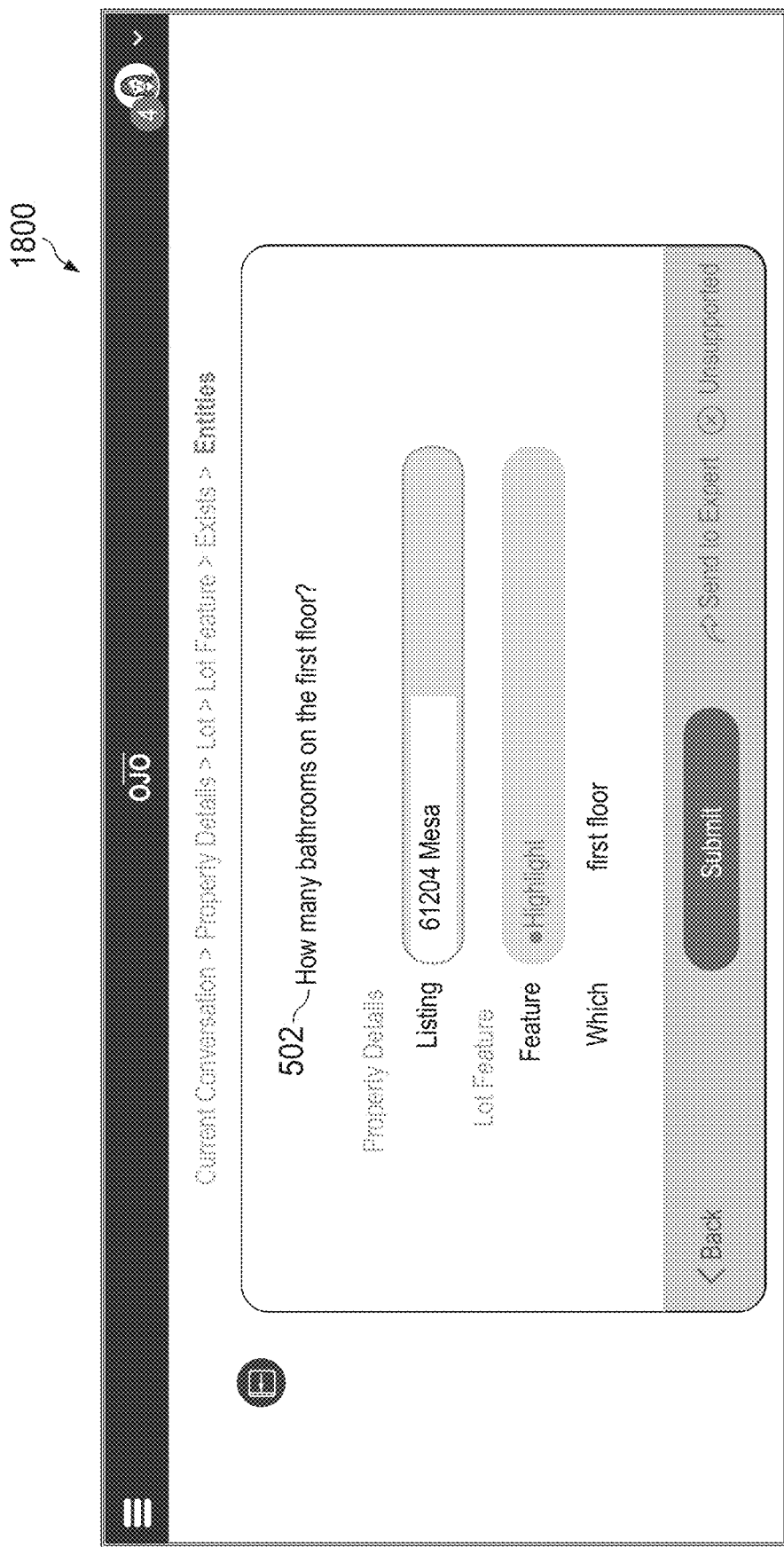
FIG. 18 depicts an exemplary subsystem NLP-2, stage 2 intent prediction UI.

FIG. 18 depicts an exemplary subsystem NLP-2, stage 2 intent prediction UI 1800. The subsystem NLP-2 presents the human operator a display using the select entities 604 module that includes the NL statement 502 and prepopulates the data for the entities Listing with "61204 Mesa", and leaves the Feature and Which entities blank as determined by subsystem NLP-1. Based on the contextual data 1504 and the NL statement 502, the human operator determines that the "listing" entity string of "61204 Mesa" is accurate, but the "which" entity should be "first floor." Accordingly, the human operator enters "first floor" in the "which" entity box and activates the "submit" button to submit the entities in the process entities response module 606. By selecting submit, the NLP process 400 proceeds to operation 412. In operation 412, the training data exporter 520 exports the entity extract prediction 1702 to data source 522, and training process 524 trains the extract entities model 602 with the human operator provided "listing" and "which" entity strings. Accordingly, the quality level, e.g. the confidence level, of the extract entities model 602 will improve particularly when a future instance of the input data 514 matches or at least approximates the current input data 514. Operation 414 then determines that the NLP processing is not complete, and returns to operation 408 for processing the updated input data 514 with the normalize entities model 608 of subsystem NLP-1. Referring back to operation 410, if the quality value of the domain model 56 had exceeded the threshold value TH, NLP process 400 also returns to operation 408.

The NLP process 400 then proceeds as previously described to NLP stage 4 of NLP system 500. Subsystem NLP-1, stage 4 includes a normalize entities model 608. FIGS. 19-20 depict exemplary entity normalization input data 1202. FIGS. 21-23 depict exemplary entity normalization output data 2100. Normalize entities model 618 is designed to normalize the extracted entity data in the normalization prediction input data 1900. In at least one embodiment, normalizing the extracted entity data involves converting prediction data into normalized data to allow the NLP system 500 to more efficiently generate a response and allow the NLP system 500 to utilize less memory space by reducing the possible variations of the entity data to be processed by the NLP system 500. The contextual data 1902 is identical to the contextual data 1702 except that the contextual data 1902, and, thus, the input data 514, has been updated with the extracted entity data of stage 1, "listing" "61204 Mesa," "feature" no value, and "which" "first floor." In operation 408, the entity normalization model 608 processes the entity normalization prediction input data 1902 and generates the entity normalization prediction output data 2100 "listing" of "61204 Mesa Rd Austin, TX 76543" and "which" "candidates" of "first floor," "second floor," and "third floor." The entity normalization model 608 determines an entity normalization prediction 2202 of "first floor" with a confidence level of 0.975 for the "which" entity. In operation 410, the training logic model 518 determines that the quality value of 0.975 is greater than the threshold value of 0.90. The NLP system 500 then proceeds to operation 412, and the training data exporter 520 exports the entity normalization prediction 2202 to data source 522, and training process 524 trains the normalize entities model 606 with the normalize entities model 608 "which" entity value of "first floor."

Additionally, in at least one embodiment, the entity normalization model 608 utilizes external inventory data from the MLS external data source as contextual data to reduce the set of addresses processed by entity normalization model 608 to addresses that are actually for sale or lease. Such set reduction can increase a probability of normalize the normalization prediction input data 1902 with a quality value that exceeds the threshold value. Having such contextual data simplifies the NLP problem to provide a more efficient and accurate result, especially when input data 514 is difficult to process. Operation 414 then determines that the NLP processing is not complete, and returns to operation 408 for processing the updated input data 514 with the normalize entities model 608 of subsystem NLP-1.

The NLP system 500 includes fulfillment model 614, which is a non-NLP, rules-based programmed processor. Referring to FIGS. 4, 6, and 24-27, the fulfillment model 614 receives the fulfillment input data 2400, contextual data 2402, and the normalized entities of NLP stage 4 as part of the contextual data 2404. From the domain, intent, and the normalized entities, the fulfillment model 614 is programmed to parse the contextual data 2202 and determine the count of the number of bedrooms on the first floor of address "61204 Mesa Rd Austin, TX 76543." In at least one embodiment, the fulfillment model 614 also has access to external data sources 113 (FIG. 1), such as an Internet accessible multiple listing service (MLS) database. Thus, in at least one embodiment, the fulfillment model 614 generates a query to the MLS database that requests the number of bedrooms on the first floor of 61204 Mesa Rd Austin, TX 76543. Additional external data sources that fulfillment model 614 can access include databases that are particular to a particular domain or human controlled devices, such as a phone capable of at least receiving messages, a tablet computer, or other data processing system. For example, in at least one embodiment, the fulfillment model 614 searches the contextual data 2202 for the contact information for the listing agent and sends a message to the phone number 15125550000 of the listing agent. In at least one embodiment, the fulfillment model 614 can request an answer from multiple sources. If the responsive answers form a consensus, then the fulfillment model 614 chooses the consensus answer. If the responsive answers differ, the fulfillment model 614 can apply a confidence value in the sources to determine which answer to choose, e.g. if a first external data source provides an answer "A" and a second external data source provides an answer "B", then fulfillment model 614 will choose the answer from the data source that the fulfillment model 614 is programmed to consider the most reliable data source. In at least one embodiment, the fulfillment model 614 determines that the answer is 'unknown.'

Referring to FIGS. 6, 26, and 27, the fulfillment model 614 determines a fulfillment output 2600 that includes the contextual data 2402 and 2404 from the fulfillment input 2400. The fulfillment output 2600 also includes the answer 2702 to the NL statement, which is "3." In at least one embodiment, to obtain the "answer" of 3, the MLS database responded to the query from the fulfillment model 614 with the answer "3". In at least one embodiment, the listing agent responded with the answer "3". Fulfillment output 2600 includes supporting data 2704 that forms the basis for the answer. The fulfillment model 614 saves the fulfillment output 2600 in data source 522 for access and use by, for example, the NLP stage 5 NLP subsystems to generate response 708. The fulfillment output 2600 and particularly the supporting data 2704 can also be accessed with a computer system external to NLP system 500 for analysis to, for example, assess the quality and/or capabilities of the fulfillment model 614.

Referring to NLP process 400, operation 409 determines that an NLP subsystem did not provide the most recent processing, operation 414 determines that NLP processing is not complete, and the NLP system 500 utilizes NLP stage 5 to determine a response to the NL statement 106. Subsystem NLP-1, stage 5 includes a response model 530. FIGS. 28 and 29 depict exemplary response prediction input data 1202. FIGS. 13-14 depict exemplary response prediction output data 1300. Response model 708 is designed process the response prediction input data 2800 and generate a response 708, which represents one or more embodiments of response 104 (FIG. 1). The contextual data 3002 is identical to the contextual data 2402 except that the contextual data 3002, has been updated with the fulfillment answer of "3" from the fulfillment model 614. In operation 408, the response model 702 processes the response prediction input data 2800 and generates the response prediction 3102 "It has 3 bathrooms on the first floor." The response model 708 determines a confidence level of 0.50 for the response prediction 3102. The NLP process 400 proceeds from operation 409 to operation 410. In operation 410, the training logic model 518 determines that the quality value of 0.50 is less than the threshold value of 0.90. The NLP process 400 then proceeds to operation 412 and provides the response prediction 3102 to stage 5 of the subsystem NLP-2.

Figure 32:
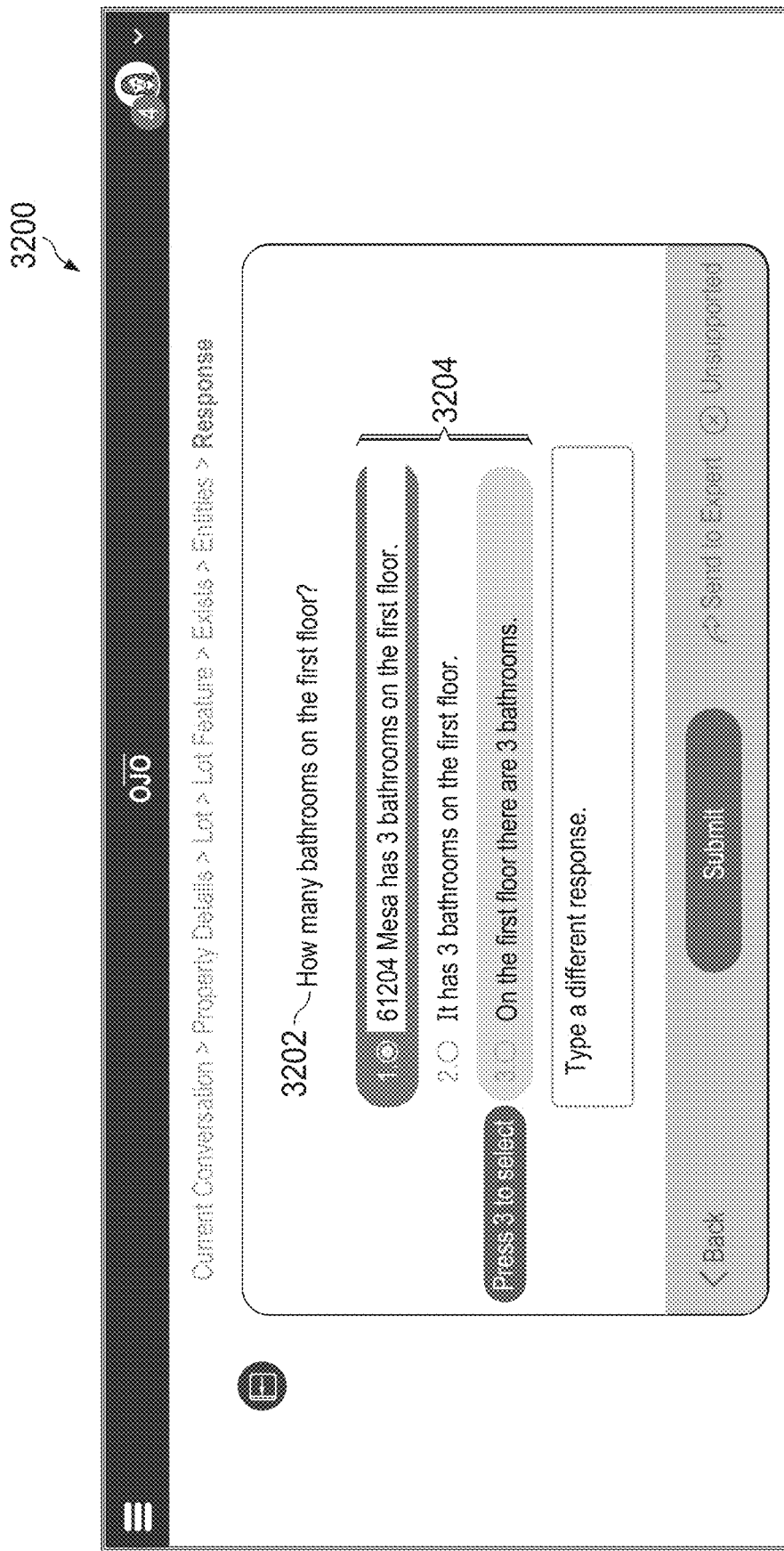

FIG. 32 depicts an exemplary subsystem NLP-2, stage 2 response prediction UI 3200. The subsystem NLP-2 presents the human operator a display using the select response 710 module that includes the NL statement 3202 and prepopulates response data fields 3204 with three response candidates. Based on the contextual data 3002 and the NL statement 502, the human operator and select any of the valid responses in data fields 3204. The human operator also has an option to "Type a different response."

Figure 33:
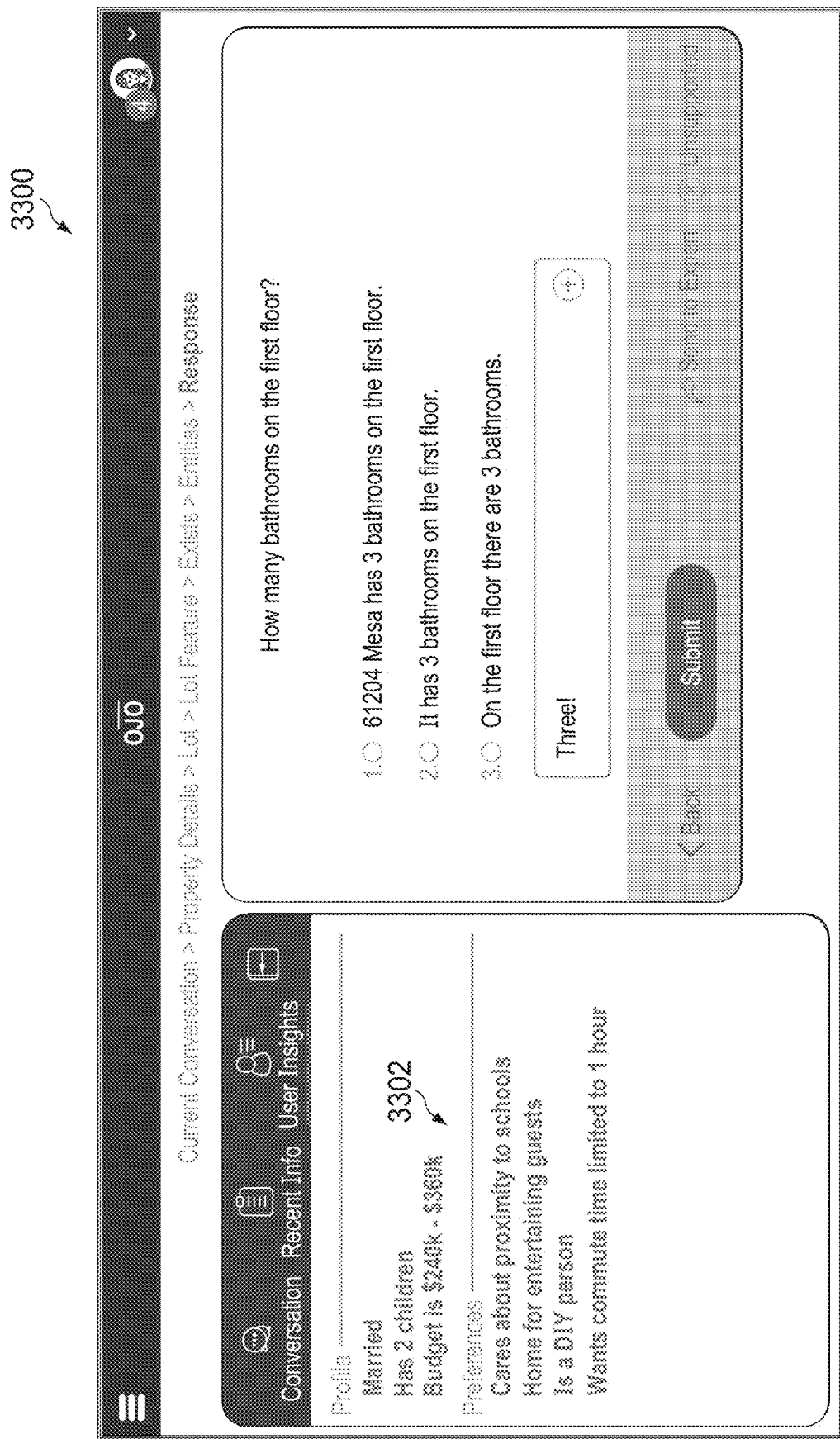

FIG. 33 depicts an exemplary subsystem NLP-2, stage 2 response prediction UI 3300 that displays when the human operator interacting with UI 3200 selects the option "Type a different response." that includes the profile and preferences 3302 as stored for the user of the requestor device(s) 108. From the fulfillment answer 2702 of "3" and the contextual data 2402, the human operator of subsystem NLP-2 recognizes that the response to the NL statement 502 should indicate that the number of bathrooms on the first floor is 3. Based on all information available, the human operator elects to manually enter one word "Three!" as the response to the NL statement 502. The process response 712 transmits the response of "Three!" to generate response module 718 of NLP system 500. The training data exporter 520 intercepts and transmits a copy of the response to data source 522 for training the response model 708.

Operation 414 determines that the NLP processing is complete, and operation 416 causes the send response module 718 to transmit the response of "Three!" to the requestor device(s) 108.

Accordingly, the NLP systems and methods provide cooperative operation of a network of natural language processors to concurrently distribute natural language processor training, generate predictions, and provide prediction driven responses to NL statements. By concurrently training NLP's to provide accurate predictions of NL statements and responses thereto, the NLP system and method enhance the network by providing high quality value predictions and responses and by avoiding potential training and operational delays associated with procurement and development of training data and refining the models of the NLP subsystems. Furthermore, embodiments of the system and method enhance the network of NLP subsystems by providing flexibility to incorporate multiple NLP models into the network and train at least a proper subset of the NLP models while concurrently using the NLP system and method in commercial operation. Additionally, the NLP systems can determine whether to dynamically sequence subsystem operations to improve improve resource utilization resources, training quality, and/or processing speed.

Figure 34:
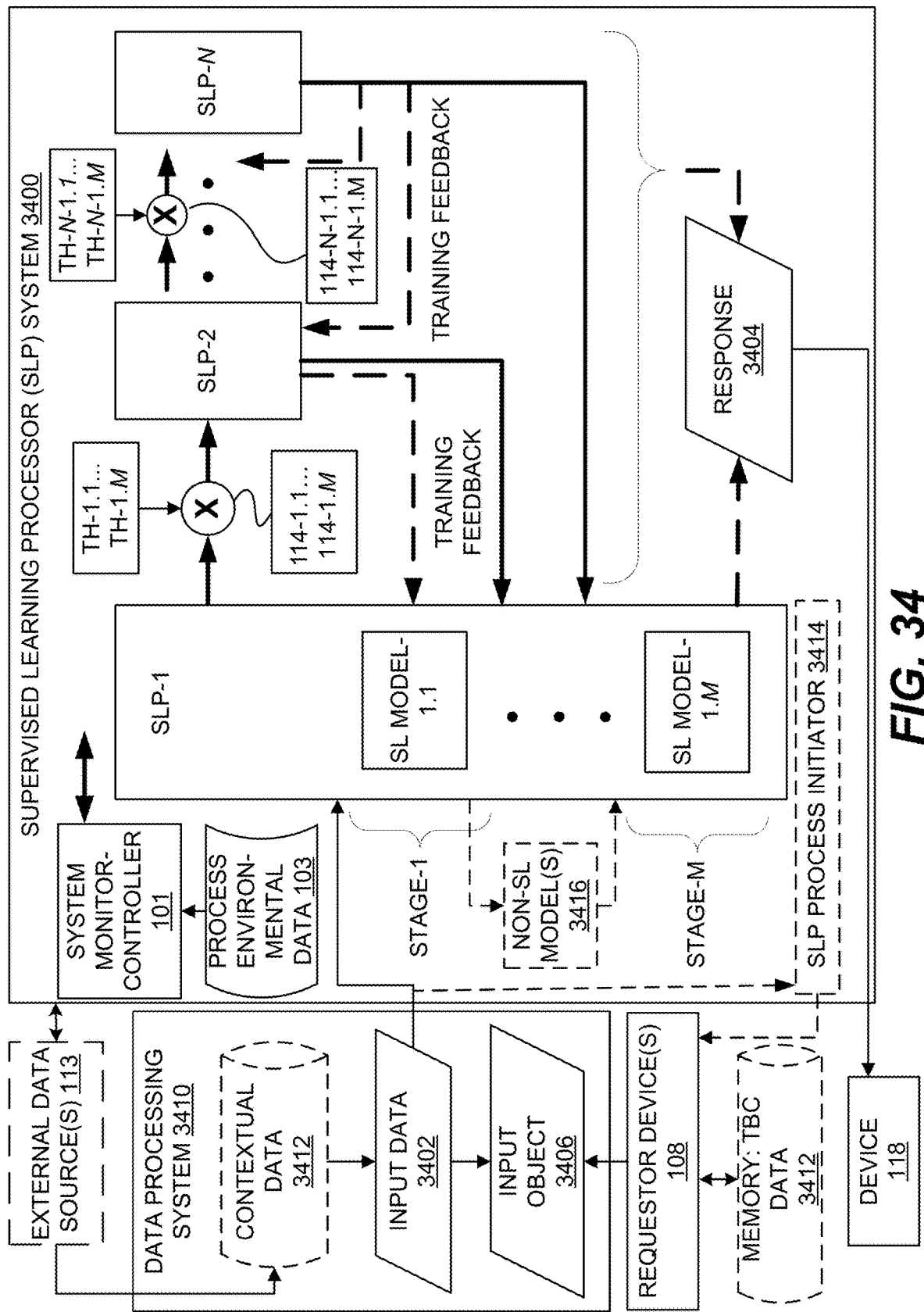
FIG. 34 depicts an exemplary supervised learning system.
Figure 35:
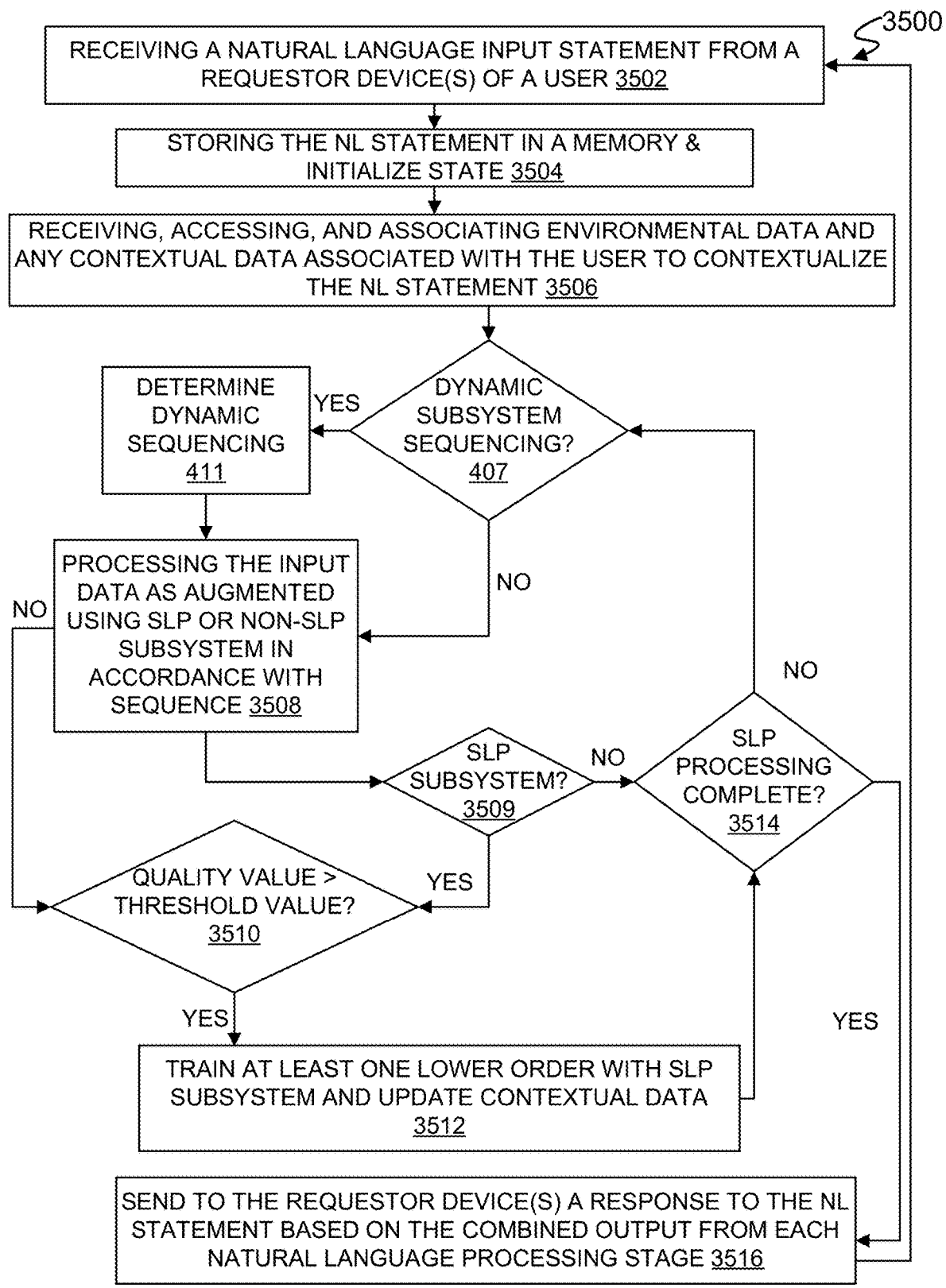
FIG. 35 depicts an exemplary supervised learning process.

FIG. 34 depicts embodiments of a SLP system 3400 that processes input data 3402 to generate a response 3404 to the input object 3406. A requestor device(s) 108 transmits the input object 3406 to a data processing system 3410 via, for example, a communication network such as a wireless network and the Internet. The input object 3406 can be any structured or unstructured data object, such as an NL statement, an image, or a video. The input object 3406 can be transmitted in any type of format, such as a short message service (SMS) text message, multi-media message service (MMS) message, email, or voice-to-data transcription. In at least one embodiment, the data processing system 3410 is separate from the SLP system 3400 (as shown). In at least one embodiment, the data processing system 3410 is included within the SLP system 3400. In at least one embodiment, the input data 3402 is the input object 3406. In at least one embodiment, the data processing system 3410 includes the input object 3406 and enhances the input data 3402 with contextual data 3412 by, for example, assembling the input data 3402 to associate the input object 3406 with the contextual data 3412. Including the contextual data 3412 as part of the input data 3402 provides context to the input object 3406. In at least one embodiment, the data processing system 3410 determines the contextual data 3412 by analyzing available data about the requestor device(s) 108, about a user of the requestor device(s) 108, and a history of conversations with the user. Exemplary contextual data in addition to the history of conversations with the user includes the location of the requestor device(s) 108, user personal data made available by the user including particular interests of the user, and user interest data submitted by the user, such as responses to a questionnaire. In at least one embodiment, the data processing system 3410 communicates with one or more external data sources 113 to obtain information, such as information about the user. The same prediction possibilities simplification by prediction set reduction can be applicable to the NLP system 100 apply to SLP system 3400.

Associating the contextual data 3412 with the input object 3406 can accelerate generation of the response 104 by the SLP system 3400 by constraining, for example, the domain and intent of the input object 3406. Additionally, in at least one embodiment, the SLP system 3400 can also access external data source(s) 113 to fulfill the input object 3406. "Fulfillment", in at least one embodiment, determines an answer to the input object 3406 that is utilized to determine the response 104.

In at least one embodiment, the SLP system 3400 includes an optional SLP process initiator 3414 to improve utilization time of the SLP system 3400. In at least one embodiment, the SLP process initiator 3414 monitors input data 3402 traffic to the SLP system 3400. When the SLP system 3400 has unused processing capacity available to process additional input data 3402, such as after a predefined elapsed time after receipt of an instance of the input data 3402 occurs, the SLP process initiator 3414 determines that the SLP system 3400 is not being utilized to process input data 3402 and issues a data retrieval command to the requestor device(s) 108 to retrieve to-be-classified (TBC) data from a memory 3412. When the SLP process initiator 3414 determines that the SLP system 3400 has unused processing capacity and issues the data retrieval command, the requestor device(s) 108 requests TBC data from the memory 3412 and submits the TBC data as an input object 3406 to the data processing system 3410. The SLP system 3400 then processes the input object 3406 as described herein. The TBC data can be any structured or unstructured data. For example, in at least one embodiment, the TBC data includes images, such as images of rooms in a structure. In at least one embodiment, the TBC data in memory 3412 is a collection of structured or unstructured data obtained from, for example, trusted and non-trusted entities, data training sets, data retrieved from the external data source(s) 113, and/or modifications of previously received data. In at least one embodiment, the SLP system 3400 processes an image to determine what kind of room the image represents, such as a kitchen, and what features are included in the room, such as granite countertops. The particular type of TBC data and the particular classification taxonomy and entities to be classified are a matter of design choice. Thus, increasing the utilization of the SLP system 3400 improves the cost-effectiveness of the SLP system 3400 by processing larger volumes of data and increases the training of the SL models and, thus, in at least one embodiment, increases the quality values of the outputs of the SL models to realize at least the advantages previously described.

In at least one embodiment of the SLP system 3400 that includes the SLP process initiator 3414, the requestor device(s) 108 includes an event handler that can be implemented in, for example, software and/or hardware, that responds to the retrieval command. In at least one embodiment, the SLP process initiator 3414 passively monitors the input data 3402 traffic utilizing data traffic monitoring technology.

In at least one embodiment of the NLP system 100 that includes the NLP process initiator 122, the requestor device(s) 108 includes an event handler that can be implemented in, for example, software and/or hardware, that responds to the retrieval command. In at least one embodiment, the NLP process initiator 122 passively monitors the input data 102 traffic utilizing data traffic monitoring technology.

In at least one embodiment, the requestor device(s) 108 do not monitor the capacity of SLP system 3400 and retrieve new input object data when the SLP system 3400 is idle. In at least one embodiment, the multiple requestor device(s) 108 are prioritized by a ranking scheme to prioritize processing. In at least one embodiment, the ranking scheme operates so that requestor device(s) 108 submitting live input objects are given highest priorities and their input data is processed strictly in a First In First Out order. Requestor device(s) 108 retrieving TBC data operate at a lower priority. In at least one embodiment, a subset of the requestor device(s) 108 retrieves input objects, such as hundreds of thousands of input objects including NL statements and images. This subset of requestor device(s) 108 sends all of the retrieved input objects to the data processing system 3410 at once, and the data processing system 3410 maintains the received input data in a queue until the SLP system 3400 is not processing live input objects. Then, the data processing system 3410 sends queued data to the SLP system 3400 for processing until a live input object is received for processing, which increases the utilization of the sLP system 3400. A "live" input object refers to an input object that is received by requestor device(s) 108 from a user in real time.

Thus, increasing the utilization of the SLP system 3400 improves the cost-effectiveness of the SLP system 3400 by processing larger volumes of data and increases the training of the SL models and, thus, in at least one embodiment, increases the quality values of the outputs of the NL models to realize at least the advantages described herein.

The SLP system 3400 includes system monitor-controller 101 and environmental process data 103 that determine whether to operate in a standard subsystem sequencing mode or a dynamic subsystem sequencing mode as, for example, described in conjunction with NLP systems 100 and 500. The SLP system 3400 also includes N SLP subsystems SLP-1, SLP-2, . . . SLP-N, with each SLP subsystem configured with M SLP stages. N is the integer index and is greater than or equal to two (2). The order of the SLP subsystems increases with an increasing index, i.e. subsystem SLP-1 is a lower order than subsystem SLP-2, and so on. Thus, subsystem SLP-2 has a prediction output quality value that is higher than a prediction output quality value of subsystem SLP-1 and so, which allows the higher order SLP subsystem(s) to train one or more lower level SLP subsystem(s) while generating a higher quality value output for use by a next stage of the SLP subsystems SLP-1 through SLP-N to generate a prediction. The value of N is a matter of design choice Since the value of N represents the number of SLP subsystems in the SLP system 3400, in at least one embodiment, increasing the value of N increases the order of the SLP system 3400. For example, for N equal 2, the SLP system 3400 is a second order system, for N equal 3, the SLP system 3400 is a third order system, and so on. In at least one embodiment, the value of N is set so that the SLP subsystems have a high enough order to generate an output with a high enough quality value to concurrently train one or more lower order SLP subsystems and each stage of the SLP system 3400 has a high enough prediction output quality value to be used in the generation of a response by the SLP system 3400 to the input object 3406.

In at least one embodiment, although utilizing a higher order SLP subsystem at least generally provides as accurate or more accurate predictions than a lower order SLP subsystem(s), one or more reasons generally exist that cause the SLP system 3400 to not use higher order SLP subsystems unless the prediction of the lower order SLP subsystem has a quality value that does is less than a predetermined quality value threshold. In at least one embodiment, human operated, higher order machine SLP subsystems integrate with lower order machine-only SLP subsystems to provide an accurate response, concurrent machine SL model training to increase machine SLP prediction quality values, and reducing over time the number and, thus, the cost of human operated machine SLP subsystems and/or increasing the taxonomy (such as domain and intent scope) of the SLP system. Thus, in at least one embodiment, the human operated, higher order machine SLP subsystems integrate with lower order machine-only SLP subsystems is technologically seamless, transparent to a user, and provides unparalleled accuracy with concurrent training and faster commercial availability. In at least one embodiment, the cost of using a higher order system is more expensive than a lower order system. For example, a human operated SLP subsystem may be more expensive to operate due to labor costs than utilizing an automated, machine SLP subsystem. So, training the lower order system well to improve the quality value of the lower system allows a higher order system to be utilized less, which, in at least one embodiment, reduces the overall cost of operating the SLP system.

In at least one embodiment, the SLP system 3400 processes each prediction and response problem in respective stages distributed across multiple SLP subsystems. As discussed in more detail in conjunction with FIG. 2, the SLP system 3400 includes M stages that are distributed across the network of subsystems SLP-1 through SLP-N. M is an integer index that is greater than or equal to two (2) and, in at least one embodiment, is independent of the value of index N. In at least one embodiment, M is determined by the number of prediction problems and a response generated by the SLP system 3400. For example, in at least one embodiment, to generate predictions for one problem and generate one response, the value of M is two. To generate predictions for a (1) domain, (2) intent, (3) entity normalization, (4) fulfillment, and (5) response, in at least one embodiment, the value of M is five (5).

At least the first subsystem SLP-1 includes a SL model SL model-1.1 through SL model-1.M for each of the M stages of the SLP system 3400. In at least one embodiment, each SL model is designed to solve a particular prediction problem using a subject matter model for the problem and a trainable neural network to ultimately generate a response to the input object 3406. For example, in at least one embodiment, SL model 1.1 solves a domain prediction problem, SL model 2.1 solves an intent prediction problem, (3) SL model 3.1 solves an entity normalization problem, SL model 4.1 solves a fulfillment problem, and (5) SL model 5.1 solves a response problem. Models in each stage of one or more subsystems SLP-2 through SLP-N can also be configured to solve the problem corresponding with the respective stages. Each model in each stage can be represented by one or more sub-models. When the model is represented by multiple sub-models, the SLP subsystem utilizes the sub-models in concert to collectively generate a prediction output. In at least one embodiment, the sub-models are incorporated into the SLP system 3400 and/or are third party SLP processors, such as services available from API.ai of Google, Inc. of Mountain View, CA, wit.ai of wit.ai, Inc. of Palo Alto, CA, language understanding intelligent service (LUIS) of Microsoft Corporation of Redmond, WA, and/or Lex of Amazon.com, Inc. of Seattle, WA. In at least one embodiment, the number of sub-models depends on the complexity of the subject. For example, if determining a domain of an Input object is more complicated than determining intent, then the domain related model may contain more sub-models than the intent related model. In at least one embodiment, when multiple sub-models are utilized and there is no consensus prediction from each sub-model, i.e. at least one sub-model generates a prediction that differs from at least one other sub-model, then determining which prediction to choose is a matter of design choice. In at least one embodiment, the SLP system utilizes cluster voting to choose a prediction from multiple sub-models. For example, a numerically ranked cluster voting scheme chooses a prediction generated by highest number of sub-models. A majority cluster voting scheme requires a majority of sub-models to agree on the same prediction; otherwise, the SLP system automatically escalates SL processing to a next higher order SLP subsystem. In at least one embodiment, weights are added to a prediction sub-model based on a confidence level of the sub-model, and the weights increase or decrease voting strength of a sub-model. Additionally, in at least one embodiment, some models may not need training. For example, in at least one embodiment, some models or sub-models do not need training. For example, a rules-based model or submodel has a programmatically defined function that does not change over time. For example, keyword recognition rules-based model utilizes a defined function to identify keywords and, thus, also simplifies the prediction problem by reducing a set of possible prediction outcomes.

Additionally, the order of processing by the M stages is a matter of design choice. The M SLP stages can operate in series, in parallel, or a combination of both series and parallel. In at least one embodiment, each ith stage of the SLP system 3400 includes an ith stage of the first order subsystem SLP-1 configured in series with a corresponding ith stage of the second order subsystem SLP-2, and so on. In at least one embodiment, when the M SLP stages are cascaded in series, the prediction output of the (i−1) stage, i.e. the SLP stage preceding the ith stage, is also used as part of the input data for the ith stage, in addition to the input object 3406 and contextual data 3412. In at least one embodiment, when the M SLP stages are configured in parallel, the prediction output of the ith stage of an SLP subsystem is used to train at least the ith stage of a lower order SLP subsystem and is also used as input data to a final response stage to determine a response to the Input object. Additionally, the number of SLP subsystems used per SLP stage and the particular SLP subsystems used per SLP stage is a matter of design choice. For example, each of the M SLP stages can utilize all the SLP subsystems SLP-1 through SLP-N or can use different proper subsets of SLP subsystems. For example, the ith SLP stage could use SLP subsystems SLP-1 and SLP-3, and the nth SLP stage could use, for example, SLP subsystems SLP-2 and SLP-3, SLP-2 or SLP-4, SLP-1, SLP-2, and SLP-3, and so on. Thus, in at least one embodiment, a particular SLP subsystem may be better trained within a particular subject area. For example, for human operated SLP subsystems, one human operator may have sufficient expertise for one area of interest, such as domain predictions, but may not have sufficient expertise in another area of interest, such as intent, normalization, or response predictions. Thus, in at least one embodiment, a first human may operate the mth stage model of the ith SLP subsystem, a second human may operate the nth stage model of the jth SLP subsystem, the first human, the second human, or a third human may operate the pth stage model of the kth SLP subsystem, and so on. The same concept of level of expertise can also be applied to automated machine SLP processors. This flexibility to match expertise to specific models within SLP subsystems can increase the efficiency of the SLP subsystem by optimizing resources that reduces a probability of escalating to higher order SLP subsystems to generate an accurate prediction.

In at least one embodiment, the SLP system 3400 utilizes quality values, thresholds, and training decision logic to determine whether the accuracy of the output of a model in a stage of an SLP subsystem is sufficient to be utilized to generate the response 104 or whether increased accuracy and further training of the model is desired. The SLP system 3400 includes N-1 training decision logic modules 114-1 through 114-N-1. Subsystems SLP-1 through SLP-(N-1) provide a quality value of a prediction output to respective training decision logic modules 114-1.1 through 114-(N-1).1. Each training decision logic module 114-1.1 through 114-N-1.M compares the quality value of the output of each stage 1 . . . M of each of respective subsystems SLP-1 through SLP-N-1 to a respective threshold value TH-1.1 . . . TH-1.M through TH-(N-1).1 . . . TH-(N-1).M, where "114-X.Y" and "TH-X.Y", "X" refers to the order of the SLP subsystem, and "Y" refers to the stage number. For example, the decision logic module 114-1.M for the subsystem SLP-1 and the Mth stage compares the quality value of the output of the SL model-1.M with the threshold value TH-1.M. If the quality value of the output at the particular training decision logic module exceeds the respective threshold value, then (i) the output has an acceptable accuracy to be used to generate the final response 104 and the subsequent SLP subsystems are not used to further train the SL model that generated the output and so on for each SLP subsystem and (ii) for subsystems other than the first order subsystem SLP-1, the output is fed back by the generating SLP subsystem to one or more lower order SLP subsystems to train the one or more lower order subsystems. If the quality value of the output at the particular training decision logic module does not exceed the respective threshold value, then the output of the SLP subsystem is transmitted to the next higher order SLP subsystem to determine an output and quality value. In at least one embodiment, the foregoing decision and training process occurs for each of the subsystems SLP-1 through the second to last SLP subsystem, subsystem SLP-N-1.

In at least one embodiment, the SLP subsystems that generate quality values of the outputs, such as the outputs of subsystems SLP-1 through SLP-N-1, normalize all or a proper subset of the quality values. When normalized quality values are generated, a common threshold value and a common training decision logic module can be used. For example, if the quality value is a normalized statistical confidence level or combination of statistical confidence levels between 0.00 and 1.00, with 0.00 representing no confidence and 1.00 representing 100% confidence that the output is correct, a common threshold value TH can be set at one particular value, such as any number within the range of 0.95-1.00 such as 0.97. In at least one embodiment, the quality value of each stage of each SLP subsystem is a function of (i) a first confidence level representing a confidence level of a prediction as assigned by the SLP subsystem for the particular stage and SLP model and (ii) a second confidence level of SLP subsystem as assigned by the SLP system 3400. Determination of the quality value from the one or more confidence levels is a matter of design choice. In at least one embodiment, the quality value is the product of the first and second confidence levels. Furthermore, if SLP subsystems generate a normalized quality value, the common threshold value TH can be used as the threshold value for all training decisions. Furthermore, the decision logic modules 114-1.1 . . . 114-N-1.M can also be embodied by a single decision logic module and either retrieve respective threshold values for comparison to SLP subsystem quality values or use the common threshold value TH to compare against normalized quality values.

For example, in at least one embodiment, for the nth stage of the ith order subsystem SLP-i, the subsystem SLP-i processes the input data 3402 and any data including the outputs of the lower order SLP subsystems, such as SLP-(i-1). n is an integer index value, $n \in \{1, \ldots, M\}$, and $i \in \{1, \ldots, N-1\}$. Utilizing the outputs of lower order SLP subsystems whose quality value did not exceed the relevant threshold level, further enhances the SLP system 3400 by identifying an output with a non-passing quality value and potentially preventing a recurrent selection of the output. The subsystem SLP-i generates an ith output with an ith quality value, and decision logic 114-$i$.n compares the ith quality value with the threshold value TH-i.n. If the ith quality value does not exceed the threshold value TH-i.n, then the ith output is transmitted to the i+1 order subsystem SLP-i+1. If the ith quality value exceeds the threshold value TH-i.n, then (i) the ith output is either transmitted to the n+1 stage of subsystem SLP-1 or otherwise used to generate the response data 104 and (ii) the ith output is fed back to the lower order SLP subsystems SLP-(1) through SLP-(i-1) to train the models of the lower order SLP subsystems with the output of the subsystem SLP-i.

In a more specific example, for the 2nd stage of the subsystem SLP-2, the subsystem SLP-2 processes the input data 3402 and the output of SLP-1. The subsystem SLP-2 generates an output with a quality value, and decision logic 114-2.2 compares the quality value with the threshold value TH-2.2. If the quality value does not exceed the threshold value TH-2.2, then the output is transmitted to subsystem SLP-3. If the quality value exceeds the threshold value TH-2.2, then (i) the output is either transmitted to the 3rd stage of subsystem SLP-2 or otherwise used to generate the response data 104 and (ii) the output is fed back to SLP subsystem SLP-1 to train the SL model 2.1 of the 2nd stage with the output of subsystem SLP-2.

In at least one embodiment, the configuration of the M stages with relation to each other is a matter of design choice. In at least one embodiment, the M stages are configured in series with each preceding stage providing input to each subsequent stage, and the last stage-M generating the response 104. In at least one embodiment, the M stages are configured in parallel so that the output of each stage is not provided as input to a subsequent stage. The output of each stage is processed by the SLP system 3400 to generate the response 104. In at least one embodiment, the M stages are configured in a combination of both parallel and series configurations so that the output of a proper subset of stages are not fed back to another stage. The output of each stage is processed by the SLP system 3400 to generate the response 104.

In at least one embodiment, the SLP system 3400 also utilizes one or more non-SL model(s) 116 to process data output data of one or more of the M stages. For example, in at least one embodiment, the output of ith stage and the input data 3402 is processed by a non-SL model 116 that includes a rules based engine to determine an output in accordance with pre-defined rules. A fulfillment model that determines an answer to the input object 3406 represents one embodiment of model 116.

Utilizing the predictions and responses of stages of SLP subsystems SLP-1 through SLP-(N-1) as input to one or more succeeding SLP stages also enhances the network by potentially improving the accuracy of the predictions and/s of each successive SLP stage and the response of the SLP system 3400 as a whole. In at least one embodiment, the SLP system 3400 finalizes a response 104 to the input object 100 using the outputs of each of the SLP stages 1 through M and provides the response 104 to device 118. The nature of the response 104 depends in part on the purpose of the response 104. In at least one embodiment, the input object 3406 is a question submitted by the user of at least one of the requestor device(s) 108, and the response 104 is an answer to the question. In this embodiment, the device 118 is one of the requestor device(s) 108, and the answer is provided to the requestor device(s) 108. In at least one embodiment, the input object 3406 is a command or other statement that alters the operation or otherwise causes device 118 to respond by, for example, operating in accordance with the command. For example, in at least one embodiment, the device 118 is a mold for curing rubber, and the response 118 is a command to open the mold. In at least one embodiment, the device 118 is a robot, a component, system, or other type of product manufacturing system, an assembly line system, a pharmaceutical manufacturing system, a food processing plant, an electronics assembly machine, a vehicle such as an automobile, marine vehicle, or fixed or rotor wind aircraft, a smart device, such as a smart plug or smart switch, or any other type of device 118 whose operation responds to the response 118. In at least one embodiment, device 118 is communicatively coupled to the SLP system 3400 via a data communication network such as the Internet or a private local area or wide area network. The M SLP stages can be distributed across the network of N SLP subsystems in the same manner as the distribution of M NLP stages can be distributed across the network of N NLP subsystems as previously described.

FIG. 3500 depicts an exemplary SLP process 3500 that, in at least one embodiment, functions identically to NLP process 400 except that the SLP process 3500 processes input objects which can include NL statements but are not limited to NL statements. In operation 3502, the SLP system 3400 receives an input object 3406 from a requestor device(s) 108. The SLP system 3400 stores the input object 3406 in a memory in operation 3504. In operation 3506, the SLP system 3400 receives, accesses, and associate any contextual data 3412 with the input object 3406 in, for example, the same manner as NLP systems 100 and 500 associates contextual data with an NL statement. The dynamic subsystem sequencing 407 and determine dynamic sequencing 411 operations function as previously described.

In operation 3508, the SLP subsystems SLP-1 through SLP-N and non-SL model(s) 3416 process the input data 3402 in, for example, the same manner as NLP systems 100 and 500 process NL statements. In at least one embodiment, SLP operations 3509, 3510, 3512, and 3514 function with respect to SLP predictions, thresholds, and model training in the same manner as NLP operations 409, 410, and 414 function with respect to NLP predictions, thresholds, and model training. When operation 3514 determines that the SLP processing is complete, the SLP operation 3516 sends the requestor device(s) 108 a response to the input object based on the combined output from each of the SL processing stage-1 through stage-M.

Accordingly, a supervised learning processing (SLP) system and method, which includes natural language processing (NLP) systems and methods, provide cooperative operation of a network of natural language (SL) processors to concurrently distribute supervised learning processor training, generate predictions, and provide prediction driven responses to input objects, such as SL statements. The SLP system includes SLP stages that are distributed across multiple SLP subsystems. Concurrently training SLP's provides accurate predictions of input objects and responses thereto, the SLP system and method enhance the network by providing high quality value predictions and responses and by avoiding potential training and operational delays associated with procurement and development of training data and refining the models of the SLP subsystems. Furthermore, embodiments of the system and method enhance the network of SLP subsystems by providing flexibility to incorporate multiple SLP models into the network and train at least a proper subset of the SLP models while concurrently using the SLP system and method in commercial operation. Additionally, the SLP systems can determine whether to dynamically sequence subsystem operations to improve improve utilization of resources, improve training quality, and/or improve processing speed.

Figure 36:
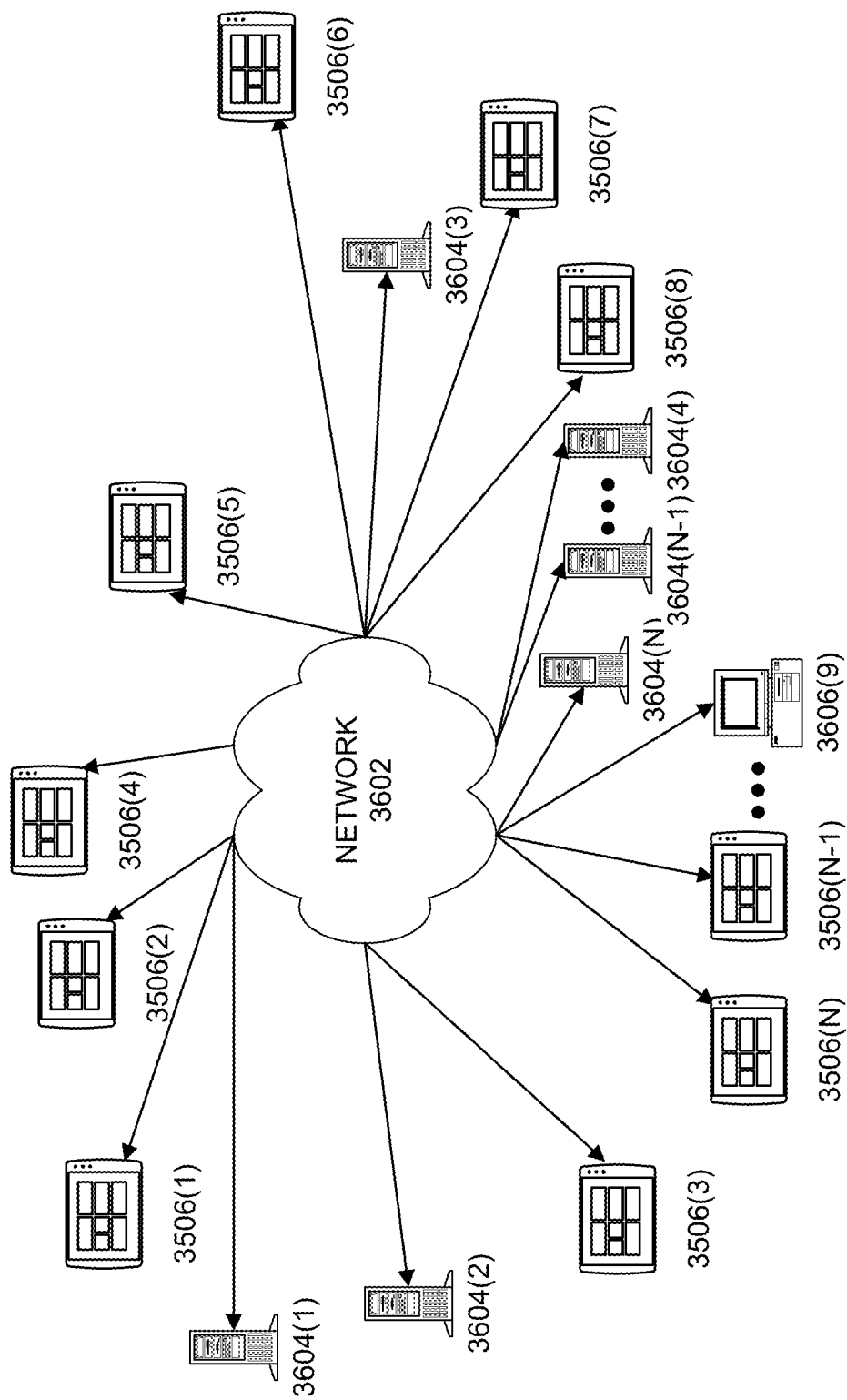
FIG. 36 depicts an exemplary network environment of distributed natural language subsystems of a natural language processing system.

FIG. 36 is a block diagram illustrating an exemplary network environment in which an NLP system with distributed processing may be practiced. Network 3602 (e.g. a private wide area network (WAN) or the Internet) includes a number of networked NLP computer systems 3604(1)-(N) that collectively implement a specialized NLP computational network of NLP subsystems, where N in FIG. 36 is the number of NLP computer systems connected to the network. Communication between user requestor devices 3606(1)-(N) and NLP computer systems 3604(1)-(N) typically occurs over a network, such as a public switched telephone network or cable network of asynchronous digital subscriber line (ADSL) channels or high-bandwidth trunks, for example communications channels providing T1 or OC3 service. Requestor devices 3606(1)-(N) typically access server computer systems 3604(1)-(N) through a service provider, such as an internet service provider ("ISP") by executing application specific software, commonly referred to as a browser, on one of requestor devices 3606(1)-(N).

Requestor device 3606(1)-(N) and/or NLP computer systems 3604(1)-(N) may be, for example, computer systems of any appropriate design, including a mainframe, a mini-computer, a personal computer system including notebook computers, a wireless, mobile computing device (including personal digital assistants, smart phones, and tablet computers). These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the natural language processing can be implemented using code stored in a tangible, non-transient computer readable medium and executed by one or more processors. In at least one embodiment, the cooperative operation of a network of natural language processors to concurrently distribute natural language processor training, generate predictions, and provide prediction driven responses to natural language (NL) statements can be implemented completely in hardware using, for example, logic circuits and other circuits including field programmable gate arrays.

Figure 37:
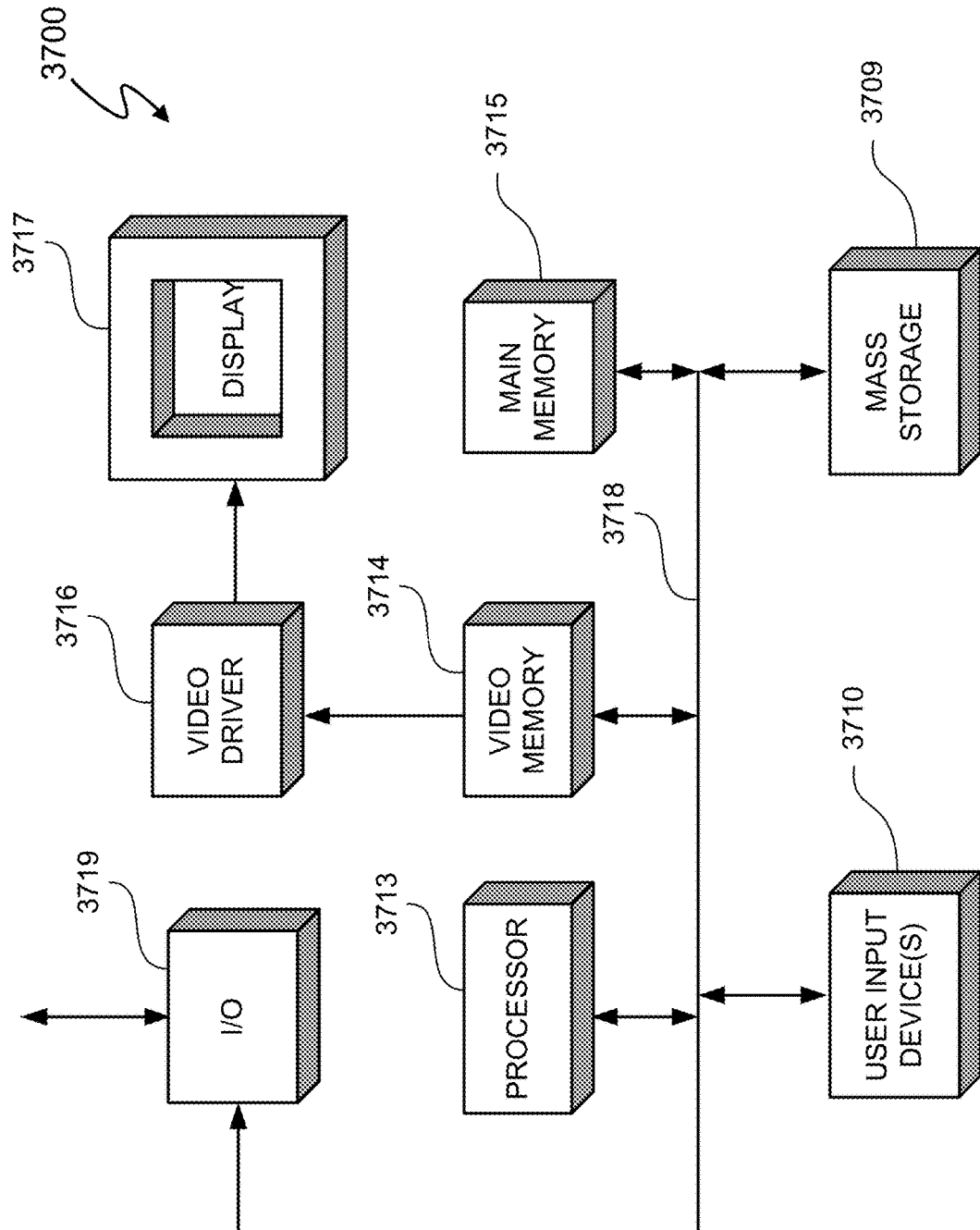
FIG. 37 depicts an exemplary computer system.

Embodiments of individual NLP computer systems 3604 (1)-(N) can be implemented on a computer system such as computer 3700 illustrated in FIG. 37. The computer 3700 can be a dedicated computer system or a virtual, emulated system located in, for example, a cloud computing environment. Input user device(s) 3710, such as a keyboard and/or mouse, are coupled to a bi-directional system bus 3718. The input user device(s) 3710 are for introducing user input to the computer system and communicating that user input to processor 3713. The computer system of FIG. 37 generally also includes a non-transitory video memory 3714, non-transitory main memory 3715, and non-transitory mass storage 3709, all coupled to bi-directional system bus 3718 along with input user device(s) 3710 and processor 3713. The mass storage 3709 may include both fixed and removable media, such as a hard drive, one or more CDs or DVDs, solid state memory including flash memory, and other available mass storage technology. Bus 3718 may contain, for example, 32 of 64 address lines for addressing video memory 3714 or main memory 3715. The system bus 3718 also includes, for example, an n-bit data bus for transferring DATA between and among the components, such as CPU 3709, main memory 3715, video memory 3714 and mass storage 3709, where "n" is, for example, 32 or 64. Alternatively, multiplex data/address lines may be used instead of separate data and address lines.

I/O device(s) 3719 may provide connections to peripheral devices, such as a printer, and may also provide a direct connection to a remote server computer systems via a telephone link or to the Internet via an ISP. I/O device(s) 3719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 3709, into main memory 3715 for execution. Computer programs may also be in the form of electronic signals modulated in accordance with the computer program and data communication technology when transferred via a network. In at least one embodiment, Java applets or any other technology is used with web pages to allow a user of a web browser to make and submit selections and allow a client computer system to capture the user selection and submit the selection data to a server computer system.

The processor 3713, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 3715 is comprised of dynamic random access memory (DRAM). Video memory 3714 is a dual-ported video random access memory. One port of the video memory 3714 is coupled to video amplifier 3716. The video amplifier 3716 is used to drive the display 3717. Video amplifier 3716 is well known in the art and may be implemented by any suitable means. This circuitry converts pixel DATA stored in video memory 3714 to a raster signal suitable for use by display 3717. Display 3717 is a type of monitor suitable for displaying graphic images. The computer system described above is for purposes of example only.

Figure 38:
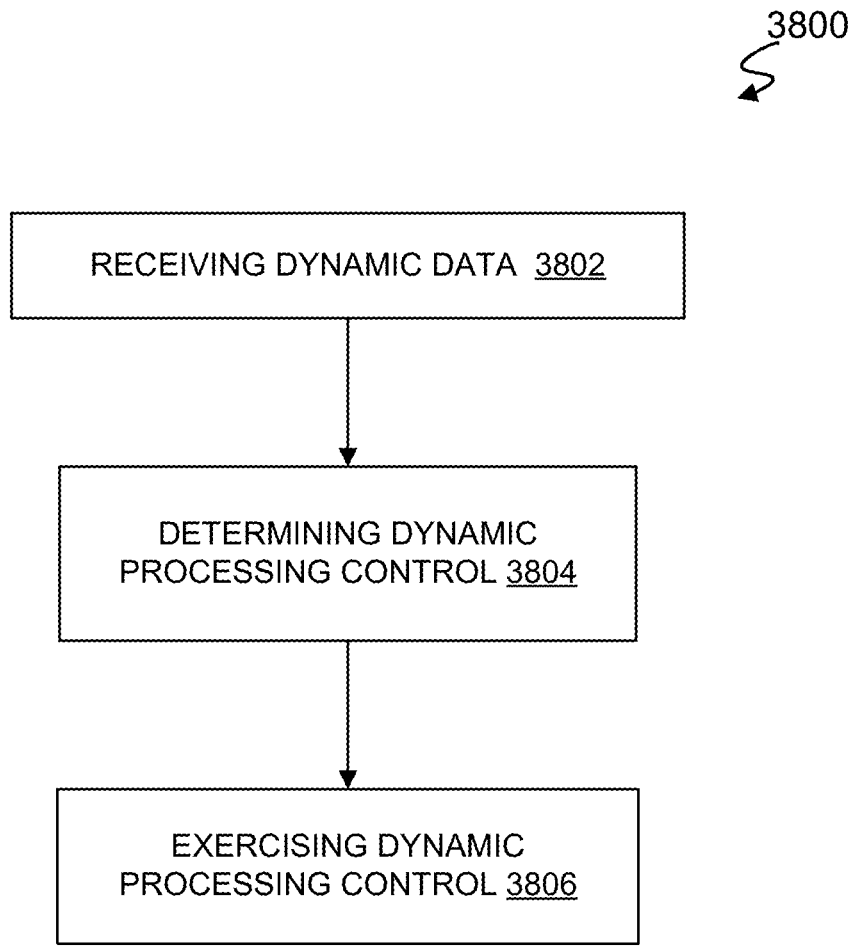
FIG. 38 depicts a dynamic data and dynamic processing control process.

FIG. 38 depicts a process 3800. Operation 3802 receives dynamic data. Operation 3802 proceeds to operation 3804, which determines dynamic processing control. Operation 3804 proceeds to operation 3806, which exercises dynamic processing control.

Although embodiments have been described in detail, it should be understood that various changes, substitutions, and alterations can be made hereto without departing from the spirit and scope of the invention as defined by the appended claims.

What is claimed is:

1. A non-transitory, computer readable medium having code stored therein to cooperatively operate a network of supervised learning processor subsystems to concurrently with dynamic model routing control distribute supervised learning processor training and provide predictive responses to input objects, wherein when the code is executed by one or more processors of a computer system, the code causes the computer system to perform operations comprising:
   receiving an input object from a requestor device;
   storing the input object in a memory;
   (A) receiving and accessing contextual data associated with the input object to contextualize the input object;
   (B) associating the contextual data with the input object;
   (C) receiving process environmental data;
   (D) supervised learning processing the input object and contextual data using a plurality of supervised learning processing stages distributed between at least a first order supervised learning processor subsystem and second order supervised learning processor subsystem having an equal or higher, predictive output quality value than the first supervised learning processor subsystem, wherein:
      (i) each supervised learning processing stage comprises one or more supervised learning processor models,
      (ii) each model of the first supervised learning processor subsystem is configured to: (a) process at least the input object and contextual data to determine a predictive response to the input object and (b) determine a quality value of the predictive response; and
      (iii) supervised learning processing comprises:
         a. monitoring the process environmental data;
         b. determining if the process environmental data indicates initiation of dynamic subsystem sequencing;

c. when the process environmental data indicates initiation of dynamic subsystem processing sequencing, determining a dynamic subsystem processing sequence from the process environmental data; and
d. dynamically applying the subsystem process sequence to alter a predetermined subsystem processing sequence, wherein dynamically applying the subsystem process sequence comprises:
determining a supervised learning processor subsystem to process at least the input object and the contextual data; and
causing the determined supervised learning processor subsystem to receive and process the input object and the contextual data; and
(iv) the second order supervised learning processing subsystem determines and finalizes an output of each supervised learning processing stage when the predictive response is routed to the second order supervised learning processing subsystem;
(E) training at least one model of the first order supervised learning processor subsystem with the determined and finalized output from the second order supervised learning processor subsystem;
(F) determining a response to the input object using at least a combined output from each supervised learning processing stage that processes the predictive response of at least one of the models, wherein enhancement of the network of supervised learning processor subsystems includes concurrently distributing training and cooperatively operating the supervised learning processor subsystems to determine the response to the statement; and
(G) providing the response to the user of the requestor device.

2. The non-transitory, computer readable medium of claim 1 wherein the supervised learning processing includes a standard operational supervised learning processor sub-system-to-subsystem transition sequencing process, and wherein when the process environmental data indicates initiation of dynamic subsystem processing sequencing, the supervised learning processing alters the standard operational sub-system-to-subsystem transition sequencing process by at least bypassing one or more of the models the standard operational supervised learning processor subsystem-to-subsystem transition sequencing process.

3. The non-transitory, computer readable medium of claim 2 wherein when the code is executed by the one or more processors of the computer system, the code causes the computer system to perform operations further comprising:
when the process routing criteria does not indicate initiation of dynamic subsystem processing sequencing, determining and finalizing by the second order supervised learning processing subsystem an output of each supervised learning processing stage when the predictive response is routed to the second order supervised learning processing subsystem for each predictive response whose quality value is below a pre-determined threshold.

4. The non-transitory, computer readable medium of claim 1 wherein the process environmental data comprises at least one of:
a. current processing load of the supervised learning processor subsystems;
b. processing latency of the supervised learning processor subsystems;
c. current operational time;
d. current operational time and date; and
e. determined momentum of a current communication exchange with the user.

5. The non-transitory, computer readable medium of claim 4 wherein the process environmental data comprises a. through e.

6. The non-transitory, computer readable medium of claim 1 wherein the supervised learning system includes a centralized monitor-controller that performs elements (D)(iii)a. through d.

7. The non-transitory, computer readable medium of claim 1 wherein each each supervised learning processing stage comprises one or more sub-monitor-controllers that perform elements (D)(iii)a. through d.

8. The non-transitory, computer readable medium of claim 1 wherein causing at least the input object and the contextual data to be routed to the determined supervised learning processor subsystem comprises:
adjusting a threshold of each predictive response of each model of an Nth order supervised learning processor subsystem that generates a predictive response so that a quality value of the predictive response is less than the adjusted threshold to force the routing of at least the input object and the contextual data to be routed to a supervised learning processor subsystem having an order higher than N, where N is an index value representing the supervised learning processor order.

9. The non-transitory, computer readable medium of claim 1 wherein at least one supervised learning subsystem model comprises a cluster of multiple sub-models to each process at least the input object and contextual data to determine a predictive response to the input object.

10. The non-transitory, computer readable medium of claim 9 further comprising:
providing the same input object and contextual data to multiple sub-models; and
determining a single prediction from the predictions determined by the cluster of multiple sub-models utilizing a cluster voting scheme.

11. The non-transitory, computer readable medium of claim 1 wherein when the code is executed by the one or more processors of the computer system, the code causes the computer system to perform operations further comprising:
processing the input object and contextual data using one or more non-supervised learning models to determine an output; and
determining a response to the input object using at least a combined output from each supervised learning processing stage and the output of the one or more non-supervised learning models.

12. The non-transitory, computer readable medium of claim 1 wherein the number of supervised learning system includes N distributed and coupled supervised learning processor subsystems, and each supervised learning processor subsystem includes one or more supervised learning processing stages that are cooperatively coupled across the supervised learning processor subsystems, wherein N is an integer greater than or equal to 3.

13. The non-transitory, computer readable medium of claim 1 wherein the supervised learning system is a natural language processing system, the input object is a natural language statement, and the models include domain classifier, intent classifier, entities extraction, and entities normalization models.

14. The non-transitory, computer readable medium of claim 1 wherein when the code is executed by the one or more processors of the computer system, the code causes the computer system to perform operations further comprising:
- monitoring receipt of input objects from one or more requestor devices;
- determining if the supervised learning processing system has unused supervised learning processing capacity;
- if the supervised learning processing system has unused supervised learning processing capacity, issuing a command to a first requestor device of the one or more requestor devices to retrieve data to be classified; and
- providing the data to be classified as the input object to the supervised learning processing system.

15. The non-transitory, computer readable medium of claim 1 wherein the supervised learning processing stage are cascaded, and the predictive responses of supervised learning processing stage are input to each successive supervised learning processing stage.

16. The non-transitory, computer readable medium of claim 1 wherein when the code is executed by the one or more processors of the computer system, the code causes the computer system to perform operations further comprising:
- receiving multiple, additional input objects from multiple requestor devices;
- storing the multiple, additional input objects in a queue;
- prioritizing the processing of the multiple, additional input objects in accordance with a prioritization scheme; and
- performing (A)-(F) processing of each of the multiple, additional input objects in accordance with the prioritization scheme to determine the responses to the multiple, additional input objects.

* * * * *